United States Patent
Carvagno et al.

(10) Patent No.: US 11,267,916 B2
(45) Date of Patent: Mar. 8, 2022

(54) ADHESIVE COMPOSITION COMPRISING AMORPHOUS PROPYLENE-ETHYLENE COPOLYMER AND POLYOLEFINS

(71) Applicant: Eastman Chemical Company, Kingsport, TN (US)

(72) Inventors: Terri Roxanne Carvagno, Church Hill, TN (US); Susana Marques, Rotterdam (NL); Ming Allison Yuan, Shanghai (CN); Da Yu Vincent Zhang, Shanghai (CN); Boon Hui Janice Ang, Singapore (SG); Marc Stacey Somers, Kilgore, TX (US); Raymond Prescott Cottle, Longview, TX (US); Bennett H. Novak, Longview, TX (US); Puthenkovilakom Rajesh Raja, Baytown, TX (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 15/929,578

(22) Filed: May 11, 2020

(65) Prior Publication Data
US 2020/0277419 A1    Sep. 3, 2020

Related U.S. Application Data

(63) Continuation of application No. 16/002,743, filed on Jun. 7, 2018, now Pat. No. 10,647,795, which is a
(Continued)

(51) Int. Cl.
*C08F 210/06* (2006.01)
*C09J 11/06* (2006.01)
(Continued)

(52) U.S. Cl.
CPC .......... *C08F 210/06* (2013.01); *C08F 4/6465* (2013.01); *C08F 4/6543* (2013.01);
(Continued)

(58) Field of Classification Search
CPC .... C08F 210/06; C08F 4/6465; C08F 4/6543; C08F 10/06; C08K 5/01; C08K 5/134;
(Continued)

(56) References Cited

U.S. PATENT DOCUMENTS

| 4,367,322 A | 1/1983 | Shiga et al. |
| 4,736,002 A | 4/1988 | Allen et al. |

(Continued)

FOREIGN PATENT DOCUMENTS

| CA | 1282546 C | 4/1991 |
| EP | 3299431 A1 | 3/2018 |

(Continued)

OTHER PUBLICATIONS

ASTM D5; "Standard Test Method for Penetration of Bituminous Materials" Published Feb. 2013.
(Continued)

*Primary Examiner* — William K Cheung
(74) *Attorney, Agent, or Firm* — Polly C. Owen

(57) ABSTRACT

Amorphous propylene-ethylene copolymers are described herein that can include high amounts of ethylene and exhibit desirable softening points and needle penetrations. The desirable combinations of softening points and needle penetrations in these propylene-ethylene copolymers allow them to have a broad operating window. Due their broad operating window, the propylene-ethylene copolymers can be utilized in a wide array of applications and products, including hot melt adhesives.

14 Claims, 17 Drawing Sheets

Related U.S. Application Data continuation-in-part of application No. 15/683,964, filed on Aug. 23, 2017, now Pat. No. 10,308,740, and a continuation-in-part of application No. 15/443,278, filed on Feb. 27, 2017, now Pat. No. 10,214,600, which is a continuation of application No. 14/567,028, filed on Dec. 11, 2014, now Pat. No. 9,611,341.

(60) Provisional application No. 62/517,255, filed on Jun. 9, 2017, provisional application No. 62/378,698, filed on Aug. 24, 2016, provisional application No. 61/937,024, filed on Feb. 7, 2014.

(51) Int. Cl.

| | |
|---|---|
| *C08F 10/06* | (2006.01) |
| *C08L 23/10* | (2006.01) |
| *C09J 123/10* | (2006.01) |
| *C08L 53/02* | (2006.01) |
| *C09J 123/14* | (2006.01) |
| *C08K 5/134* | (2006.01) |
| *C08K 11/00* | (2006.01) |
| *C08F 4/646* | (2006.01) |
| *C08F 4/654* | (2006.01) |
| *C08K 5/01* | (2006.01) |
| *C09J 123/08* | (2006.01) |

(52) U.S. Cl.
CPC ............... *C08F 10/06* (2013.01); *C08K 5/01* (2013.01); *C08K 5/134* (2013.01); *C08K 11/00* (2013.01); *C08L 23/10* (2013.01); *C08L 53/02* (2013.01); *C08L 53/025* (2013.01); *C09J 11/06* (2013.01); *C09J 123/08* (2013.01); *C09J 123/10* (2013.01); *C09J 123/14* (2013.01); *C08L 2205/025* (2013.01)

(58) Field of Classification Search
CPC .......... C08K 11/00; C08L 23/10; C08L 53/02; C08L 53/025; C08L 2205/025; C09J 11/06; C09J 123/08; C09J 123/10; C09J 123/14
USPC ........................................................ 524/291
See application file for complete search history.

(56) References Cited

U.S. PATENT DOCUMENTS

| | | |
|---|---|---|
| 4,847,340 A | 7/1989 | Allen |
| 5,077,358 A | 12/1991 | Durand et al. |
| 5,100,981 A | 3/1992 | Schreck et al. |
| 5,177,162 A | 1/1993 | Matsuura et al. |
| 5,192,732 A | 3/1993 | Duranel et al. |
| 5,236,962 A | 8/1993 | Govoni et al. |
| 5,247,031 A | 9/1993 | Kioka et al. |
| 5,247,032 A | 9/1993 | Kioka et al. |
| 5,302,675 A | 4/1994 | Sustic et al. |
| 5,397,843 A | 3/1995 | Lakshmanan et al. |
| 5,414,063 A | 5/1995 | Seeger et al. |
| 5,438,110 A | 8/1995 | Ishimaru et al. |
| 5,468,810 A | 11/1995 | Hayakawa et al. |
| 5,476,911 A | 12/1995 | Morini et al. |
| 5,498,770 A | 3/1996 | Hosaka et al. |
| 5,516,866 A | 5/1996 | Resconi et al. |
| 5,576,259 A | 11/1996 | Hasegawa et al. |
| 5,589,549 A | 12/1996 | Govoni et al. |
| 5,618,886 A | 4/1997 | Shinozaki et al. |
| 5,618,895 A | 4/1997 | Kerth et al. |
| 5,637,665 A | 6/1997 | Sustic et al. |
| 5,681,913 A | 10/1997 | Sustic et al. |
| 5,684,173 A | 11/1997 | Hosaka et al. |
| 5,693,729 A | 12/1997 | Fushimi et al. |
| 5,714,554 A | 2/1998 | Sustic et al. |
| 5,733,645 A | 3/1998 | Somers |
| 5,744,567 A | 4/1998 | Huffer et al. |
| 5,747,573 A | 5/1998 | Ryan |
| 5,747,595 A | 5/1998 | Saito et al. |
| 5,773,537 A | 6/1998 | Mueller et al. |
| 5,804,296 A | 9/1998 | Itoh et al. |
| 5,840,808 A | 11/1998 | Sugimura et al. |
| 5,993,964 A | 11/1999 | Nakajima |
| 6,013,742 A | 1/2000 | Huffer et al. |
| 6,034,189 A | 3/2000 | Shinozaki et al. |
| 6,057,413 A | 5/2000 | Ima et al. |
| 6,087,459 A | 7/2000 | Miro et al. |
| 6,100,351 A | 8/2000 | Sun et al. |
| 6,103,253 A | 8/2000 | Hoffmann et al. |
| 6,107,430 A | 8/2000 | Dubois et al. |
| 6,111,039 A | 8/2000 | Miro et al. |
| 6,111,046 A | 8/2000 | Resconi et al. |
| 6,121,393 A | 9/2000 | Kioka et al. |
| 6,201,090 B1 | 3/2001 | Sumitomo et al. |
| 6,214,939 B1 | 4/2001 | Shinozaki et al. |
| 6,214,949 B1 | 4/2001 | Reddy et al. |
| 6,221,984 B1 | 4/2001 | Kersting et al. |
| 6,228,956 B1 | 5/2001 | Covezzi et al. |
| 6,232,285 B1 | 5/2001 | Casteel et al. |
| 6,303,696 B1 | 10/2001 | Ushioda et al. |
| 6,306,973 B1 | 10/2001 | Takaoka et al. |
| 6,313,225 B2 | 11/2001 | Saito et al. |
| 6,313,227 B1 | 11/2001 | Tanaka et al. |
| 6,319,979 B1 | 11/2001 | Dubois et al. |
| 6,329,468 B1 | 12/2001 | Wang |
| 6,335,410 B1 | 1/2002 | Finlayson et al. |
| 6,362,298 B2 | 3/2002 | Dolle et al. |
| 6,410,663 B2 | 6/2002 | Shamshoum et al. |
| 6,423,782 B1 | 7/2002 | Yukimasa et al. |
| 6,451,726 B1 | 9/2002 | Zambon et al. |
| 6,455,643 B1 | 9/2002 | Harlin et al. |
| 6,469,112 B2 | 10/2002 | Cheng et al. |
| 6,534,606 B2 | 3/2003 | Kohler et al. |
| 6,545,099 B2 | 4/2003 | Shinozaki et al. |
| 6,566,294 B2 | 5/2003 | Miro |
| 6,569,827 B2 | 5/2003 | Van Dijk et al. |
| 6,573,350 B1 | 6/2003 | Markel et al. |
| 6,582,762 B2 | 6/2003 | Faissat et al. |
| 6,586,536 B1 | 7/2003 | Kelley |
| 6,586,543 B1 | 7/2003 | Wey et al. |
| 6,600,034 B2 | 7/2003 | Sato et al. |
| 6,630,559 B2 | 10/2003 | Shinozaki et al. |
| 6,649,725 B2 | 11/2003 | Seta et al. |
| 6,689,846 B1 | 2/2004 | Leskinen et al. |
| 6,693,161 B2 | 2/2004 | Collina et al. |
| 6,723,810 B2 | 4/2004 | Finlayson et al. |
| 6,730,754 B2 | 5/2004 | Resconi et al. |
| 6,747,103 B1 | 6/2004 | Vestberg et al. |
| 6,747,114 B2 | 6/2004 | Karandinos et al. |
| 6,870,022 B2 | 3/2005 | Iwasaki et al. |
| 6,887,817 B2 | 5/2005 | Lu et al. |
| 6,900,281 B2 | 5/2005 | Streeky et al. |
| 6,916,883 B2 | 7/2005 | Parikh et al. |
| 6,927,258 B2 | 8/2005 | Datta et al. |
| 6,960,635 B2 | 11/2005 | Stevens et al. |
| 6,982,310 B2 | 1/2006 | Datta et al. |
| 6,984,631 B2 | 1/2006 | Aranishi et al. |
| 6,984,696 B2 | 1/2006 | Curry et al. |
| 6,984,730 B2 | 1/2006 | Yamada et al. |
| 6,992,158 B2 | 1/2006 | Datta et al. |
| 6,992,159 B2 | 1/2006 | Datta et al. |
| 6,992,160 B2 | 1/2006 | Datta et al. |
| 6,998,457 B2 | 2/2006 | Kelley |
| 7,001,965 B2 | 2/2006 | Appleyard et al. |
| 7,015,170 B2 | 2/2006 | Morini et al. |
| 7,014,886 B2 | 3/2006 | Vey et al. |
| 7,019,081 B2 | 3/2006 | Datta et al. |
| 7,019,097 B2 | 3/2006 | Sacchetti et al. |
| 7,053,164 B2 | 5/2006 | Datta et al. |
| 7,056,982 B2 | 6/2006 | Datta et al. |
| 7,071,137 B2 | 7/2006 | Klendworth et al. |
| 7,074,871 B2 | 7/2006 | Cecchin |
| 7,084,218 B2 | 8/2006 | Datta et al. |
| 7,105,609 B2 | 9/2006 | Datta et al. |

(56) References Cited

U.S. PATENT DOCUMENTS

| | | |
|---|---|---|
| 7,157,522 B2 | 1/2007 | Datta et al. |
| 7,199,180 B1 | 4/2007 | Simmons et al. |
| 7,238,758 B2 | 7/2007 | Yoshikiyo et al. |
| 7,244,787 B2 | 7/2007 | Curry et al. |
| 7,253,221 B2 | 8/2007 | Mohanty et al. |
| 7,262,251 B2 | 8/2007 | Kanderski et al. |
| 7,289,091 B2 | 10/2007 | Heo |
| 7,294,681 B2 | 11/2007 | Jiang et al. |
| 7,323,525 B2 | 1/2008 | Alastalo et al. |
| 7,329,626 B2 | 2/2008 | Spaether et al. |
| 7,332,556 B2 | 2/2008 | Cecchin et al. |
| 7,348,381 B2 | 3/2008 | Bodiford et al. |
| 7,365,136 B2 | 4/2008 | Huovinen et al. |
| 7,413,811 B2 | 8/2008 | Dharmarajan et al. |
| 7,452,953 B2 | 11/2008 | Jaaskelainen et al. |
| 7,465,775 B2 | 12/2008 | Vestberg et al. |
| 7,470,756 B2 | 12/2008 | Jaaskelainen et al. |
| 7,491,670 B2 | 2/2009 | Chen et al. |
| 7,521,518 B2 | 4/2009 | Jacobsen et al. |
| 7,524,910 B2 | 4/2009 | Jiang et al. |
| 7,524,911 B2 | 4/2009 | Karjala et al. |
| 7,538,173 B2 | 5/2009 | Schwab et al. |
| 7,579,422 B2 | 8/2009 | Jaaskelainen et al. |
| 7,589,145 B2 | 9/2009 | Brant et al. |
| 7,592,286 B2 | 9/2009 | Morini et al. |
| 7,608,668 B2 | 10/2009 | Li Pi Shan et al. |
| 7,611,776 B2 | 11/2009 | Yu et al. |
| 7,678,867 B2 | 3/2010 | Baita et al. |
| 7,807,768 B2 | 10/2010 | Becker et al. |
| 7,977,435 B2 | 7/2011 | Lin et al. |
| 7,981,982 B2 | 7/2011 | Cagnani et al. |
| 8,008,412 B2 | 8/2011 | Brant et al. |
| 8,026,311 B2 | 9/2011 | Migone et al. |
| 8,063,160 B2 | 11/2011 | Cavalieri et al. |
| 8,071,499 B2 | 12/2011 | Morini et al. |
| 8,076,422 B2 | 12/2011 | Heemann et al. |
| 8,106,138 B2 | 1/2012 | Sheard et al. |
| 8,129,490 B2 | 3/2012 | Cagnani et al. |
| 8,178,633 B2 | 5/2012 | Cai et al. |
| 8,188,164 B2 | 5/2012 | Chen et al. |
| 8,207,271 B2 | 6/2012 | Denifl et al. |
| 8,207,272 B2 | 6/2012 | Bernreitner et al. |
| 8,222,336 B2 | 7/2012 | Eberhardt et al. |
| 8,227,370 B2 | 7/2012 | Chang |
| 8,273,838 B2 | 9/2012 | Chan et al. |
| 8,288,304 B2 | 10/2012 | Chen et al. |
| 8,288,481 B2 | 10/2012 | Fiebig et al. |
| 8,288,489 B2 | 10/2012 | Becker et al. |
| 8,309,501 B2 | 11/2012 | Kolb et al. |
| 8,324,335 B2 | 12/2012 | Ito et al. |
| 8,334,354 B2 | 12/2012 | Kwon et al. |
| 8,372,193 B2 | 2/2013 | Chen et al. |
| 8,378,048 B2 | 2/2013 | Kolb et al. |
| 8,383,731 B2 | 2/2013 | Lewtas et al. |
| 8,399,571 B2 | 3/2013 | Becker et al. |
| 8,420,742 B2 | 4/2013 | Karjala et al. |
| 8,431,642 B2 | 4/2013 | Tancrede et al. |
| 8,487,026 B2 | 7/2013 | Bach et al. |
| 8,530,582 B2 | 9/2013 | Becker et al. |
| 8,536,268 B2 | 9/2013 | Karjala et al. |
| 8,536,868 B2 | 9/2013 | Zenge |
| 8,552,105 B2 | 10/2013 | Peters |
| 8,614,271 B2 | 12/2013 | Davis et al. |
| 8,802,782 B2 | 8/2014 | Becker et al. |
| 8,846,814 B2 | 9/2014 | Becker et al. |
| 8,921,489 B2 | 12/2014 | Becker et al. |
| 9,382,351 B2 | 7/2016 | Somers et al. |
| 9,399,686 B2 | 7/2016 | Somers et al. |
| 9,428,598 B2 | 8/2016 | Somers et al. |
| 9,593,179 B2 | 3/2017 | Somers et al. |
| 9,611,341 B2 | 4/2017 | Somers et al. |
| 10,214,600 B2* | 2/2019 | Somers .................. C08L 53/02 |
| 10,647,795 B2* | 5/2020 | Carvagno .............. C08K 11/00 |
| 2004/0052952 A1 | 3/2004 | Vey et al. |
| 2004/0106723 A1 | 6/2004 | Yang et al. |
| 2004/0127614 A1 | 7/2004 | Jiang et al. |
| 2004/0132935 A1 | 7/2004 | Arjunan et al. |
| 2008/0021186 A1 | 1/2008 | Steib |
| 2008/0114142 A1 | 5/2008 | Hicks et al. |
| 2008/0194765 A1 | 8/2008 | Becker et al. |
| 2009/0062466 A1 | 3/2009 | Dong et al. |
| 2009/0105407 A1* | 4/2009 | Karjala ................ C09J 123/142 |
| | | 524/547 |
| 2009/0182103 A1 | 7/2009 | Chang et al. |
| 2009/0270560 A1 | 10/2009 | Bacci et al. |
| 2010/0047064 A1 | 2/2010 | Mokulys et al. |
| 2010/0210795 A1 | 8/2010 | Clarembeau et al. |
| 2010/0249330 A1 | 9/2010 | Massari et al. |
| 2010/0279033 A1 | 11/2010 | Becker et al. |
| 2010/0285246 A1 | 11/2010 | Becker et al. |
| 2011/0003094 A1 | 1/2011 | Becker et al. |
| 2011/0034634 A1 | 2/2011 | Grein et al. |
| 2011/0054117 A1 | 3/2011 | Hall |
| 2011/0060078 A1 | 3/2011 | Becker et al. |
| 2011/0086970 A1 | 4/2011 | Grein et al. |
| 2011/0224387 A1 | 9/2011 | Bergstra et al. |
| 2012/0088086 A1 | 4/2012 | Grein et al. |
| 2012/0116029 A1 | 5/2012 | Van Egmond et al. |
| 2012/0232221 A1 | 9/2012 | Collina et al. |
| 2013/0060215 A1 | 3/2013 | Knutson et al. |
| 2013/0197153 A1 | 8/2013 | Kheirandish et al. |
| 2013/0253124 A1 | 9/2013 | Bernreiter et al. |
| 2013/0267660 A1 | 10/2013 | Leskinen et al. |
| 2013/0267667 A1 | 10/2013 | Paavilainen et al. |
| 2015/0166850 A1 | 6/2015 | Tse |
| 2015/0299526 A1 | 10/2015 | Gray et al. |
| 2015/0322303 A1 | 11/2015 | Coffey et al. |
| 2015/0351977 A1 | 12/2015 | Bunnelle |
| 2016/0130480 A1 | 5/2016 | Kauffman et al. |
| 2016/0177141 A1 | 6/2016 | Schroeyers et al. |
| 2017/0166669 A1 | 6/2017 | Somers et al. |
| 2017/0290945 A1 | 10/2017 | Hanson et al. |
| 2018/0002578 A1 | 1/2018 | Kauffman et al. |
| 2018/0030317 A1 | 2/2018 | Fujinami et al. |
| 2018/0037778 A1 | 2/2018 | Briseno et al. |
| 2018/0057624 A1 | 3/2018 | Muvundamina et al. |
| 2018/0134927 A1 | 5/2018 | Sergeant et al. |
| 2018/0193515 A1 | 7/2018 | Bunnelle |
| 2018/0193516 A1 | 7/2018 | Bunnelle et al. |

FOREIGN PATENT DOCUMENTS

| | | |
|---|---|---|
| JP | 2000063420 A | 2/2000 |
| WO | WO 2006/069205 A1 | 6/2006 |
| WO | WO 2009/092721 A1 | 7/2009 |
| WO | WO 2010/138142 A1 | 12/2010 |
| WO | WO 2013/019507 A2 | 2/2013 |
| WO | WO 2014/011450 A1 | 1/2014 |
| WO | WO 2014/105244 A1 | 7/2014 |
| WO | WO 2014/127093 A1 | 8/2014 |
| WO | WO 2014/205336 A2 | 12/2014 |
| WO | WO 2015/167692 A1 | 11/2015 |
| WO | WO 2016/126949 A1 | 8/2016 |

OTHER PUBLICATIONS

ASTM D412; "Standard Test Methods for Vulcanized Rubber and Thermoplastic Elastomers-Tension", Published Apr. 2013.
ASTM E794; "Standard Test Method for Melting and Crystallization Temperatures By Thermal Analysis"; Published Sep. 2012.
ASTM D903; "Standard Test Method for Peel or Stripping Strength of Adhesive Bonds"; Published Oct. 2010.
ASTM D1544; Standard Test Method for Color of Transparent Liquids (Gardner Color Scale); Published Jun. 2010.
ASTM D2240; Standard Test Method for Rubber Property—Durometer Hardness; Published Apr. 2010.
ASTM D3236; Standard Test Method for Apparent Viscosity of Hot Melt Adhesives and Coating Materials; Published Jul. 2014.
ASTM D3654; "Standard Test Methods for Shear Adhesion of Pressure-Sensitive Tapes"; Published Nov. 2011.

(56) References Cited

OTHER PUBLICATIONS

ASTM D4497; Standard Test Method for Determining the Open Time of Hot Melt Adhesives (Manual Method); Published Oct. 2010.
ASTM D6195; Standard Test Methods for Loop Tack; Published Apr. 2011.
ASTM E28 Standard Test Methods for Softening Point of Resins Derived from Pine Chemicals and Hydrocarbons, by Ring-and-Ball Appratus; Published Aug. 2014.
ASTM E111; Standard Test Method for Young's Modulus, Tangent Modulus, and Chord Modulus; Published Jan. 2011.
ASTM D4498; "Standard Test Method for Heat-Fail Temperature in Shear of Hot Melt Adhesives"; Published Jun. 2007.
ASTM D1238; "Standard Test Method for Melt Flow Rates of Thermoplastics by Extrusion Plastometer"; Published Aug. 2013.
ASTM D624; "Standard Test Method for Tear Strength of Conventional Vulcanized Rubber and Thermoplastic Elastomers"; Published Mar. 2012.
ASTM D1084; "Standard Test Methods for Viscosity of Adhesives"; Published Jun. 2016.
ASTM D792; "Standard Test Methods for Density and Specific Gravity (Relative Density) of Plastics by Displacement"; Published Nov. 2013.
Fernanda et al. "Properties of Ethylene-Propylene Copolymers Synthesized by a Supported Ziegler-Natta Catalyst Based on TiC14/ MgC12/PC13" Eur. Polym. 1997, J. vol. 33, No. 6 pp. 897401.
Lou et al. "Polypropylene Chain Structure Regulation by Alkoxysilane and Ether Type External Donors in TiCl4/DIBP/MgCl$_2$-AlEt$_3$ Ziegler-Natta Catalyst" *Iranian Polymer Journal* 19 (12), 2010, pp. 927-936.
Zohuri et al. "Copolymerization of ethylene-propylene using high-activity bi-supported Ziegler-Natta TiCl4 catalyst" *Journal of Applied Polymer Science*, 93(6), Sep. 15, 2004, pp. 2597-2606.
Co-pending U.S. Appl. No. 14/567,028, filed Dec. 11, 2014; now U.S. Pat. No. 9,611,341; Somers, et al.
Co-pending U.S. Appl. No. 14/567,037, filed Dec. 11, 2014; now U.S. Pat. No. 9,382,351; Somers, et al.
Co-pending U.S. Appl. No. 14/567,050, filed Dec. 11, 2014; now U.S. Pat. No. 9,428,598; Somers, et al.
Co-pending U.S. Appl. No. 14/567,074, filed Dec. 11, 2014; now U.S. Pat. No. 9,399,686; Somers, et al.
Co-pending U.S. Appl. No. 14/567,093, filed Dec. 11, 2014; now U.S. Pat. No. 9,593,179; Somers, et al.
Co-pending U.S. Appl. No. 15/443,278, filed Feb. 27, 2017; now U.S. Pat. No. 10,214,600; Somers, et al.
Co-pending U.S. Appl. No. 16/256,126, filed Jan. 24, 2019; now U.S. Publication No. 2019-0171143; Marc Stacey Somers.
Co-pending U.S. Appl. No. 15/683,964, filed Aug. 23, 2017; now U.S. Pat. No. 10,308,740; Muvundamina et al.
Co-pending U.S. Appl. No. 16/002,734, filed Jun. 7, 2018; now U.S. Publication No. 2018-0282449; Carvagno et al.
Co-pending U.S. Appl. No. 16/002,739, filed Jun. 7, 2018; Muvundamina et al.
Notification of Transmittal of the International Search Report and the Written Opinion of the International Searching Authority, or the Declaration dated Apr. 10, 2015 received in International Application No. PCT/US15/11689.
Notification of Transmittal of the International Search Report and the Written Opinion of the International Searching Authority, or the Declaration dated Nov. 2, 2017 received in International Application No. PCT/US2017/048322.
Notification of Transmittal of the International Search Report and the Written Opinion of the International Searching Authority, or the Declaration dated Sep. 17, 2018 received in International Application No. PCT/US2018/036588.
Notification of Transmittal of the International Search Report and the Written Opinion of the International Searching Authority, or the Declaration dated Sep. 17, 2018 received in International Application No. PCT/US2018/036590.
Notification of Transmittal of the International Search Report and the Written Opinion of the International Searching Authority, or the Declaration dated Sep. 18, 2018 received in International Application No. PCT/US2018/036593.

* cited by examiner

ADHESIVE COMPOSITION COMPRISING AMORPHOUS PROPYLENE-ETHYLENE COPOLYMER AND POLYOLEFINS

CROSS REFERENCES TO RELATED APPLICATIONS

This application is a continuation of U.S. application Ser. No. 16/002,743 filed on Jun. 7, 2018 (now U.S. Pat. No. 10,647,795) which claims the benefit of U.S. Provisional Application No. 62/517,255 filed on Jun. 9, 2017; U.S. application Ser. No. 16/002,743 filed on Jun. 7, 2018 is also a continuation-in-part application claiming priority to U.S. application Ser. No. 15/683,964 filed on Aug. 23, 2017 (now U. S. Pat. No. 10,308,740), which claims the benefit of U.S. Provisional Application No. 62/378,698 filed on Aug. 24, 2016; U.S. application Ser. No. 16/002,743 filed on Jun. 7, 2018 is also a continuation-in-part application claiming priority to U.S. application Ser. No. 15/443,278 filed on Feb. 27, 2017 (now U.S. Pat. No. 10,214,600), which claims the priority to U.S. application Ser. No. 14/567,028 filed on Dec. 11, 2014 (now U.S. Pat. No. 9,611,341), which claims the benefit of U.S. Provisional Application No. 61/937,024 filed on Feb. 7, 2014; and the disclosures of which are herein incorporated by reference in their entireties.

BACKGROUND

1. Field of the Invention

The present invention is generally related to amorphous propylene-ethylene copolymers and processes for producing such copolymers. Particularly, the present invention is generally related to amorphous propylene-ethylene copolymers having desirable needle penetrations, softening points, crystallinity, viscosities, and viscoelastic characteristics. More particularly, the present invention is related to low molecular weight amorphous propylene-ethylene copolymers that can be utilized in adhesive compositions having a wide process window and high peel strengths especially in hygiene applications.

2. Description of the Related Art

Amorphous polyolefins are commonly used in industry to produce a wide array of products including, for example, adhesives. Common polyolefins utilized in adhesives generally include copolymers produced from propylene, ethylene, and various $C_4$-$C_{10}$ alpha-olefin monomers, such as, for example, 1-butene, 1-pentene, 1-hexene, 1-heptene, 1-octene, 1-nonene, and 1-decene. In particular, propylene-butene copolymers are commonly used to produce hot melt adhesives due to the higher adhesive bond strengths derived from these copolymers. Much of the adhesive bond strength derived from these copolymers can be attributed to the $C_4$-$C_{10}$ alpha-olefins contained therein, which can greatly increase the subsequent bonding properties of the copolymer. Unfortunately, $C_4$-$C_{10}$ alpha-olefins can be quite expensive due to market availability and can also exhibit limited reactivity during the polymerization processes.

Due to the above deficiencies of the $C_4$-$C_{10}$ alpha-olefins, some manufacturers have attempted to replace $C_4$-$C_{10}$ alpha-olefins with ethylene. Unlike many of the $C_4$-$C_{10}$ alpha-olefins, ethylene can be more readily available and more reactive than many of the commonly used $C_4$-$C_{10}$ alpha-olefins, such as 1-butene. Unfortunately, propylene-ethylene copolymers can exhibit deficiencies in hardness, thereby resulting in adhesives that lack ideal bond strength over time. Some manufacturers have attempted to increase the hardness of these copolymers by incorporating crystalline polypropylene therein. However, by adding crystalline polypropylene to these copolymers, the softening points of the copolymers are also increased. This can limit the application of these copolymers to certain types of adhesives due to the higher softening points.

Thus, there is a need for amorphous copolymers that exhibit an ideal balance between hardness and softening point and that can also be used to produce adhesives with improved adhesive characteristics.

In addition, this invention also involves a low molecular weight amorphous propylene-ethylene copolymers that can be utilized in adhesive compositions having a wide process window and high peel strengths especially in hygiene applications. The need for high peel strength is motivated by concerns for safety for the hygiene user, especially for the diaper user. Lower peel strength could lead to premature failure of the bond lines holding the various elements of the diaper construction, and subsequently expose the diaper user to the superabsorbent material. Another concern related to low peel strength is the local bond failure that would lead, upon insult of the diaper, to the channeling of the body fluid with a resulting reduction of the overall protection of the diaper wearer.

Various attempts to emulate the performance of styrene/isoprene/styrene polymer (SIS) and styrene-butadiene-styrene polymer adhesive formulations have been made. The introduction to the hygiene industry of more complex styrenic copolymers (styrene-ethylene-ethylene-propylene-styrene (SEEPS), styrene-isoprene-butylene-styrene (SIBS), styrene-ethylene-butylene (SEB), styrene-ethylene-butylene-styrene (SEBS), styrene-ethylene-propylene-styrene (SEPS), and styrene-butylene-butylene-styrene (SBBS)), various other thermoplastic rubbers, chain shuttling catalyzed olefin block copolymer (OBC), and amorphous poly alpha olefins (APAO) are examples of such efforts. The use of metallocene-catalyzed olefins has also been documented. Nevertheless, the attempts fell short of achieving the goal of producing a simple formulation that yields a wide process window simultaneously coupled with high peel strength. Therefore, there is a need for such a polymer that can provide these attributes in an adhesive formulation.

SUMMARY

One or more embodiments of the present invention concern a copolymer comprising propylene and ethylene, which has a softening point in the range of 90 to 140° C. Furthermore, the copolymer has a needle penetration that is equal to y, which is defined by the following formula:
$y \leq -0.000000262249x^6 + 0.000172031278x^5 - 0.046669720165x^4 + 6.701746779438x^3 - 537.286013331959x^2 + 22,802.983472587x - 400,204.018086126$.

In the above formula, x is the softening point of the copolymer.

Additionally, one or more embodiments of the present invention concern a copolymer comprising propylene and ethylene. The copolymer has a softening point in the range of 110 to 135° C. and a needle penetration of less than 25 dmm.

Furthermore, one or more embodiments of the present invention concern a copolymer comprising propylene and ethylene. The copolymer has a softening point in the range of 90 to 121° C. and a needle penetration of less than 35 dmm.

Also, one or more embodiments of the present invention concern a copolymer comprising propylene and ethylene. The copolymer has a softening point in the range of 90 to less than 115° C. and a needle penetration equal to or less than 53 dmm.

Also, one or more embodiments of the present invention concerns a low molecular copolymer comprising propylene and ethylene. The low molecular weight copolymer has a softening point in the range of 90 to 140° C. The low molecular weight copolymer has a needle penetration that is equal to y, wherein y is defined by the following formula: $y \leq -0.000000262249x^6 + 0.000172031278x^5 - 0.046669720165x^4 + 6.701746779438x^3 - 537.286013331959x^2 + 22{,}802.983472587x - 400{,}204.018086126$, wherein x in the above formula is the softening point of the copolymer; wherein the low molecular weight copolymer has a molecular weight polydispersibility index of about 3 to about 25, a crystallinity of about 18% to about 30% by X-Ray diffraction, and a Brookfield viscosity in the range of about 1,000 to about 4,000 cp at 190° C. measured by ASTM D 3236.

Moreover, one or more embodiments of the present invention concern a hot melt adhesive. The hot melt adhesive comprises a copolymer comprising propylene and ethylene. The copolymer has a softening point in the range of 90 to 140° C. and a needle penetration that is equal to y, which is defined by the following formula: $y \leq -0.000000262249x^6 + 0.000172031278x^5 - 0.046669720165x^4 + 6.701746779438x^3 - 537.286013331959x^2 + 22{,}802.983472587x - 400{,}204.018086126$. In the above formula, x is the softening point of the copolymer.

In addition, one or more embodiments of the present invention concern a process for producing a copolymer. The process comprises reacting propylene and ethylene in the presence of a catalyst system comprising an electron donor to form the copolymer. The copolymer has a softening point in the range of 90 to 140° C. and a needle penetration that is equal to y, which is defined by the following formula: $y \leq -0.000000262249x^6 + 0.000172031278x^5 - 0.046669720165x^4 + 6.701746779438x^3 - 537.286013331959x^2 + 22{,}802.983472587x - 400{,}204.018086126$. In the above formula, x is the softening point of the copolymer.

In yet further embodiments of the present invention, a process for producing a copolymer is provided. The process comprises reacting propylene and ethylene in the presence of a catalyst system comprising an electron donor to form the copolymer. The copolymer has a softening point in the range of 110 to 140° C. and a needle penetration that is equal to y, which is defined by the following formula: $y \leq -0.000751414552642x^4 + 0.374053308337937x^3 - 69.5967657676062x^2 + 5{,}734.02599677759x - 176{,}398.494888882$. In the above formula, x is the softening point of the copolymer.

One or more embodiments of the present invention concern an adhesive composition comprising at least one propylene-ethylene copolymer and at least one propylene polymer, wherein the propylene-ethylene copolymer comprises at least 10 weight percent of ethylene and a softening point of at least 99° C.

One or more embodiments of the present invention concern an adhesive composition comprising at least one propylene-ethylene copolymer and at least one propylene polymer, wherein the propylene-ethylene copolymer comprises a polydispersity of at least 3.

BRIEF DESCRIPTION OF THE FIGURES

Embodiments of the present invention are described herein with reference to the following drawing figures, wherein.

DETAILED DESCRIPTION

Figure 1A:
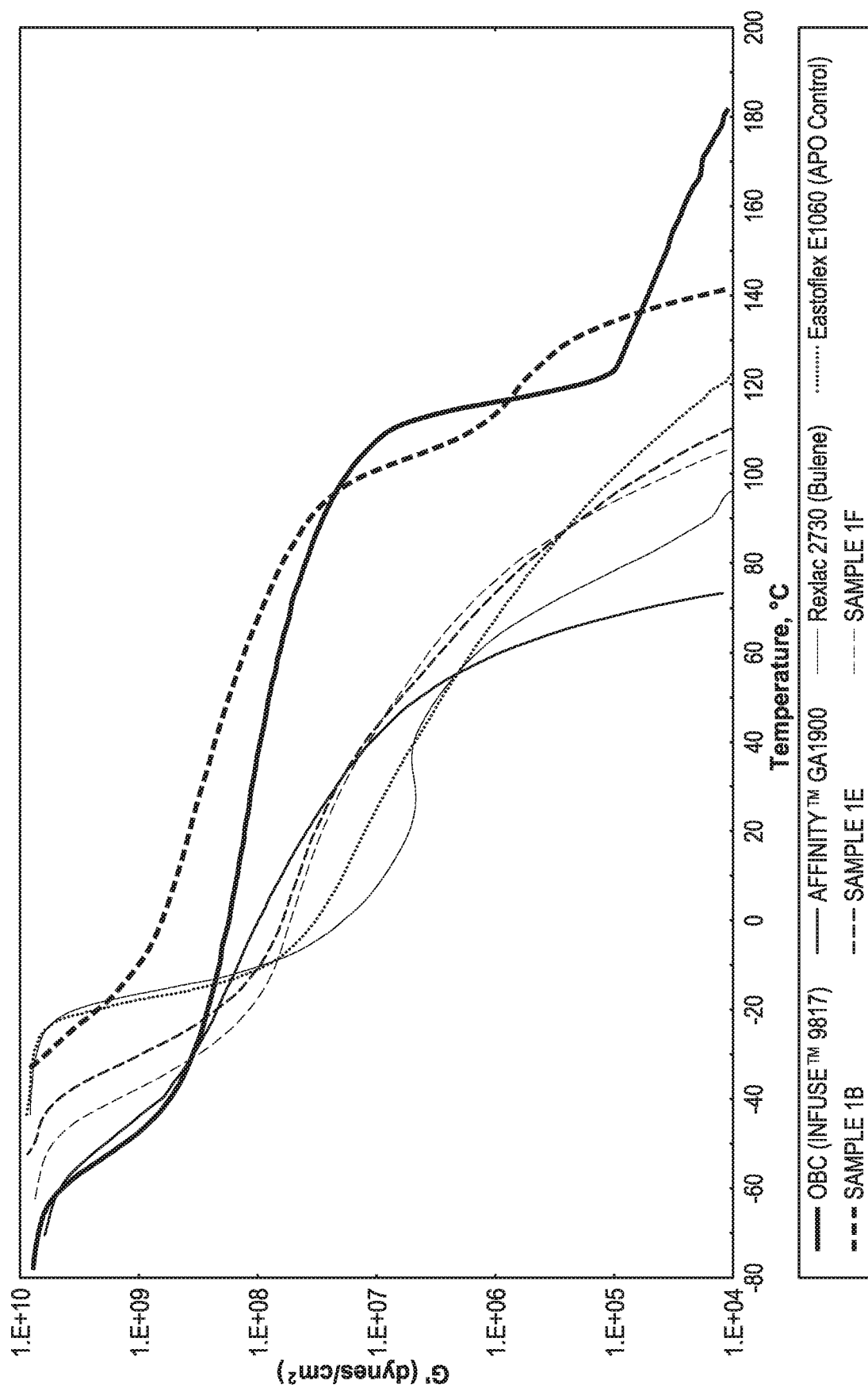
FIG. 1A depicts the viscoelastic characteristics of particular propylene-ethylene copolymers produced in Example 1.

The present invention is generally related to amorphous propylene-ethylene copolymers and their various applications. Many of the existing propylene-ethylene copolymers in the market today generally exhibit deficiencies regarding their softening points or hardness. The inventive copolymers described herein exhibit improved properties currently not available in these commercial copolymers. In particular, as described below in further detail, the inventive copolymers can exhibit desirable softening points and needle penetrations, thereby resulting in copolymers that are useful in a wide array of applications. Furthermore, the inventive low molecular weight copolymers provide additional features including a wide operating window for adhesive applications and also high peel strengths.

The Propylene-Ethylene Copolymers

Commercially-available propylene-ethylene copolymers have generally not been strong enough to be used in adhesives for packaging applications or hygiene products (e.g., diapers and feminine care products). Generally, this has to do with the lack of balance between the strength and adhesion properties of the copolymers. Historically, in order to produce a copolymer with sufficient strength, one had to limit the ethylene content of the copolymer. It has been observed that there is a correlation between the ethylene contents of a copolymer and its softening point and needle penetration, which is an indication of the copolymer's strength. Usually, the ethylene content can have a negative correlation with the softening point of the copolymer and a positive correlation with the needle penetration of the copolymer. In other words, the more ethylene that is present in a copolymer, the lower the softening point and higher the needle penetration of the copolymer. Thus, increasing the ethylene content in a propylene-ethylene copolymer may decrease the copolymer's softening point, but can also compromise its strength as shown by an increased needle penetration.

Unlike conventional propylene-ethylene copolymers available today, the inventive copolymers can exhibit a desirable softening point and needle penetration with relatively high ethylene contents. As previously noted, it can be desirable to utilize ethylene as a comonomer in propylene copolymers due to the high availability and low costs of ethylene compared to other alpha-olefins. Furthermore, there can be polymerization advantages in using ethylene as a comonomer since ethylene can be much more reactive than many other alpha-olefins.

According to various embodiments, the propylene-ethylene copolymers described herein can comprise varying amounts of ethylene. For example, the propylene-ethylene copolymers can comprise at least 1, 3, 5, 7, 10, 12, 14, 15, 17, 18, or 20 and/or not more than 70, 65, 60, 55, 50, 45, 40, 35, 30, 27, or 25 weight percent of ethylene. Moreover, the propylene-ethylene copolymers can comprise in the range of 1 to 70, 3 to 65, 5 to 60, 7 to 55, 10 to 50, 12 to 45, 14 to 40, 15 to 35, 17 to 30, 18 to 27, or 20 to 25 weight percent of ethylene.

Furthermore, in various embodiments, the propylene-ethylene copolymers can contain varying amounts of propylene. For example, the propylene-ethylene copolymers can comprise at least 40, 50, 60, 65, or 70 and/or not more than 99, 95, 90, 85, or 80 weight percent of propylene. Moreover, the propylene-ethylene copolymers can comprise in the range of 40 to 99, 50 to 95, 60 to 90, 65 to 85, or 70 to 80 weight percent of propylene.

In various embodiments, the copolymers can comprise at least 50, 65, 75, or 85 and/or not more than 99, 97.5, 95, or 90 weight percent of ethylene and propylene in combination. Moreover, the copolymers can comprise in the range of 50 to 99, 65 to 97.5, 75 to 95, or 85 to 90 weight percent ethylene and propylene in combination. Additionally or alternatively, the copolymers can comprise a weight ratio of propylene to ethylene of at least 0.5:1, 1:1, 2:1, or 2.5:1 and/or not more than 20:1, 15:1, 10:1, or 5:1. Moreover, the copolymers can comprise a weight ratio of propylene to ethylene in the range of 0.5:1 to 20:1, 1:1 to 15:1, 2:1 to 10:1, or 2.5:1 to 5:1.

In various embodiments, the copolymers can contain one or more $C_4$-$C_{10}$ alpha-olefins. As previously noted, $C_4$-$C_{10}$ alpha-olefins can be used to increase the resulting bond strength of the copolymers when utilized in adhesives. These $C_4$-$C_{10}$ alpha-olefins can include, for example, 1-butene, 1-pentene, 1-hexene, 1-heptene, 1-octene, 1-nonene, 1-decene, and combinations thereof. According to one or more embodiments, the copolymers can comprise at least 0.5, 1, 2, 3, 4, or 5 and/or not more than 40, 30, 25, 20, 15, or 10 weight percent of at least one $C_4$-$C_{10}$ alpha-olefin. Moreover, the copolymers can comprise in the range of 0.5 to 40, 1 to 30, 2 to 25, 3 to 20, 4 to 15, or 5 to 10 weight percent of at least one $C_4$-$C_{10}$ alpha-olefin.

As noted above, a lower softening point for the copolymers can be desirable so that the copolymers can be utilized and processed at lower application temperatures. In various embodiments, the copolymers can have a softening point of at least 85, 90, 95, 96, 97, 98, 99, 100, 101, 102, 103, 104, 105, 106, 107, 108, 109, 110, 113, 115, 116, 119, 120, 121, 124, 125, or 127° C. Additionally or alternatively, the copolymers can have a softening point of not more than 145, 140, 138, 137, 136, 135, 134, 132, 130, 129, 128, 127, 126, 125, 124, 123, 122, 121, 120, 118, 117, 115, 110, or 109.9° C. as measured according to ASTM E28 Standard Test Method for Softening Point of Resins Derived from Pine Chemicals and Hydrocarbons, by Ring- and Ball Apparatus using a heating rate of 5° C. per minute and a bath liquid of USP Glycerin.

Moreover, the copolymers can have a softening point in the range of 85 to 145° C., 90 to 140° C., 90 to 110° C., 90 to 121° C., 90 to 115° C., 95 to 138° C., 95 to 110° C., 96 to 136° C., 97 to 135° C., 98 to 134° C., 99 to 132° C., 100 to 130° C., 101 to 129° C., 102 to 128° C., 103 to 127° C., 104 to 126° C., 105 to 125° C., 106 to 124° C., 107 to 123° C., 108 to 122° C., 109 to 121° C., or 110 to 120° C. as measured according to ASTM E28 as discussed previously.

Despite exhibiting the low softening points described above, the copolymers can also exhibit desirable needle penetration values. Generally, the lower the needle penetration value, the higher the strength characteristics and modulus of the copolymer; however, if the needle penetration gets too low, then adhesive properties can be adversely impacted. In various embodiments, when the softening point is in the range of 90 to 140° C., the needle penetration values of the copolymers described herein can be defined by the following formula:

$$y \leq -0.000000262249x^6 + 0.000172031278x^5 - 0.046669720165x^4 + 6.701746779438x^3 - 537.286013331959x^2 + 22,802.983472587x - 400,204.018086126.$$

In the above formula, "y" defines the needle penetration (dmm) of the copolymer and "x" is the softening point (° C.) of the copolymer.

Needle penetration is measured following the ASTM D5 Standard Test Method for Penetration of Bituminous Materials and utilizing the following specifications:

The weight of the spindle is 47.5+/−0.05 g.

The weight of the ferrule needle assembly is 2.50+/−0.05 g.

The total weight of the needle and spindle assembly is 50.0+/−0.05 g.

A weight of 50+/−0.05 g shall also be provided for total load of 100 g.

Samples are conditioned in a water bath at temperature of 25+/−0.1° C. [77+/−0.2° F.]

The time the needle penetrates into the sample is 5+/−0.1 s

In various other embodiments, when the softening point is in the range of 110 to 140° C., the needle penetration values of the copolymers described herein can be defined by the following formula:

$$y \leq -0.000751414552642x^4 + 0.374053308337937x^3 - 69.5967657676062x^2 + 5,734.02599677759x - 176,398.494888882.$$

In the above formula, "y" defines the needle penetration (dmm) of the copolymer and "x" is the softening point (° C.) of the copolymer.

In various embodiments, the copolymers can have a needle penetration of at least 1, 2, 3, 4, 5, 6, 7, 8, 9, 10, 11, 12, 13, 15, 20, 30, or 35 decimillimeters ("dmm") as measured according to ASTM D5 as discussed previously. Additionally or alternatively, the copolymers can have a needle penetration of not more than 75, 73.8, 70, 60, 50, 45, 40, 30, 29, 28, 27, 26, 25, 24, 23, 22, 21, 20, or 15 dmm as measured according to ASTM D5 as discussed previously. Moreover, the copolymers can have a needle penetration in the range of 1 to 75, 2 to 50, 3 to 30, 4 to 29, 5 to 28, 6 to 27, 7 to 26, 8 to 25, 9 to 24, 10 to 23, 11 to 22, 12 to 21, or 13 to 20 dmm as measured according to ASTM D5 as discussed previously.

Depending on their intended end use, the copolymers can have varying softening points and needle penetration ranges. In various embodiments, the copolymers can have a softening point in the range of 90 to 121° C. and needle penetration less than 35 dmm. In other embodiments, the copolymers can have a softening point in the range of 90 to 115° C. and a needle penetration of less than 53 dmm. In various embodiments, the copolymers can have a softening point in the range of 110 to 138° C. and needle penetration in the range of 1 to 15 dmm. Furthermore, in certain embodiments, the copolymers can have a softening point in the range of 110 to 135° C. and needle penetration in the range of 5 to 15 dmm. Moreover, in certain embodiments, the copolymers can have a softening point in the range of 110 to 130 CC and needle penetration in the range of 10 to 15 dmm.

In various embodiments, the copolymers can have a softening point in the range of 110 to 137° C. and needle penetration in the range of 1 to 22 dmm. Furthermore, in certain embodiments, the copolymers can have a softening point in the range of 110 to 135° C. and needle penetration in the range of 5 to 22 dmm. In other embodiments, the copolymers can have a softening point in the range of 110 to 135° C. and needle penetration in the range of 10 to 24 dmm. Moreover, in certain embodiments, the copolymers can have a softening point in the range of 110 to 130° C. and needle penetration in the range of 10 to 20 dmm.

In various embodiments, the copolymers can have a softening point in the range of 110 to 134° C. and needle penetration in the range of 1 to 25 dmm. Furthermore, in certain embodiments, the copolymers can have a softening point in the range of 110 to 132° C. and needle penetration in the range of 5 to 25 dmm. Moreover, in certain embodiments, the copolymers can have a softening point in the range of 110 to 130° C. and needle penetration in the range of 10 to 25 dmm.

In various embodiments, the copolymers can have a softening point in the range of 110 to 124° C. and needle penetration in the range of 1 to 30 dmm. Furthermore, in certain embodiments, the copolymers can have a softening point in the range of 110 to 122° C. and needle penetration in the range of 5 to 30 dmm. Moreover, in certain embodiments, the copolymers can have a softening point in the range of 110 to 120° C. and needle penetration in the range of 10 to 30 dmm.

In various embodiments, the copolymers can have a softening point in the range of 110 to 120° C. and needle penetration in the range of 30 to 50 dmm. Furthermore, in certain embodiments, the copolymers can have a softening point in the range of 110 to 120° C. and needle penetration in the range of 35 to 50 dmm. Moreover, in certain embodiments, the copolymers can have a softening point in the range of 110 to 120° C. and needle penetration in the range of 30 to 45 dmm.

In various embodiments, the copolymers can have a softening point in the range of 90 to 125° C. and needle penetration of less than 30 dmm. Furthermore, in certain embodiments, the copolymers can have a softening point in the range of 90 to 123° C. and needle penetration of less than 35 dmm. Moreover, in certain embodiments, the copolymers can have a softening point in the range of 90 to 125° C. and needle penetration in the range of 10 to 30 dmm.

In various embodiments, the copolymers can have a softening point in the range of 90 to 109.9° C. and needle penetration of less than 73.8 dmm. Furthermore, in certain embodiments, the copolymers can have a softening point in the range of 127 to 140° C. and needle penetration of less than 25 dmm. Moreover, in certain embodiments, the copolymers can have a softening point in the range of 124 to 126 CC and needle penetration of less than 30 dmm.

In various embodiments, the copolymers can have a softening point in the range of 121 to 123° C. and needle penetration of less than 40 dmm. Furthermore, in certain embodiments, the copolymers can have a softening point in the range of 119 to 120° C. and needle penetration of less than 50 dmm. Moreover, in certain embodiments, the copolymers can have a softening point in the range of 116 to 118° C. and needle penetration of less than 60 dmm. In other embodiments, the copolymers can have a softening point in the range of 113 to 117° C. and needle penetration of less than 70 dmm.

Generally, lower softening points in the copolymers can sometimes be accompanied by lower glass transition ("Tg") temperatures. In various embodiments, the copolymers can have a glass transition temperature of at least −100, −80, −60, or −40 and/or not more than about 20, 0, −10, or −20° C. as measured according to DMA. Moreover, the copolymers can have a Tg in the range of −100 to 20° C., −80 to 0° C., −60 to −10° C., or −40 to −20° C. as measured according to DMA.

Furthermore, in various embodiments, the copolymers can have a melt viscosity at 190° C. of at least 100, 500, 1,000, 3,000, or 5,000 and/or not more than about 100,000, 75,000, 50,000, 35,000, or 25,000 cP as measured according to ASTM D3236. Moreover, the copolymers can have a melt viscosity at 190° C. in the range of 100 to 100,000, 500 to 75,000, 1,000 to 50,000, 3,000 to 35,000, or 5,000 to 25,000 cP as measured according to ASTM D3236.

According to one or more embodiments, the copolymers can have a Brookfield viscosity at 190° C. of at least 100, 300, 500, or 750 and/or not more than 30,000, 10,000, 5,000, or 2,500 cps as measured according to ASTM D3236. Moreover, the copolymers can have a Brookfield viscosity at 190° C. in the range of 100 to 30,000, 300 to 10,000, 500 to 5,000, or 750 to 2,500 cps.

In one or more embodiments, the copolymers described herein can also have a number average molecular weight (Mn) of less than 100,000, 50,000, or 25,000 as determined by gel permeation chromatography.

In various embodiments, the copolymers described herein do not exhibit substantial changes in color when subjected to storage conditions at elevated temperatures over extended periods of time. Before any aging due to storage occurs, the inventive copolymers can have an initial Gardner color of less than 4, 3, 2, or 1 as measured according to ASTM D1544. After being heat aged at 177° C. for at least 96 hours, the inventive copolymers can exhibit a final Gardner color of less than 7, 5, 3, or 2 as measured according to ASTM D1544. Thus, the inventive copolymers can retain a desirable color even after prolonged storage and exposure.

Additionally, the copolymers described herein can be amorphous or semi-crystalline. As used herein, "amorphous" means that the copolymers have a crystallinity of less than 5 percent as measured using Differential Scanning Calorimetry ("DSC") according to ASTM E 794-85. As used herein, "semi-crystalline" means that the copolymers have a crystallinity in the range of 5 to 40 percent as measured using DSC according to ASTM E 794-85. In various embodiments, the copolymers can have a crystallinity of not more than 60, 40, 30, 20, 10, 5, 4, 3, 2, or 1 percent as measured using DSC according to ASTM E 794-85.

Low Molecular Weight Propylene-Ethylene Copolymers

In various embodiments of the present invention, the inventive propylene-ethylene copolymers can comprise low molecular weight propylene-ethylene copolymers. These low molecular weight propylene-ethylene copolymers can comprise any of the characteristics and properties described above in regard to the propylene-ethylene copolymers and are described below in greater detail.

In various embodiments of the present invention, a copolymer is provided comprising propylene and ethylene and that has a softening point in the range of 90 to 140° C. Furthermore, the copolymer can have a needle penetration that is equal to y, wherein y is defined by the following formula:

$y \leq -0.000000262249x^6 + 0.000172031278x^5 - 0.046669720165x^4 + 6.701746779438x^3 - 537.286013331959x^2 + 22,802.983472587x - 400,204.018086126$, wherein "x" in the above formula is the softening point of the copolymer. Moreover, the copolymer can have a molecular weight polydispersibility of about 3 to about 25, a crystallinity of about 18 to about 30 percent as measured by X-ray Diffraction, and a Brookfield viscosity of about 1,000 to about 4,000 cP at 190° C. as measured by ASTM D3236.

This inventive low molecular weight copolymer can be utilized to produce polyolefin-based hot melt adhesives for use in the manufacture of laminated items. The adhesive comprising the low molecular weight copolymer may also be used to make personal care hygiene articles such as baby and adult incontinence diapers, pads, and feminine napkins. The hot melt adhesives of this invention yield both a wide process window during manufacturing of laminated structures and high peel strength, despite the low molecular weight of the polyolefin used. The hot melt adhesives of this invention can yield a substantially consistent peel strength for the laminates across the wide process window.

Also, surprisingly, despite the relatively high softening point and crystallinity of the inventive low molecular weight copolymer as opposed to the softening point and crystallinity of comparative polymers, hot melt adhesive composition containing the inventive low molecular weight copolymer can be easily applied at lower temperature. The adhesive formulations containing the inventive low molecular weight copolymer may be applied using various spray nozzles and slot dies at temperatures ranging from about 120 to about 160° C. Other ranges are from about 130 to about 160° C. and from about 130 to about 150° C. and at various machine speeds from 100 to 600 m/min.

Certain properties of the low molecular weight copolymer are measured per the procedures outlined in Examples 14-16. Otherwise, the test methods listed in this specification are utilized.

In various embodiments, the low molecular weight propylene-ethylene copolymer can have a weight average molecular weight (Mw) ranging from about 25,000 to about 50,000. Other exemplary ranges for Mw are from about 30,000 to about 45,000 and about 35,000 to about 40,000. In other embodiments, the number average molecular weight (Mn) of the low molecular weight propylene-ethylene copolymer can range from about 1,000 to about 20,000. Other exemplary ranges are from about 1,500 to about 16,000, about 2,000 to about 15,000, and 2,500 to 14,000. In yet other embodiments, the z-average molecular weight (Mz) of the low molecular weight propylene-ethylene copolymer can range from about 80,000 to about 140,000. Other exemplary ranges for Mz are from about 85,000 to about 130,000, about 90,000 to about 120,000, and about 100,000 to about 120,000. The molecular weights (Mn, Mw, and Mz) of the low molecular weight copolymer can be measured per the procedures outlined in Examples 14-16.

In various embodiments, the polydispersibility (Mw/Mn) of the low molecular weight propylene-ethylene copolymer can range from about 3 to about 25, from about 4 to about 24, from about 5 to about 20, from about 6 to about 15, and from about 8 to about 10. In various embodiments, the low molecular weight propylene-ethylene copolymer can have a polydispersibility of at least 3, 4, 5, 6, 7, or 8 and/or not more than 25, 24, 20, 15, or 10.

In various embodiments, the glass transition (Tg) of the low molecular weight propylene-ethylene copolymer can range from about −45 to about −30° C.

In various embodiments, the melt temperature (Tm) of the low molecular weight propylene-ethylene copolymer can range from about 90 to about 138° C., from about 100 to about 135° C., and from about 120 to about 130° C.

In various embodiments, the melt energy $\Delta Hm$ (J/g) of the low molecular weight propylene-ethylene copolymer can be less than 15 J/g.

In various embodiments, the crystallinity of the low molecular weight propylene-ethylene copolymer can range from about 18 to about 30 percent as measured by X-ray diffraction. Other exemplary ranges of crystallinity include from about 20 to about 30 percent, from about 22 to about 28 percent, and about 22 to about 26 percent.

In various embodiments, the crystallization temperature (Tc) of the low molecular weight propylene-ethylene copolymer can range from about 50 to about 110° C., from about 60 to about 80° C., and from about 50 to about 70° C.

In various embodiments, the crystallization energy ($\Delta Hc$) of the low molecular weight propylene-ethylene copolymer can be less than 20 J/g, less than 15 J/g, or less than 10 J/g.

In various embodiments, the Brookfield Viscosity at 19000 of the low molecular weight propylene-ethylene copolymer can range from about 1,000 cP to about 4,000 cP, from about 1,200 cP to about 3,600 cP, and from about 1,500 cP to about 3,000 cP.

In various embodiments, the storage modulus (G') of the low molecular weight propylene-ethylene copolymer at 25° C. can range from about 1 MPa and 10 MPa, from about 2 MPa to about 8 MPa, and from about 3 MPa to about 5 MPa.

In various embodiments, the tensile strength of the low molecular weight propylene-ethylene copolymer can range from about 2.5 MPa to about 4.5 MPa or from about 2.7 MPa to about 3.5 MPa.

In various embodiments, the G'/G" crossover temperature of the low molecular weight propylene-ethylene copolymer can range from about 100 to about 120° C. or about 105 to about 110° C.

In various embodiments, the tan $\delta$ of the low molecular weight propylene-ethylene copolymer at the crossover temperature can range from about 0.35 to about 0.50 or from about 0.38 to about 0.48.

In various embodiments of the present invention, the low molecular weight propylene-ethylene copolymer has a weight average molecular weight of about 25,000 to about 45,000, a number average molecular weight of about 1,000 to about 12,000, a z-average molecular weight of about 90,000 to about 140,000, a polydispersibility (Mw/Mn) of about 3 to about 25, a crystallinity of about 20% to about 30%, and a Brookfield viscosity of 1,000 to 4,000 cP at 190° C. Additional exemplary characteristics of the low molecular weight propylene-ethylene copolymer for use in the formulations of this invention include storage modulus (G' at 25° C.) of 1 to 10 MPa; a crossover temperature (for G' and G″) of 110 to 120° C. with an associated tan δ of 0.35 to 0.50; and a glass transition of −40 to −25° C.

The Processes for Producing the Propylene-Ethylene Copolymers

In various embodiments, the copolymers can be produced by reacting propylene monomers and ethylene monomers in the presence of a catalyst system comprising at least one electron donor.

In various embodiments, the catalyst system can comprise a Ziegler-Natta catalyst. According to one or more embodiments, the Ziegler-Natta catalyst can contain a titanium-containing component, an aluminum component, and an electron donor. In certain embodiments, the catalyst comprises titanium chloride on a magnesium chloride support.

The catalyst systems, in certain embodiments, can comprise a heterogeneous-supported catalyst system formed from titanium compounds in combination with organoaluminum co-catalysts. In various embodiments, the co-catalyst can comprise an alkyl aluminum co-catalyst ("TEAL").

In one or more embodiments, the catalyst system can have an aluminum to titanium molar ratio of at least 1:1, 5:1, 10:1, or 15:1 and/or not more than 100:1, 50:1, 35:1, or 25:1. Moreover, the catalyst system can have an aluminum to titanium molar ratio in the range of 1:1 to 100:1, 5:1 to 50:1, 10:1 to 35:1, or 15:1 to 25:1. Additionally or alternatively, in various embodiments, the catalyst system can have a molar ratio of aluminum to silicon of at least 0.5:1, 1:1, 2:1, 3:1, 4:1, 5:1, or 6:1 and/or not more than 100:1, 50:1, 35:1, 20:1, 15:1, 10:1, or 8:1. Moreover, the catalyst system can have a molar ratio of aluminum to silicon in the range of 0.5:1 to 100:1, 1:1 to 50:1, 2:1 to 35:1, 2:1 to 20:1, 2:1 to 15:1, 2:1 to 10:1, or 2:1 to 8:1.

Electron donors are capable of increasing the copolymer's stereospecificity. However, it can be important to closely regulate the contents of the electron donors since they can suppress catalyst activity to unacceptable levels in some circumstances. The electron donors used during the polymerization process can include, for example, organic esters, ethers, alcohols, amines, ketones, phenols, phosphines, and/or organosilanes. Furthermore, the catalyst system can comprise internal donors and/or external donors.

In various embodiments, the catalyst system comprises at least one external electron donor. In one or more embodiments, the external electron donor comprises at least one alkoxy silane. In particular, in certain embodiments, the alkoxy silane can comprise dicyclopentyldimethoxysilane, cyclohexylmethyldimethoxysilane, or a combination thereof. Moreover, in some embodiments, the alkoxy silane can comprise, consist essentially of, or consist entirely of dicyclopentyldimethoxysilane.

It has been observed that the addition of the above external donors to the catalyst system can increase the hardness (i.e., decrease the needle penetration) and viscosities of the copolymers. However, contrary to what has been previously observed in the art, the electron donors described above can actually lower the softening points of the produced copolymers instead of increasing it. Furthermore, it has been observed that substantially all (i.e., greater than 95 percent) of the ethylene added to the reactor during the polymerization process can react when the above electron donors are used. Thus, this can result in copolymers having higher ethylene contents and lower propylene contents. Consequently, when using the above electron donors, propylene-ethylene copolymers can be produced that have higher ethylene contents, but still exhibit desired balances between softening point and hardness.

In addition, according to various embodiments, the catalyst system can have a molar ratio of electron donor to titanium of at least 0.1:1, 0.5:1, 1:1, 1.25:1, 1.5:1, or 2:1 and/or not more than 20:1, 15:1, 10:1, 5:1, 4.5:1, or 4:1. Moreover, the catalyst system can have a molar ratio of electron donor to titanium in the range of 0.1:1 to 20:1, 0.5:1 to 15:1, 1:1 to 10:1, 1.25:1 to 5:1, 1.5:1 to 4.5:1, or 2:1 to 4:1. Additionally or alternatively, in various embodiments, the catalyst system can comprise a molar ratio of TEAL co-catalyst to the electron donor of at least 0.5:1, 1:1, 2:1, 3:1, 4:1, 5:1, or 6:1 and/or not more than 100:1, 50:1, 35:1, 20:1, 15:1, 10:1, or 8:1. Moreover, the catalyst system can comprise a molar ratio of TEAL co-catalyst to the electron donor in the range of 0.5:1 to 100:1, 1:1 to 50:1, 2:1 to 35:1, 2:1 to 20:1, 2:1 to 15:1, 2:1 to 10:1, or 2:1 to 8:1. In certain embodiments, the type of electron donor can influence the necessary TEAL/electron donor ratio. For instance, in embodiments where the electron donor is dicyclopentyldimethoxysilane, the TEAL/electron donor ratio can be less than 20:1.

The catalyst system can exhibit a catalyst activity in the range of 200 to 2,000, 400 to 1,200, or 500 to 1,000 g/g. Catalyst activity is calculated by measuring the ratio of the weight the polymer made in the reactor to the weight of the catalyst charged into the reactor. These measurements are based on a reaction time of one hour.

Since the addition of external donors can increase viscosity and molecular weight, the addition of hydrogen can be required to act as a chain terminator during polymerization. For example, the process can be carried out at a hydrogen pressure in the range of 5 to 100, 10 to 80, or 15 to 50 psig.

In various embodiments, the polymerization reaction can occur at a temperature in the range of 100 to 200, 110 to 180, or 120 to 150° C. Furthermore, the polymerization reaction can be carried out a pressure in the range of 500 to 2,000, 700 to 1,500, or 800 to 1,250 psig.

In certain embodiments, the reactor can comprise a stirred reactor and the polymerization reaction can have a residence time in the reactor in the range of 0.1 to 6, 0.5 to 4, or 1 to 2 hours. In various embodiments, the ethylene can be added to the reactor as a gas and the propylene can be added as a liquid.

End Products Incorporating the Propylene-Ethylene Copolymers

The inventive propylene-ethylene copolymers described herein and compositions comprising these copolymers can be utilized in a wide array of applications including, for example, adhesives, sealants, caulks, roofing membranes, waterproof membranes and underlayments, carpet, laminates, laminated articles, tapes (e.g., tamper evident tapes, water activated tapes, gummed tape, sealing tape, scrim reinforced tape, veneer tape, reinforced and non-reinforced gummed paper tape, box makers tape, paper tape, packaging tape, HVAC duct tape, masking tape, invisible tape, electrical tape, gaffer tape, hockey tape, medical tape, etc.), labels (e.g., general purpose label, beverage label, freezer label, smart label, consumer electronics etc.), mastics, polymer blends, wire coatings, molded articles, heat seal coatings, disposable hygiene articles, insulating glass (IG) units, bridge decking, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, candles, windows, films, gaskets, seals, o-rings, motor vehicle molded parts, motor vehicle extruded parts, clothing articles, rubber additive/processing aids, and fibers.

Films comprising the inventive propylene-ethylene copolymer described herein and compositions comprising these copolymers include, but are not limited to, multilayer films, coextruded films, calendared films, and cast films. Laminates comprising the inventive propylene-ethylene polymer or compositions comprising the inventive propylene-ethylene polymer include, but are not limited to, paper-foil laminates, paper-film laminates, and nonwoven-film laminates.

Adhesive compositions comprising the inventive propylene-ethylene copolymer described herein and compositions comprising these copolymers include packaging adhesives, food contact grade adhesives, indirect food contact packaging adhesives, product assembly adhesives, woodworking adhesives, flooring adhesives, automotive assembly adhesives, structural adhesives, mattress adhesives, pressure sensitive adhesives (PSA), PSA tapes, PSA labels, PSA protective films, self-adhesive films, laminating adhesives, flexible packaging adhesives, heat seal adhesives, industrial adhesives, hygiene nonwoven construction adhesives, hygiene core integrity adhesives, and hygiene elastic attachment adhesives.

In certain embodiments, the copolymers described herein can be utilized in adhesives, such as, for example, hot melt adhesives, water based adhesives, solvent-based adhesives, hot melt pressure-sensitive adhesives, solvent-based pressure-sensitive adhesives, hot melt nonwoven/hygiene adhesives, hot melt product assembly adhesives, hot melt wood working adhesives, and hot melt packaging adhesives. In particular, due to their unique combination of softening point and needle penetration as previously described, adhesives produced from the inventive copolymers can be utilized in a vast array of end products, including hygienic packaging and other packaging applications. In many embodiments, the various properties of the inventive copolymers, such as softening point and needle penetration, can be selected to suit the intended end use of the composition incorporating the copolymers.

In certain embodiments, the inventive copolymers can be used to produce adhesives useful for packaging, product assembly, film laminating, wood working, and/or profile wrapping.

In various embodiments, the adhesives of the present invention comprise hot melt adhesives. Hot melt adhesives can be applied to a substrate while in its molten state and cooled to harden the adhesive layer. Such adhesives are widely used for various commercial and industrial applications such as product assembly and packaging. In these applications, adhesive is applied to at least one substrate for binding the substrate to a second similar or different substrate.

Adhesive formulators and users generally want thermally stable, low color hot melt adhesives with favorable balance of physical properties, including temperature resistance, chemical resistance, cohesive strength, viscosity, adhesion to a variety of substrates, and open and set times that can be tailored to the particular use and application conditions. The balance of desired properties varies with the application, and the inventive hot melt compositions described herein provide an improved balance of properties for multiple end uses.

The hot melt adhesive compositions can have melt rheology and thermal stability suitable for use with conventional hot melt adhesive application equipment. In various embodiments, the blended components of the hot melt adhesive compositions have low melt viscosity at the application temperature, thereby facilitating flow of the compositions through a coating apparatus, e.g., coating die or nozzle.

The hot melt adhesive composition is useful for bonding a variety of substrates including, e.g., cardboard, coated cardboard, paperboard, fiber board, virgin and recycled kraft, high and low density kraft, chipboard, treated and coated kraft and chipboard, and corrugated versions of the same, clay coated chipboard carton stock, composites, leather, polymer film (e.g., polyolefin films (e.g., polyethylene and polypropylene), polyvinylidene chloride films, ethylene vinyl acetate films, polyester films, metalized polymer film, multi-layer film, and combinations thereof), fibers and substrates made from fibers (e.g., virgin fibers, recycled fibers, synthetic polymer fibers, cellulose fibers, and combinations thereof), release liners, porous substrates (e.g., woven webs, nonwoven webs, nonwoven scrims, and perforated films), cellulose substrates, sheets (e.g., paper, and fiber sheets), paper products, tape backings, and combinations thereof. Useful composites include, e.g., chipboard laminated to metal foil (e.g., aluminum foil), which optionally can be laminated to at least one layer of polymer film, chipboard bonded to film, Kraft bonded to film (e.g., polyethylene film), and combinations thereof.

The hot melt adhesive composition is useful in bonding a first substrate to a second substrate in a variety of applications and constructions including, e.g., packaging, bags, boxes, cartons, cases, trays, multi-wall bags, articles that include attachments (e.g., straws attached to drink boxes), ream wrap, cigarettes (e.g., plug wrap), filters (e.g., pleated filters and filter frames), bookbinding, footwear, disposable absorbent articles (e.g., disposable diapers, sanitary napkins, medical dressings (e.g., wound care products), bandages, surgical pads, drapes, gowns, and meat-packing products), paper products including, e.g., paper towels (e.g., multiple use towels), toilet paper, facial tissue, wipes, tissues, towels (e.g., paper towels), sheets, mattress covers, and components of absorbent articles including, e.g., an absorbent element, absorbent cores, impermeable layers (e.g., backsheets), tissue (e.g., wrapping tissue), acquisition layers and woven and nonwoven web layers (e.g., top sheets, absorbent tissue), and combinations thereof.

The hot melt adhesive composition is also useful in forming laminates of porous substrates and polymer films such as those used in the manufacture of disposable articles including, e.g., medical drapes, medical gowns, sheets, feminine hygiene articles, diapers, adult incontinence articles, absorbent pads for animals (e.g., pet pads) and humans (e.g., bodies and corpses), and combinations thereof.

The hot melt adhesive composition can be applied to a substrate in any useful form including, e.g., as fibers, as a coating (e.g., a continuous coatings and discontinuous coatings (e.g., random, pattern, and array)), as a bead, as a film (e.g., a continuous films and discontinuous films), and combinations thereof, using any suitable application method including, e.g., slot coating, spray coating (e.g., spiral spray, random spraying, and random fiberization (e.g., melt blowing)), foaming, extrusion (e.g., applying a bead, fine line extrusion, single screw extrusion, and twin screw extrusion), wheel application, noncontact coating, contacting coating, gravure, engraved roller, roll coating, transfer coating, screen printing, flexographic, and combinations thereof.

Typical, but non-limiting, industrial applications of the hot melt adhesive compositions include packaging, particularly for low temperature uses such as for dairy products or for freezer packaging of food products, and in sanitary disposable consumer articles, for example, diapers, feminine care pads, napkins, etc. Traditional end use applications such as book-binding, wood working and labeling will also benefit from both the low temperature flexibility, heat resistance, and the efficiency of end use in automated means of applying the hot melt adhesive compositions to various substrates.

Furthermore, in various embodiments, the inventive copolymers described herein can also be used to modify existing polymer blends that are typically utilized in plastics, elastomeric applications, roofing applications, cable filling, and tire modifications. The inventive copolymers can improve the adhesion, processability, stability, viscoelasticity, thermal properties, and mechanical properties of these polymer blends.

In various embodiments, the inventive propylene-ethylene copolymers can be modified to produce graft copolymers. In such embodiments, the inventive copolymers can be grafted with maleic anhydride, fumarate and maleate esters, methacrylate esters (e.g., glycidyl methacrylate and hydroxethyl methacrylate), methacrylic acid, vinyl derivatives, silane derivatives, or combinations thereof. These graft copolymers can be produced using any conventional process known in the art including, for example, transesterification and free radical induced coupling.

The various end uses and end products noted above can utilize the inventive copolymer by itself or can combine it with other additives and polymers. Suitable polymers that can be combined with the inventive copolymers to form a polymer blend may include, for example, isoprene-based block copolymers; butadiene-based block copolymers; hydrogenated block copolymers; ethylene vinyl acetate copolymers; polyesters; polyester-based copolymers; neoprenes; urethanes; acrylics; polyacrylates; acrylate copolymers, such as, but not limited to, ethylene acrylic acid copolymer, ethylene n-butyl acrylate copolymers, and ethylene methyl acrylate copolymers; polyether ether ketones; polyamides; styrenic block copolymers; hydrogenated styrenic block copolymers; random styrenic copolymers; ethylene-propylene rubbers; ethylene vinyl acetate copolymers; butyl rubbers; styrene butadiene rubbers; butadiene acrylonitrile rubbers; natural rubbers; polyisoprenes; polyisobutylenes; polyvinyl acetates; and polyolefins.

Polyolefins used with the inventive propylene-ethylene copolymers in this invention can be any that is known in the art. In one embodiment of the invention, the polyolefins can be at least one selected from the group consisting of amorphous polyolefins, semi-crystalline polyolefins, alpha-polyolefins, reactor-ready polyolefins, metallocene-catalyzed polyolefin polymers and elastomers, reactor-made thermoplastic polyolefin elastomers, olefin block copolymers, thermoplastic polyolefins, atactic polypropylene, polyethylenes, ethylene-propylene polymers, propylene-hexene polymers, ethylene-butene polymers, ethylene-octene polymers, propylene-butene polymers, propylene-octene polymers, metallocene-catalyzed polypropylene polymers, metallocene-catalyzed polyethylene polymers, propylene-based terpolymers including ethylene-propylene-butylene terpolymers, copolymers produced from propylene and linear or branched $C_4$-$C_{10}$ alpha-olefin monomers, copolymers produced from ethylene and linear or branched $C_4$-$C_{10}$ alpha-olefin monomers, and functionalized polyolefins.

Multiple methods exist in the art for functionalizing polymers that may be used with the polymers described here. These include selective oxidation, free radical grafting, ozonolysis, epoxidation, and the like. Functionalized components include, but are not limited to, functionalized olefin polymers, (such as functionalized $C_2$ to $C_{40}$ homopolymers, functionalized $C_2$ to $C_{40}$ copolymers, functionalized higher Mw waxes), functionalized oligomers (such as functionalized low Mw waxes, functionalized tackifiers), beta nucleating agents, and combinations thereof. Functionalized olefin polymers and copolymers useful in this invention include maleated polyethylene, maleated metallocene polyethylene, maleated metallocene polypropylene, maleated ethylene propylene rubber, maleated polypropylene, maleated ethylene copolymers, functionalized polyisobutylene (typically functionalized with maleic anhydride typically to form a succinic anhydride), and the like.

In various embodiments, the inventive propylene-ethylene copolymers described herein can be used to produce a hot melt adhesive. According to one or more embodiments, the adhesives can comprise at least 1, 5, 10, 15, 20, 25, 30, 35, 40, or 45 and/or not more than 95, 90, 80, 70, 60, 55, 50, 45, 40, 35, 30, 25, 20, 15, or 10 weight percent of the inventive copolymer. Moreover, the adhesives can comprise in the range of 1 to 95, 5 to 90, 10 to 80, 20 to 70, 30 to 60, or 40 to 55 weight percent of the inventive copolymers. In certain embodiments, the adhesive can be entirely comprised of the inventive copolymer.

Furthermore, depending on the intended end use, these hot melt adhesives can also comprise various additives including, for example, polymers, tackifiers, processing oils, waxes, antioxidants, plasticizers, pigments, and fillers.

In various embodiments, the adhesives can comprise at least 10, 20, 30, or 40 and/or not more than 90, 80, 70, or 55 weight percent of at least one polymer that is different from the inventive copolymers. Moreover, the adhesives can comprise in the range of 10 to 90, 20 to 80, 30 to 70, or 40 to 55 weight percent of at least one polymer that is different from the inventive copolymers. These polymers can include any of the polymers listed above.

Furthermore, it has been discovered that blends of the inventive copolymers with various types of polyolefins may provide adhesives with improved adhesion, cohesive strength, temperature resistance, viscosity, and open and set times. Thus, in various embodiments, the above-described polymers that may be combined with the inventive propylene-ethylene copolymers can comprise at least one polyolefin. In certain embodiments, the adhesives can comprise at least 1, 5, 10, 15, 20, 25, 30, 35, 40, 45, or 50 weight percent of at least one polyolefin in addition to the above-described propylene-ethylene copolymer. Additionally or alternatively, the adhesives can comprise not more than 99, 95, 90, 85, 80, 75, 70, 65, 60, 55, 50, 45, 40, 35, 30, 25, 20, 15, 10, or 5 weight percent of at least one polyolefin in addition to the above-described propylene-ethylene copolymer. For example, the adhesives can comprise in the range of 1 to 90, 1 to 60, 1 to 40, 1 to 20, 10 to 90, 20 to 80, 20 to 40, 30 to 70, 30 to 40, or 40 to 55 weight percent of at least one polyolefin. In one or more embodiments, these polyolefins can be amorphous polyolefins having a heat of fusion less than 25 J/g or less than 15 J/g.

Commercial examples of acceptable amorphous polyolefins include Aerafin™ 17 by Eastman Chemical; Aerafin™ 180 by Eastman Chemical, Rextac™ polymers made by REXtac LLC including Rextac™ E-63, E-65, 2760, 2815, and 2830; Vestoplast®, including Vestoplast® 408 and 708; and Eastoflex® by Eastman Chemical, including Eastoflex® E1060 and P1010.

Some examples of metallocene-catalyzed polymers include polyolefins such as polyethylene, polypropylene, and copolymers thereof such as polypropylene-based elastomers sold by ExxonMobil Chemical under the trade name VISTAMAXX™ and polyethylene-based elastomers such as those sold by Dow Chemical Company under the trade names AFFINITY™ and ENGAGE™. Other metallocene-catalyzed polymers include the polyolefin elastomers VISTAMAXX™ 8816, VISTAMAXX™ 2230, and ENGAGE™ 8200. AFFINITY™ GA 1900 has a density of 0.870 g/cm3 according to ASTM D792, a heat of fusion of 46.1 J/g, and a Brookfield viscosity of 8,200 cP at 177° C. according to ASTM D1084. AFFINITY™ GA 1950 has a density of 0.874 g/cm3 according to ASTM D792, a heat of fusion of 53.4 J/g, and a Brookfield viscosity of 17,000 cP at 177° C. according to ASTM D1084. ENGAGE™ 8200 has a density of 0.87 g/cm3 according to ASTM D792 and a melt index of 5 g/10 min at 190° C. These polyolefin elastomers are compatible with the inventive copolymers when used in hot melt adhesives.

In one embodiment of the invention, the inventive propylene-ethylene copolymer can be utilized with at least one high propylene-content polymer to produce compositions useful as adhesives. As used herein, high-propylene content polymer are polymers comprising at least 60 mole percent propylene monomer. In other embodiments of the invention, the high-propylene content polymers comprise at least 65, 70, 75, 80, 85, 90, 95 mol % propylene monomer. In another embodiment, the high-propylene content polymer is a homopolymer of propylene. High-propylene polymers can be any that is known in the art including homopolymer, copolymer, terpolymers, and propylene waxes. Other monomers utilized include linear or branched $C_2$-$C_{20}$ olefins. "Wax" as used in this disclosure is defined as a polymer or an oligomer having a heat of fusion greater than 50 Joules per gram and a viscosity no greater than 750 centipoise (CP) at 190° C.

Examples of high propylene-content polymers include, but are not limited to, propylene homopolymers; metallocene-catalyzed polypropylenes; propylene-ethylene copolymers; metallocene-catalyzed propylene-ethylene copolymers; copolymers of propylene and a linear or branched $C_4$ to $C_{20}$ olefin; a metallocene-catalyzed copolymer of propylene and a linear or branched $C_4$ to $C_{20}$ olefin, terpolymers of propylene, ethylene, and a $C_4$ to $C_{20}$ olefin; propylene waxes, terpolymers formed from ethylene, propylene, and a diene (EPDM), or a combination thereof.

Suitable high propylene-content polymers are commercially available under a variety of trade designations including but not limited to, e.g., the L-MODU series of trade designations sold by Idemitsu Kosan Co., Ltd (Japan) including, e.g., L-MODU™ S400, S600, and S900, the VISTAMAXX™ series and ACHIEVE™ series of trade designations sold by ExxonMobil Chemical Company (Houston, Tex.) including, e.g., VISTAMAXX™ 8880 and ACHIEVE™ 6936; also the polymers LICOCENE™ 2602 and 6502 sold by Clariant Int'l Ltd. (Muttenz, Switzerland), and EASTMAN G-3015 by Eastman Chemical Company. Examples of suitable high polypropylene-content waxes are commercially available under a variety of trade designations including but not limited to, e.g., EPOLENE N15 from Westlake Chemical Corporation (Houston, Tex.), HONEYWELL A-C® 1089 and A-C® 596 from Honeywell Int'l Inc. (Morristown, N.J.), and LICOCENE™ 6102 and MA6252 from Clariant.

In various embodiments, olefin polymers include a mixture of at least two different olefin polymers, e.g., a blend that includes an olefin homopolymer and an olefin copolymer, a blend that includes different olefin homopolymers of the same or different monomer, a blend that includes different olefin copolymers, and various combinations thereof. Useful olefin polymers also include, e.g., modified, unmodified, grafted, and ungrafted olefin polymers, uni-modal olefin polymers, multi-modal olefin polymers, and combinations thereof.

In various embodiments of the invention, the propylene polymer preferably includes at least 50 mole %, at least about 60 mole %, at least about 70 mole %, at least about 80 mole %, at least about 90 mole %, at least about 95 mole %, or even from about 50 mole % to about 100 mole % propylene.

The propylene polymer optionally includes at least 2 mole %, at least about 5 mole %, at least about 10 mole %, at least about 20 mole %, at least about 30 mole %, no greater than about 50 mole %, or even from about 20 mole % to about 50 mole % of at least one alpha-olefin co-monomer.

In various embodiments, these added polyolefins can increase the cohesive strength, adhesion properties, tackiness, low temperature flexibility, total crystallinity, and/or temperature resistance of the inventive adhesives. Furthermore, the addition of the aforementioned polyolefins may decrease the production costs of the adhesives due to their widespread availability.

In certain embodiments, the adhesives can comprise the above-described propylene-ethylene copolymer and a metallocene-catalyzed polyethylene copolymer, e.g. an ethylene-octene copolymer. In such embodiments, the inventive propylene-ethylene copolymer can be used to replace the polyethylene in various types of adhesives, such as those used for packaging applications.

In certain embodiments, the added polymer and/or polyolefin can be functionalized with groups including, but not limited to, silanes, acid anhydride such as maleic anhydride, hydroxyl, ethoxy, epoxy, siloxane, amine, aminesiloxane, carboxy, and acrylates, at the polymer chain ends and/or pendant positions within the polymer.

The additional polymers and polyolefins that can be added to the inventive adhesives may be prepared by a Ziegler-Natta catalyst, a single site catalyst (metallocene), multiple single site catalysts, non-metallocene heteroaryl catalysts, combinations thereof, or another polymerization means. The additional polymers may comprise a combination of amorphous, semi-crystalline, random, branched, linear, or blocky structures.

Any conventional polymerization synthesis processes may prepare the additional polyolefin components. In one or more embodiments, one or more catalysts, which are typically metallocene catalysts or Zeigler-Natta, catalysts, are used for polymerization of an olefin monomer or monomer mixture. Polymerization methods include high pressure, slurry, gas, bulk, suspension, supercritical, or solution phase, or a combination thereof. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. In one or more embodiments, the additional polymer is produced in a single or multiple polymerization zones using a single polymerization catalyst. Metallocene (or heterophase) polymers are typically made using multiple metallocene catalyst blends that obtain the desired heterophase structure.

In various embodiments, the crystalline content of the added polymers or polyolefins can increase the cohesive strength of the adhesives. Generally, adhesive formulations based on metallocene polymerized semicrystalline copolymers can eventually build sufficient crystalline content over time to achieve good cohesive strength in the formulation.

In various embodiments, the adhesives can comprise at least 10, 20, 30, or 40 and/or not more than 90, 80, 70, 55, 50, 45, or 40 weight percent of at least one tackifier. Moreover, the adhesives can comprise in the range of 10 to 90, 20 to 80, 20 to 40, 20 to 30, 30 to 70, or 40 to 55 weight percent of at least one tackifier. The tackifier gives tack to the adhesive and may also lower the viscosity of the adhesive. Lower viscosity can improve application flow characteristics, allowing for easier processing, lower energy requirements, and lower processing temperatures. Lower viscosity also helps the adhesive to "wet out," or to substantially uniformly coat the surface and penetrate the substrate. Tack is required in most adhesive formulations to allow for proper joining of articles prior to solidification of the hot melt adhesive. The desirability and selection of the particular tackifying agent can depend upon the specific types of olefin copolymer and additional polymers employed.

Suitable tackifiers can include, for example, cycloaliphatic hydrocarbon resins, $C_5$ hydrocarbon resins; $C_5/C_9$ hydrocarbon resins; aromatically-modified $C_5$ resins; $C_9$ hydrocarbon resins; pure monomer resins such as copolymers or styrene with alpha-methyl styrene, vinyl toluene, para-methyl styrene, indene, methyl indene, $C_5$ resins, and $C_9$ resins; terpene resins; terpene phenolic resins; terpene styrene resins; rosin esters; modified rosin esters; liquid resins of fully or partially hydrogenated rosins; fully or partially hydrogenated rosin esters; fully or partially hydrogenated modified rosin resins; fully or partially hydrogenated rosin alcohols; fully or partially hydrogenated $C_5$ resins; fully or partially hydrogenated $C_5/C_9$ resins; fully or partially hydrogenated aromatically-modified $C_5$ resins; fully or partially hydrogenated $C_9$ resins; fully or partially hydrogenated pure monomer resins; fully or partially hydrogenated $C_5$/cycloaliphatic resins; fully or partially hydrogenated $C_5$/cycloaliphatic/styrene/$C_9$ resins; fully or partially hydrogenated cycloaliphatic resins; and combinations thereof. Exemplary commercial hydrocarbon resins include Regalite™ hydrocarbon resins (Eastman Chemical). In certain embodiments, the tackifiers can comprise functionalized tackifiers.

In various embodiments, the adhesives can comprise at least 1, 2, 5, 8, or 10 and/or not more than 40, 30, 25, 20, or 15 weight percent of at least one processing oil. Moreover, the adhesives can comprise in the range of 2 to 40, 5 to 30, 8 to 25, or 10 to 20 weight percent of at least one processing oil. Processing oils can include, for example, mineral oils, naphthenic oils, paraffinic oils, aromatic oils, castor oils, rape seed oil, triglyceride oils, or combinations thereof. As one skilled in the art would appreciate, processing oils may also include extender oils, which are commonly used in adhesives. The use of oils in the adhesives may be desirable if the adhesive is to be used as a pressure-sensitive adhesive to produce tapes or labels or as an adhesive to adhere nonwoven articles. In certain embodiments, the adhesive may not comprise any processing oils.

In various embodiments, the adhesives can comprise at least 1, 2, 5, 8, or 10 and/or not more than 40, 30, 25, 20, or 15 weight percent of at least one wax. Moreover, the adhesives can comprise in the range of 1 to 40, 5 to 30, 8 to 25, or 10 to 20 weight percent of at least one wax. Waxes serve to reduce the overall viscosity of the adhesive, thereby allowing it to liquefy and allowing for the proper application or coating of the hot melt adhesive onto an intended substrate. The type and melting point of a wax, and its compatibility with other components of the adhesive composition, control the open time and setting speed of the adhesive. Open time is known in the art as being the amount of time for an adhesive to wet out and bond to a substrate after application. Any conventionally known wax, which is suitable for use in formulating hot melt adhesives, may be used in the practice of the invention.

In one embodiment of the invention, when the inventive propylene-ethylene copolymer is utilized with a propylene polymer, which is a propylene wax, no other wax may be required.

Suitable waxes can include, for example, microcrystalline wax, paraffin wax, waxes produced by Fischer-Tropsch processes, functionalized waxes (maleated, fumerated, or wax with functional groups etc.), polyolefin waxes, petroleum waxes, polypropylene waxes, polyethylene waxes, ethylene vinyl acetate waxes, and vegetable waxes. The use of waxes in the adhesives may be desirable if the adhesive is to be used as a hot melt packaging adhesive.

Non-limiting examples of commercially available waxes that are suitable for this invention include Sasol® H-1, available from Sasol Wax Americas, Inc.; A-CT™-9 and A-C 810, available from Honeywell International Inc.; EPOLENE™ N-15 available from Eastman Chemical; and POLYWAX™ 400, 850, 1000, and 3000 from Baker Hughes Inc.

Other exemplary waxes include, but are not limited to, Evonik Licocene™ PE4201; Westlake EPOLENE™ C-10, EPOLENE™ C-17 and EPOLENE™ C-18; and microcrystalline wax Be Square™ 195.

As used herein, "functionalized" is meant that the component is either prepared in the presence of a functional group that is incorporated into the component or is contacted with a functional group, and, optionally, a catalyst, heat, initiator, or free radical source to cause all or part of the functional group (such as maleic acid or maleic anhydride) to incorporate, graft, bond to, physically attach to, and/or chemically attach to the polymer.

Exemplary functionalized waxes polymers useful as functionalized components include those modified with an alcohol, an acid, a ketone, an anhydride, and the like. Commercial functionalized waxes include maleated polypropylene was available from Chusei under the tradename MAPP 40; maleated metallocene waxes (such as TP LICOCENE PP1602 available from Clariant); maleated polyethylene waxes and maleated polypropylene waxes available from Westlake under the tradenames EPOLENE C-16, EPOLENE C-18, EPOLENE E43; EASTMAN G-3003 from Eastman Chemical; maleated polypropylene wax LICOMONT AR 504 available from Clariant; grafted functional polymers available from Dow Chemical Co. under the tradenames AMPLIFY EA 100, AMPLIFY EA 102, AMPLIFY 103, AMPLIFY GR 202, AMPLIFY GR 205, AMPLIFYGR 207, AMPLIFY GR 208, AMPLIFY GR 209, and AMPLIFY VA 200; and CERAMER maleated ethylene polymers available from Baker Hughes under the tradenames CERAMER 1608, CERAMER 1251, CERAMER 67, and CERAMER 24. Useful waxes also include polyethylene and polypropylene waxes having an Mw of 15,000 of less, preferably from 3,000 to 10,000, and a crystallinity of 5 wt % or more, preferably 10 weight percent or more, having a functional group content of up to 10 weight percent. Additional functionalized polymers that may be used as functional components include A-C 575P, A-C 573P, A-C X596A, A-C X596P, A-C X597A, A-C X597P, A-C X950P, A-C X1221, A-C 395A, A-C 395A, A-C 1302P, A-C 540, A-C 54A, A-C 629, A-C 629A, A-C 307, and A-C 307A available from Honeywell International Inc.

In certain embodiments, the adhesive may not comprise a wax. For instance, the adhesive may comprise less than 10, 5, 4, 3, 2, or 1 weight percent of a wax such as, but not limited to, a polyethylene wax and/or a Fischer Tropsch wax.

In various embodiments, the adhesives can comprise at least 0.1, 0.2, 0.5, 1, 2, or 3 and/or not more than 20, 10, 8, 5, 1, or 0.5 weight percent of at least one antioxidant. Moreover, the adhesives can comprise in the range of 0.1 to 20, 1 to 10, 2 to 8, or 3 to 5 weight percent of at least one antioxidant.

In various embodiments, the adhesives can comprise at least 0.5, 1, 2, or 3 and/or not more than 20, 10, 8, or 5 weight percent of at least one plasticizer. Moreover, the adhesives can comprise in the range of 0.5 to 20, 1 to 10, 2 to 8, or 3 to 5 weight percent of at least one plasticizer. Suitable plasticizers can include, for example, olefin oligomers, low molecular weight polyolefins such as liquid polybutylene, polyisobutylene, mineral oils, dibutyl phthalate, dioctyl phthalate, chlorinated paraffins, and phthalate-free plasticizers. Commercial plasticizers can include, for example, Benzoflex™ plasticizers (Eastman Chemical); Eastman 168™ (Eastman Chemical); Oppanol® B10 (BASF); REGALREZ 1018 (Eastman Chemical); Calsol 5550 (Calumet Lubricants); Kaydol oil (Chevron); or ParaLux oil (Chevron).

In various embodiments, the adhesives can comprise at least 10, 20, 30, or 40 and/or not more than 90, 80, 70, or 55 weight percent of at least one filler. Moreover, the adhesives can comprise in the range of 1 to 90, 20 to 80, 30 to 70, or 40 to 55 weight percent of at least one filler. Suitable fillers can include, for example, carbon black, calcium carbonate, clay, titanium oxide, zinc oxide, or combinations thereof.

The adhesive compositions can be produced using conventional techniques and equipment. For example, the components of the adhesive composition may be blended in a mixer such as a sigma blade mixer, a plasticorder, a brabender mixer, a twin screw extruder, or an in-can blend (pint-cans). In various embodiments, the adhesive may be shaped into a desired form, such as a tape or sheet, by an appropriate technique including, for example, extrusion, compression molding, calendaring or roll coating techniques (e.g., gravure, reverse roll, etc.), curtain coating, slot-die coating, or spray coating.

Furthermore, the adhesive may be applied to a substrate by solvent casting processes or by melting the adhesive and then using conventional hot melt adhesive application equipment known in the art. Suitable substrates can include, for example, nonwoven, textile fabric, paper, glass, plastic, films (Polyethylene, Polypropylene, Polyester etc.), and metal. Generally, about 0.1 to 100 g/m² of the adhesive composition can be applied to a substrate.

According to one or more embodiments, the hot melt adhesives can have a Brookfield viscosity at 177° C. of at least 100, 300, 500, 750, or 1,000 and/or not more than 30,000, 10,000, 5,000, 4,000, 3,000, or 2,500 cps as measured according to ASTM D3236. Moreover, the hot melt adhesives can have a Brookfield viscosity at 177° C. in the range of 100 to 30,000, 300 to 10,000, 500 to 5,000, or 750 to 2,500 cps. Additionally or alternatively, the hot melt adhesives can have a loop tack of 0.1, 0.5, 1, or 1.5 and/or not more than 20, 15, 10, or 5 lbf as measured according to ASTM D6195. Moreover, the hot melt adhesives can have a loop tack in the range of 0.1 to 20, 0.5 to 15, 1 to 10, or 1.5 to 5 lbf as measured according to ASTM D6195.

Furthermore, in various embodiments, the hot melt adhesives can have a peel strength of at least 1, 2, 5, 10, or 15 and/or not more than 50, 40, 35, 30, or 25 g/mm as measured according to ASTM D903. Moreover, the hot melt adhesives can have a peel strength in the range of 1 to 50, 2 to 40, 5 to 35, 10 to 30, or 15 to 25 g/mm as measured according to ASTM D903. Additionally or alternatively, the hot melt adhesives can have a 90° peel strength of at least 0.05, 0.1, 0.2, or 0.5 and/or not more than 20, 10, 5, or 1 lbf/inch as measured according to ASTM D903. Moreover, the hot melt adhesives can have a 90° peel strength in the range of 0.05 to 20, 0.1 to 10, 0.2 to 5, or 0.5 to 1 lbf/inch as measured according to ASTM D903.

According to various embodiments, the adhesives containing the inventive copolymers can have a broad operating window and may have an application window from 80 to 230° C. This broad operating window can be demonstrated by the peel strengths of the adhesives at different temperatures. For instance, the add-on level can be from 0.5-30 gsm. In one or more embodiments, the hot melt adhesives can have a peel strength for samples applied at lower temperature (such as 100 to 145° C.) of at least 2, 5, 25, or 40 and/or not more than 250, 200, or 175 g/mm as measured according to ASTM D903. Moreover, the hot melt adhesives can have a peel strength for samples applied at lower temperature (such as 100 to 145° C.) in the range of 2 to 250, 25 to 200, or 40 to 175 g/mm as measured according to ASTM D903. Additionally or alternatively, the hot melt adhesives can have a peel strength at for samples applied at higher temperature (such as 145 to 180° C.) of at least 1, 5, 30, or 40 and/or not more than 250, 200, or 150 g/mm as measured according to ASTM D903. Moreover, the hot melt adhesives can have a peel strength for samples applied at higher temperature (such as 145 to 180° C.) in the range of 1 to 250, 30 to 200, or 40 to 150 g/mm as measured according to ASTM D903.

According to one or more embodiments, the hot melt adhesives can have a probe tack of at least 0.1, 0.2, or 0.3 and/or not more than 5, 3, 2, or 1 kg as measured according to ASTM D9279. Moreover, the hot melt adhesives can have a probe tack in the range of 0.1 to 3, 0.2 to 2, or 0.3 to 5 kg as measured according to ASTM D9279. Furthermore, in various embodiments, the hot melt adhesives can have a holding power at 50° C. of at least 0.1, 0.5, or 1 and/or not more than 50,000, 10,000, 5,000, 1,000, 500, 100, 50, 20, 10, 7, or 4 hours as measured according to ASTM D3654. Moreover, the hot melt adhesives can have a holding power at 50° C. in the range of 0.1 to 10, 0.5 to 7, or 1 to 4 hours as measured according to ASTM D3654.

In other embodiments, the hot melt adhesives can exhibit a holding power at 60° C. of at least 5, 15, 20, or 25 minutes and/or not more than 150 minutes. Additionally or alternatively, the hot melt adhesives can exhibit a holding power at 50° C. of at least 400, 600, 800, or 1,000 minutes. The holding power at 50° C. and 60° C. can be measured by stabilizing glued carton substrates overnight at room temperature, which is normally about +/−20 to 23° C., and then hanging the substrates in a shear bank oven in the peel mode. A weight is then hung under the glued substrate. The time at which the weight drops due to failure is recorded for each specimen. A minimum of eight specimens are needed for this test. Parameters for this test are listed below.

| Criteria | Unit | Condition |
|---|---|---|
| Specimen size | mm | 25 × 60 |
| Application temperature | C. | 180 +/− 2 |
| Open time | s | 2 |
| Set time | s | 2 |
| Line speed | m/min | 15 |
| Bonding pressure | kgf | 1.2 (0.08 kgf per cm$^2$) |
| Coat weight | g/m | 3 +/− 0.09 |
| Hang weight | g | 500 |

According to various embodiments, the hot melt adhesives can have a peel adhesion failure temperature ("PAFT") of at least 2, 10, 25, or 45 and/or not more than 200, 120, or 80° C. as measured according to ASTM D4498. Moreover, the hot melt adhesives can have a PAFT in the range of 2, 10 to 200, 25 to 120, or 45 to 80° C. as measured according to ASTM D4498. Additionally or alternatively, the hot melt adhesives can have a shear adhesion failure temperature ("SAFT") of at least 2, 5, 10, 25, 50, 75, or 90 and/or not more than 200, 150, or 125° C. as measured according to ASTM D4498. Moreover, the hot melt adhesives can have a SAFT in the range of 2 to 200, 50 to 150, or 75 to 125° C. as measured according to ASTM D4498.

In various embodiments, the hot melt adhesives can exhibit an effective set time of at least 0.1, 0.5, or 1 second and/or not more than 5 seconds. In other embodiments, the hot melt adhesives can exhibit an open time of at least 1, 5, or 10 and/or not more than 40, 30, or 20 seconds.

In various embodiments, the hot melt adhesives can exhibit a low temperature performance fiber tear ("LTFT") at −15° C. of at least 65, 70, 75, 80, or 85 percent. Additionally or alternatively, the hot melt adhesives can exhibit an LTFT at −25° C. of at least 40, 50, 60, 70, or 80 percent. The LTFT test consists of manually tearing a glued carton substrate by hand under the condition of −15° C. or −25° C. The glued carton substrates have to be stabilized under the condition of −15° C. or −25° C. for at least 10 hours before the tearing. If 90% fiber of the substrates breaks, the test is considered a pass, and therefore, the hot melt adhesive is considered to perform well at −15° C. or −25° C. A minimum of 10 specimens are tested for each test. The LTFT test parameters are listed below:

| Criteria | Unit | Condition |
|---|---|---|
| Specimen size | mm | 50 × 100 |
| Application temperature | C. | 180 +/− 2 |
| Open time | s | 2 |
| Set time | s | 2 |
| Line speed | m/min | 15 |
| Bonding pressure | kgf | 4 (0.08 kgf per cm$^2$) |
| Coat weight | g/m | 3 +/− 0.09 |

In various embodiments, the adhesives containing the inventive copolymers do not exhibit substantial changes in color when subjected to storage conditions at elevated temperatures over extended periods of time. Before any aging due to storage occurs, the adhesives can have an initial Gardner color of less than 18, 15, 10, 8, 5, 4, 3, 2, or 1 as measured according to ASTM D1544. After being heat aged at 177° C. for at least 96 hours, the adhesives can exhibit a final Gardner color of less than 18, 15, 10, 7, 5, 3, 2 or 1 as measured according to ASTM D1544. Thus, the adhesives can retain a desirable color even after prolonged storage and exposure.

In another embodiment of the invention, the low molecular weight propylene-ethylene copolymer can be utilized in adhesive compositions as described previously in this disclosure. In particular, the low molecular weight copolymer can be utilized to produce hot melt adhesives having a wide process window and a high peel strength for the laminated materials, such as, but not limited to, hygiene products, including destructive bond for the substrates. The adhesive composition containing the low molecular weight copolymer may be applied in the range of about 0.5 gsm to about 5 gsm, and add-on rates suitable for generating laminates with desired bond strength. The peel strength generated using the formulations of this invention can range from about 20 g/25 mm (~1 g/mm) to about 400 g/25 mm (16 g/mm), and to bond strengths that yield substrate failure. In other embodiments, the peel strength can range from at least 20 g/25 mm, 30 g/25 mm, 40 g/25 mm, 50 g/25 mm, 60 g/25 mm, 70 g/25 mm, 80 g/25 mm, 90 g/25 mm, or 100 g/25 mm and/or not more than 400 g/25 mm, 375 g/25 mm, 350 g/25 mm, 300 g/25 mm, 275 g/25 mm, 250 g/25 mm, 225 g/25 mm, or 200 g/25 mm. Moreover, the adhesive formulation can have a peel strength in the range of 20 g/25 mm to 375 g/25 mm, 25 g/25 mm to 350 g/25 mm, 30 g/25 mm to 325 g/25 mm, 40 g/25 mm to 300 g/25 mm, 50 g/25 mm to 275 g/25 mm, 60 g/25 mm to 250 g/25 mm, 70 g/25 mm to 225 g/25 mm, or 80 g/25 mm to 200 g/25 mm. In various embodiments of the present invention, the adhesive formulation is utilized as a hot melt adhesive and comprises at least one inventive copolymer and at least one tackifier resin. Optionally, the hot melt adhesive can further comprise a wax, oil, and/or anti-oxidant. In one particular embodiment, the hot melt adhesive comprises about 50 to about 60% by weight of the inventive low molecular weight copolymer and about 40 to about 45% by weight of tackifier resin.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

In this example, various propylene-ethylene copolymers were produced in a two-liter stirred reactor with an average residence time of about one hour. The reactor temperature was maintained at approximately 140° C. and a pressure of 900 psig. The propylene was fed into the reactor as a liquid, while the ethylene was fed into the reactor as a gas. The polymerization occurred in the presence of a Ziegler-Natta catalyst, which was a titanium chloride on a magnesium chloride support. This particular catalyst is a heterogeneous-supported catalyst system formed from titanium compounds in combination with alkyl aluminum co-catalyst ("TEAL"). The catalyst system contained an Al/Ti mole ratio of 21. Any unreacted monomer and other vapors were vented from the reactor upon discharge of the copolymer.

Samples 1-11 were produced using the aforementioned catalyst system and an external electron donor. As noted below, the electron donor was either cyclohexylmethyldimethoxysilane ("C") or dicyclopentyldimethoxysilane ("D"). Comparative sample 1 (C1) was produced using the above catalyst system in the absence of any electron donors. The amount of added electron donor varied for each sample as indicated by Donor/Ti molar ratio.

The copolymers produced from this reaction are described in TABLE 1 below, along with their various properties and the reaction conditions used to produce them. It should be noted that needle penetration was measured using a penetrometer in accordance with ASTM D5 as discussed previously without actually running the specimens in water; however, the specimens were conditioned in water prior to running the test.

1A and 1B also provide the viscoelastic characteristics of various commercially-available copolymers to serve as a comparison. These commercially-available copolymers include INFUSE™ 9817 (Dow), AFFINITY™ GA1900 (Dow), and Eastoflex™ E1060 (Eastman). FIG. 1A depicts the elastic modulus (G') of the copolymers, while FIG. 1B depicts the tan delta of the copolymers.

Figure 1B:
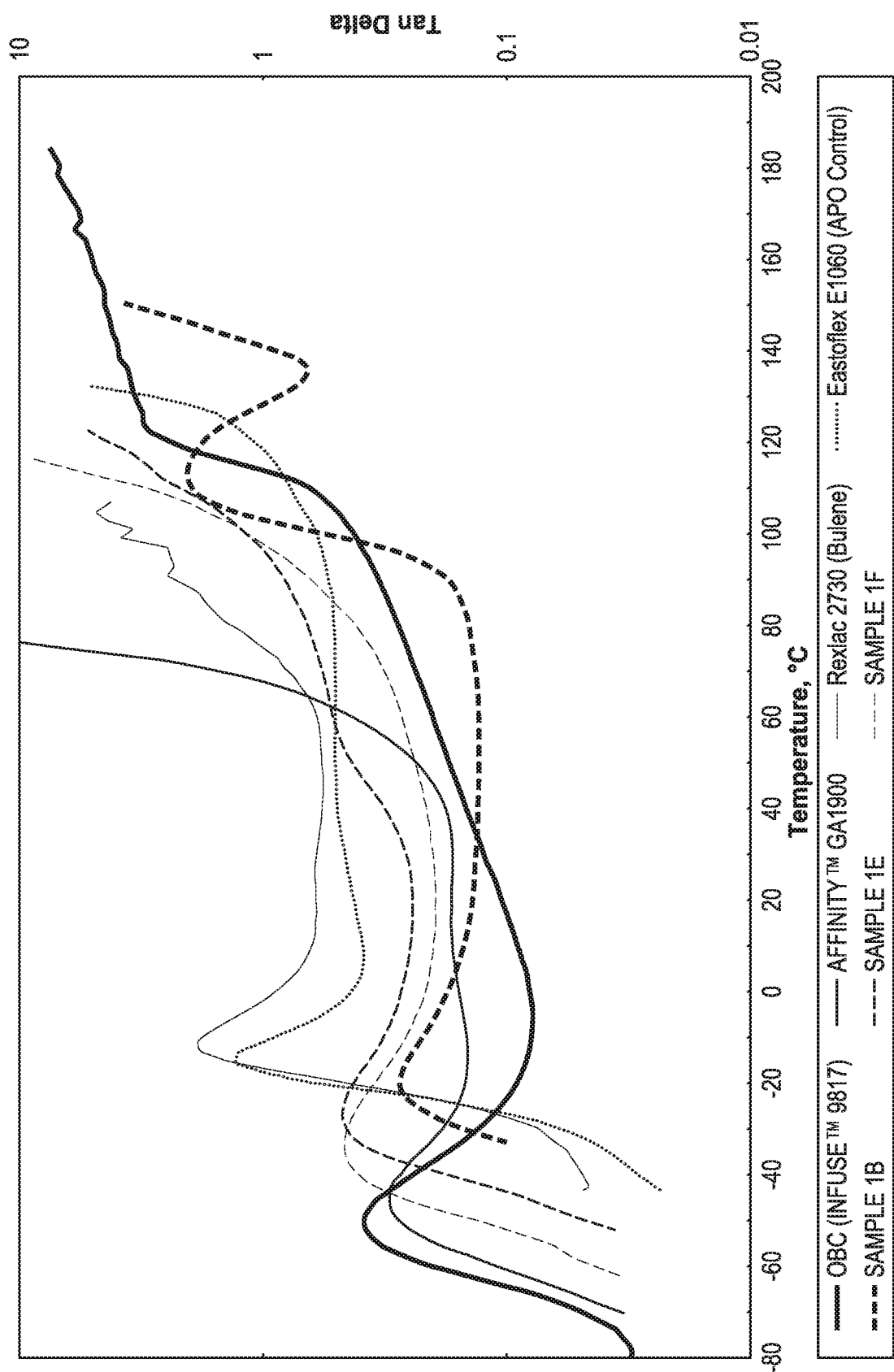
FIG. 1B depicts the viscoelastic characteristics of particular propylene-ethylene copolymers produced in Example 1.

As shown in FIGS. 1A and 1B, Sample 1B showed a desirable elastic modulus (G') plateau from −15 to 100° C., representing the elastic characteristics over a wide application temperature range. This is important in hot melt pres-

TABLE 1

| Copolymer Sample | 1A | 1B | 1C | 1D | 1E | 1F | 1G | 1H | 1I | 1J | 1K | C1 |
|---|---|---|---|---|---|---|---|---|---|---|---|---|
| Al/Ti mole ratio | 21 | 21 | 21 | 21 | 21 | 21 | 21 | 21 | 21 | 21 | 21 | 21 |
| Silane Donor | C | C | D | D | D | D | D | D | D | D | D | — |
| Donor/Ti, mole ratio | 0.5 | 1.2 | 1.0 | 2.0 | 2.0 | 2.0 | 2.5 | 2.5 | 3.0 | 2.0 | 2.0 | — |
| Hydrogen (psig) | 40 | 20 | 15 | 25 | 25 | 40 | 40 | 25 | 50 | 80 | 80 | — |
| Reactor Temp, ° C. | 140 | 140 | 140 | 140 | 140 | 140 | 140 | 140 | 140 | 140 | 140 | 140 |
| Reactor Press. (psig) | 900 | 900 | 900 | 900 | 900 | 900 | 900 | 900 | 900 | 900 | 900 | 900 |
| Catalyst Activity (g/g) | 714.3 | 1003.3 | 920.4 | 887.8 | 817.1 | 728.4 | 803.1 | 842.9 | 780.8 | 824.3 | 841.7 | — |
| Visc. @ 190° C., cP | 1853 | 5863 | 9088 | 9838 | 21125 | 6850 | 10238 | 16575 | 5525 | 1122 | 1748 | 7013 |
| Softening Point (° C.) | 130.3 | 142.2 | 134.8 | 131.6 | 128.6 | 121.8 | 126.3 | 132.6 | 119 | 117.7 | 129.1 | 120.7 |
| Needle Pen. (dmm) | 20 | 14 | 15 | 29 | 17 | 20 | 22 | 21 | 28 | 26 | 20 | 82 |
| Wt. % Ethylene | 15.2 | 12.5 | 17.5 | 24.6 | 20.2 | 22.6 | 25.3 | 22.6 | 25.2 | 21.1 | 19.5 | 21.7 |
| Wt. % Propylene | 84.8 | 87.5 | 82.5 | 75.4 | 79.8 | 77.4 | 74.7 | 77.4 | 74.8 | 78.9 | 80.5 | 78.3 |
| Poly Yield (g) | 537.5 | 780.0 | 709.6 | 712.9 | 656.1 | 584.9 | 657.7 | 690.3 | 652.0 | 661.9 | 675.9 | 720.9 |

As shown above in TABLE 1, the addition of the external donor generally increased hardness, which was indicated by a decrease in needle penetration, along with increasing the softening point and viscosity of the copolymers. As depicted in TABLE 1, samples produced with the external donor had significantly lower needle penetration values than the comparative sample (C1). Furthermore, it was observed that the comparative sample was very tacky, but still lacked the strength of the samples represented by needle penetration values below 30 dmm.

Previous studies indicate that external donor levels greater than 1.25:1 (donor:Ti molar ratio) start to adversely impact properties of the copolymers. In contrast to these studies, it was observed in this example that polymer properties improved at external donor levels of greater than 1.25:1 (donor:Ti molar ratio). Since the addition of external donors can increase viscosity and molecular weight, the addition of hydrogen, or a higher level of hydrogen, can be required to act as a chain terminator during polymerization compared to polymerization of a similar composition with no external donor added.

FIGS. 1A and 1B depict the viscoelastic characteristics of Samples 1B, 1E, and 1F from TABLE 1. Furthermore, FIGS.

sure sensitive adhesives ("PSA") applications, such as tapes and labels, because the G' plateau (i.e., the flatness of the curve) typically represents the energy absorption and desorption characteristics, as well as the strength of the adhesive over a measured temperature range. After the plateau, the copolymer can start to flow. Previously, the flat nature of G' for olefinic copolymers was only achievable through specialized catalytic processes (metallocene catalysis) and/or incorporation of alpha-olefins.

Example 2

In this example, various propylene-ethylene copolymers were produced using the process and system described in Example 1; however, the external electron donor used in this example was cyclohexylmethyldimethoxysilane. Furthermore, the amounts of electron donor added for each sample were varied as indicated by the donor/Ti molar ratio. The copolymers produced during this process are described in TABLE 2 below, along with their various properties and the reaction conditions used to produce them.

TABLE 2

| Copolymer Sample | 2A | 2B | 2C | 2D | 2E | 2F | 2G |
|---|---|---|---|---|---|---|---|
| Al/Ti mole ratio | 21 | 21 | 21 | 21 | 21 | 21 | 21 |
| Donor/Ti, mole ratio | 1.1 | 1.2 | 0.5 | 1.0 | 1.0 | 1.5 | 2.0 |
| TEAL/Donor, mole ratio | 31.3 | 29.6 | 70.0 | 32.9 | 32.9 | 24.7 | 16.5 |
| Hydrogen (psig) | 40 | 20 | 20 | 25 | 25 | 25 | 25 |
| Reactor Temp, ° C. | 140 | 140 | 140 | 140 | 140 | 140 | 140 |
| Reactor Press. (psig) | 900 | 900 | 900 | 900 | 900 | 900 | 900 |
| Catalyst Activity (g/g) | 843.9 | 1003.3 | 1006.8 | 1001.3 | 957.2 | 962.9 | 904.1 |
| Visc. @ 190° C., cP | 3600 | 6600 | 5175 | 4865 | 7263 | 5538 | 4715 |
| Softening Point (° C.) | 140.3 | 138.4 | 145.3 | 126.6 | 135.9 | 133 | 129.6 |
| Needle Pen. (dmm) | 10 | 14 | 17 | 32 | 24 | 23 | 32 |
| Wt. % Ethylene Flow | 10.0 | 10.0 | 10.0 | 15.0 | 13.0 | 15.0 | 15.0 |
| Wt. % Ethylene | 11.7 | 11.9 | 11.3 | 19.3 | 17.2 | 18.2 | 19.3 |

TABLE 2-continued

| Copolymer Sample | 2A | 2B | 2C | 2D | 2E | 2F | 2G |
|---|---|---|---|---|---|---|---|
| Wt. % Propylene | 88.3 | 88.1 | 88.7 | 80.7 | 82.8 | 81.8 | 80.7 |
| Poly Yield (g) | 648.7 | 780.0 | 760.1 | 772.0 | 738.0 | 757.8 | 726.0 |

As depicted in TABLE 2, the use of cyclohexylmethyldimethoxysilane as the external donor was able to produce copolymers with a desirable combination of needle penetration and softening point. However, this balance was largely affected by the donor/Ti molar ratio. As shown in Samples 2F and 2G in TABLE 2, when the donor/Ti molar ratio was increased from 1.5:1 to 2:1, there was a slight decrease in softening point and a significant increase in needle penetration, which was not desirable.

Example 3

In this example, various propylene-ethylene copolymers were produced using the process and system described in Example 1. The external electron donor used in this example was dicyclopentyldimethoxysilane. Furthermore, the amounts of electron donor added for each sample was varied as indicated by the donor/Ti molar ratio. The copolymers produced during this process are described in TABLE 3 below, along with their various properties and the reaction conditions used to produce them

TABLE 3

| Copolymer Sample | C1 | C2 | 3A | 3B | 3C | 3D | 3E | 3F |
|---|---|---|---|---|---|---|---|---|
| Al/Ti mole ratio | 21 | 21 | 21 | 21 | 21 | 21 | 21 | 21 |
| Donor/Ti, mole ratio | 0.3 | 1.5 | 3.0 | 3.0 | 4.0 | 2.0 | 2.0 | 3.0 |
| TEAL/Donor, mole ratio | 71.0 | 15.8 | 7.0 | 7.0 | 5.2 | 10.4 | 10.4 | 7.0 |
| Hydrogen (psig) | 20 | 25 | 80 | 50 | 50 | 80 | 25 | 50 |
| Reactor Temp, ° C. | 140 | 140 | 140 | 140 | 140 | 140 | 140 | 140 |
| Reactor Press. (psig) | 900 | 900 | 900 | 900 | 900 | 900 | 900 | 900 |
| Catalyst Activity (g/g) | 862.0 | 1037.1 | 723.2 | 793.4 | 612.8 | 880.6 | 808.8 | 630.1 |
| Visc. @ 190° C., cP | 7613 | 4625 | 1055 | 3150 | 5963 | 1053 | 16425 | 6250 |
| Softening Point (° C.) | 140.2 | 143.2 | 114.1 | 109.9 | 97.4 | 128.2 | 136.4 | 119.9 |
| Needle Pen. (dmm) | 22 | 27 | 37 | 40 | 63 | 21 | 23 | 21 |
| Wt. % Ethylene Flow | 10.0 | 15.0 | 15.0 | 17.5 | 17.5 | 13.0 | 15.0 | 13.0 |
| Wt. % Ethylene | 14.5 | 17.3 | 24 | 25.8 | 31.1 | 18.2 | 21.3 | 24.2 |
| Wt. % Propylene | 85.5 | 82.7 | 76 | 74.2 | 68.9 | 81.8 | 78.7 | 75.8 |
| Poly Yield (g) | 644.0 | 816.2 | 603.9 | 662.5 | 531.3 | 707.1 | 649.5 | 526.1 |

| Copolymer Sample | 3G | 3H | 3I | 3J | 3K | 3L | 3M |
|---|---|---|---|---|---|---|---|
| Al/Ti mole ratio | 21 | 21 | 21 | 21 | 21 | 21 | 21 |
| Donor/Ti, mole ratio | 3.0 | 3.0 | 3.0 | 3.0 | 3.0 | 2.0 | 2.0 |
| TEAL/Donor, mole ratio | 7.0 | 7.0 | 7.0 | 7.0 | 7.0 | 10.4 | 10.4 |
| Hydrogen (psig) | 33 | 33 | 30 | 30 | 80 | 80 | 80 |
| Reactor Temp, ° C. | 140 | 140 | 140 | 140 | 140 | 140 | 140 |
| Reactor Press. (psig) | 900 | 900 | 900 | 900 | 900 | 900 | 900 |
| Catalyst Activity (g/g) | 653.5 | 648.1 | 658.6 | 584.1 | 750.9 | 636.9 | 817.1 |
| Visc. @ 190° C., cP | 86000 | 93100 | 19275 | 16875 | 2332 | 2308 | 1590 |
| Softening Point (° C.) | 132.2 | 135.6 | 123.6 | 118.7 | 117.6 | 122.7 | 128.8 |
| Needle Pen. (dmm) | 13 | 8 | 19 | 18 | 20 | 15 | 12 |
| Wt. % Ethylene Flow | 13.0 | 13.0 | 13.0 | 13.0 | 12.0 | 12.0 | 12.0 |
| Wt. % Ethylene | 20.2 | 20.1 | 22.4 | 24.1 | 19.9 | 22.8 | 18.5 |
| Wt. % Propylene | 79.8 | 79.9 | 77.6 | 75.9 | 80.1 | 77.2 | 81.5 |
| Poly Yield (g) | 545.7 | 541.2 | 549.9 | 487.7 | 627.0 | 511.4 | 656.1 |

As shown in TABLE 3, the amount of dicyclopentyldimethoxysilane needed to produce copolymers with the desired softening point and needle penetration varies from the amount of cyclohexylmethyldimethoxysilane needed as shown above in Example 2. As demonstrated by comparative samples C1 and C2, dicyclopentyldimethoxysilane levels generally needed to be at 2:1 or greater to achieve the desired properties in the produced copolymers. Moreover, it was observed that copolymers produced using dicyclopentyldimethoxysilane generally had much lower softening points compared to those produced using cyclohexylmethyldimethoxysilane. Furthermore, the copolymers produced using dicyclopentyldimethoxysilane were able to maintain desirable needle penetration values.

Comparing Samples 3C and 3F in TABLE 3 shows that increasing the dicyclopentyldimethoxysilane levels from 3:1 to 4:1 (at 17.5% ethylene flow) results in more ethylene being incorporated into the polymer, thereby yielding a copolymer with a lower softening point.

Another noteworthy result is observed when comparing Samples 3D and 3F, both of which were produced using the same ethylene flow (13%) and had the same needle penetration (21 dmm). However, by increasing the dicyclopentyldimethoxysilane levels from 2:1 to 3:1, Sample 3F unexpectedly had an increased ethylene content (24.2%) compared to Sample 3D (18.2%). This increased amount of ethylene led to the lower softening point in Sample 3F. Furthermore, it is theorized that the propylene portion of Sample 3F is also more stereoregular (i.e., harder) than that of Sample 3D, thereby offsetting the softness that is usually accompanied with a higher ethylene content.

Example 4

Adhesives were produced with Samples 1B, 1E, and 1F from Example 1. The adhesives were produced in pint-sized cans using mechanical agitation with a paddle-type agitator controlled by a variable speed motor with a heat block set at 177° C. The copolymer, along with antioxidant, were introduced into the pint-sized can and heated to 177° C. under a nitrogen blanket. Resin and oil were then introduced into the mixture after the copolymer was melted. In some cases, wax can be also added along with resin and/or oil or in place of resin and/or oil. This mixture was agitated for 30 minutes until it was completely homogenous. After thorough mixing, the adhesive was poured into a silicone-lined cardboard box and allowed to cool. TABLE 4, below, describes the composition and properties of these adhesives. In addition, comparative adhesives were produced using INFUSE™ 9807 block copolymer (Dow) and Kraton® D1102 copolymer (Kraton). It should be noted that the compositional components recited in TABLE 4 are based on weight percentage.

TABLE 4

| Materials | Comparative Adhesive 1 | Comparative Adhesive 2 | Inventive Adhesive 1 | Inventive Adhesive 2 | Inventive Adhesive 3 |
|---|---|---|---|---|---|
| INFUSE ™ 9807 | 20 | | | | |
| Kraton ® D1102 | | 19.7 | | | |
| Copolymer Sample 1B | | | 40 | | |
| Copolymer Sample 1E | | | | 40 | |
| Copolymer Sample 1F | | | | | 40 |
| Regalite ™ S5100 | | 59.7 | | | |
| Regalite ™ R1090 | 54 | | 48.5 | 48.5 | 48.5 |
| Kaydol Mineral Oil | | | 10.5 | 10.5 | 10.5 |
| Calsol 5550 Oil | 25 | 19.6 | | | |
| Irganox ® 1010 | 1 | 1 | 1 | 1 | 1 |
| Total | 100 | 100 | 100 | 100 | 100 |
| 300 mm peel strength (g/mm) | 13.1 | 14.6 | 2.3 | 21.5 | 13.3 |
| Brookfield Visc. 177° C. (cps) | ~1800 | ~1400 | 806 | 2167 | 940 |

Figure 2:
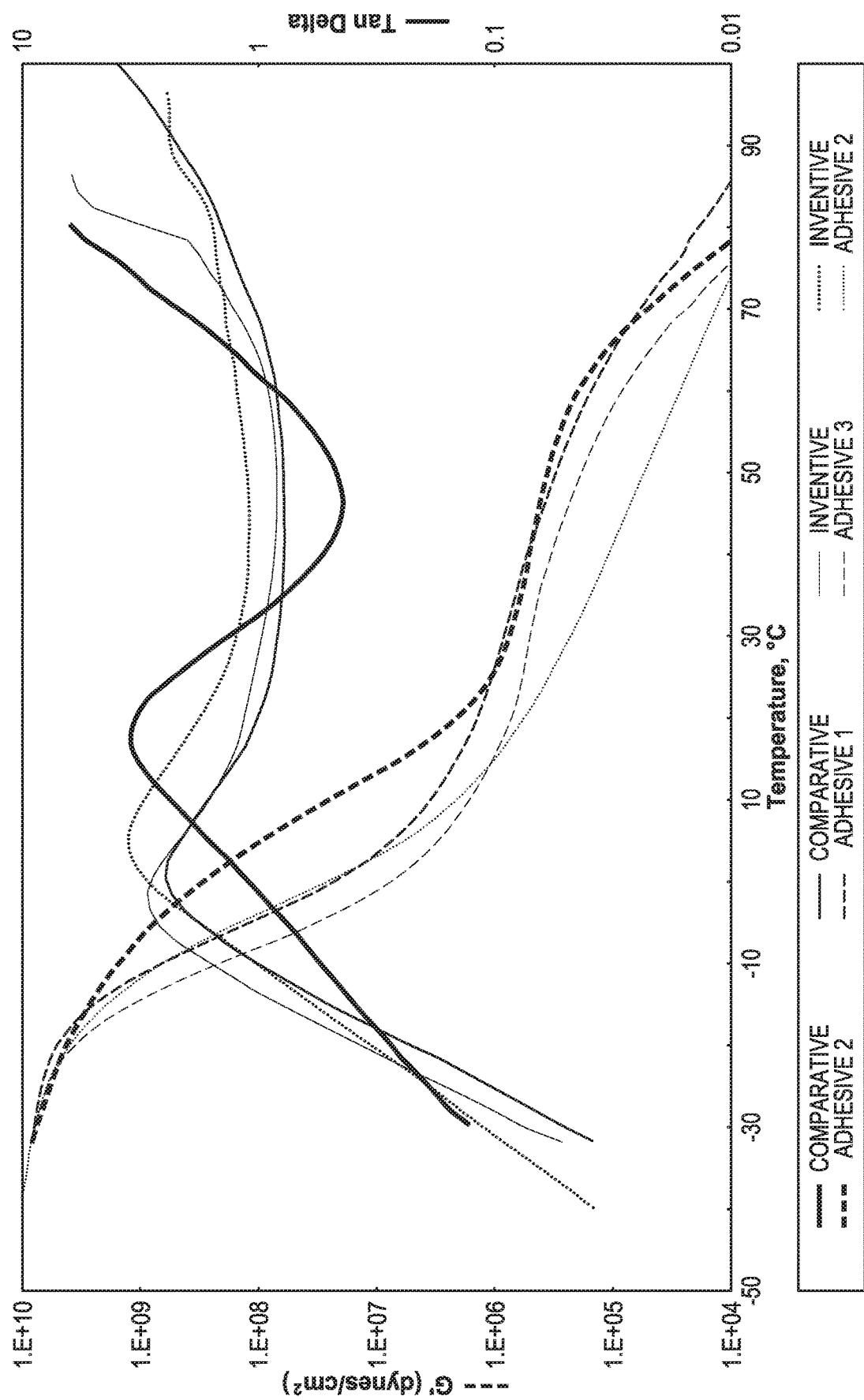
FIG. 2 depicts the viscoelastic characteristics of the adhesives produced in Example 4.

Viscoelastic characteristics of Comparative Adhesive 1, Comparative Adhesive 2, Inventive Adhesive 2, and Inventive Adhesive 3 in TABLE 4 were analyzed using Dynamic Mechanical Analysis ("DMA"). FIG. 2 depicts the viscoelastic characteristics of these adhesives. The adhesives in TABLE 4 were also tested as disposable diaper construction adhesives and were evaluated for adhesive peel strength as measured according to ASTM D903 using Instron after the adhesive had been applied between a nonwoven fabric and polyethylene backing using air-assisted spiral spraying equipment (Acumeter Spray Coater).

Based on FIG. 2 and TABLE 4, the inventive adhesives show similar viscoelastic characteristics to adhesives produced from commercially-available copolymers. Furthermore, the inventive adhesives also exhibited superior strength as indicated by the higher peel strengths.

Example 5

A pressure sensitive adhesive for labels was produced using the process described in Example 4. The adhesive was produced using Sample 1E from Example 1. TABLE 5, below, depicts the compositional makeup of this adhesive.

TABLE 5

| Inventive Adhesive | Weight % |
|---|---|
| Copolymer Sample 1E | 60 |
| Eastotac ™ H100W | 29.5 |
| Calsol 5550 | 9.5 |
| Antioxidant | 1 |

Figure 3:
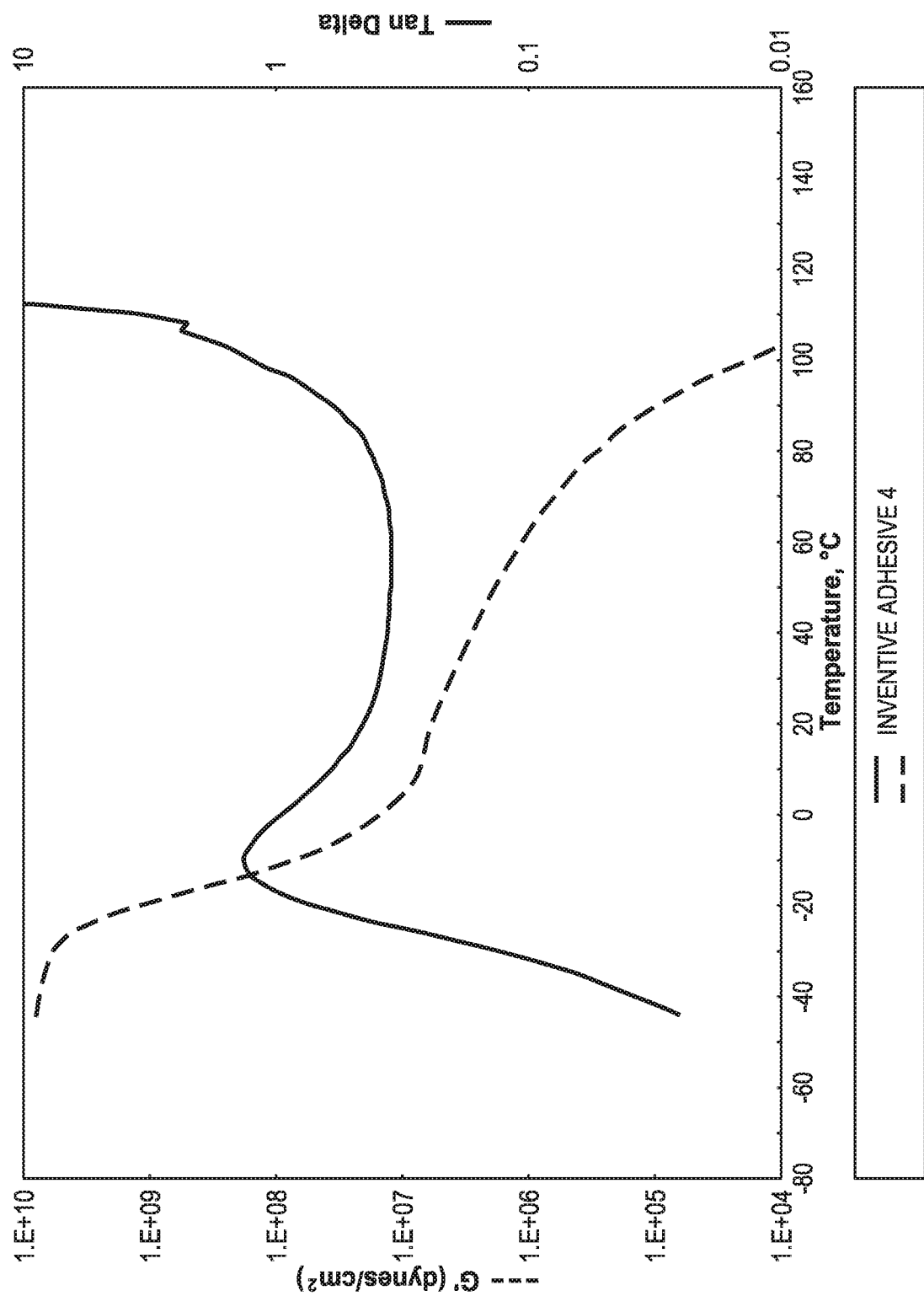
FIG. 3 depicts the viscoelastic characteristics of the adhesive produced in Example 5.

The viscoelastic characteristics of this adhesive were measured using DMA and are depicted in FIG. 3. This adhesive was also evaluated for adhesive peel (90° peel) strength and loop tack using Instron after the adhesive had been directly coated onto vellum using a hot melt knife coater. The adhesive had a 90° peel strength of 0.6 lbf/inch and a loop tack of 1.8 lbf.

Thus, this adhesive can be used as a label adhesive since it exhibits desirable viscoelastic characteristics as shown in FIG. 3 and ideal adhesive peel and tack properties.

Example 6

Hot melt adhesives for packaging applications were produced using the process described in Example 4. All of the adhesives produced for this example comprised 39.8 weight percent of the respective propylene-ethylene copolymer, 39.8 weight percent of Eastotac™ H-100W hydrocarbon resin, 19.9 weight percent of Sasol H1 wax (Sasol), and 0.6 weight percent of antioxidant. It should be noted that some of these adhesives were formed from copolymers produced and described in the previous examples (Samples 1F and 2B), which are noted in TABLE 6 below. As for the remaining listed copolymers (Samples 6A-6D), they were produced in accordance with the process described in Example 1. TABLE 6, below, provides various properties and characteristics of the produced adhesives. Furthermore, TABLE 6 notes the electron donor used to produce the listed copolymers. These electron donors included cyclohexylmethyldimethoxysilane ("C"), dicyclopentyldimethoxysilane ("D"), and tetraethoxysilane ("TEOS"). The adhesives were evaluated for various adhesive properties, such as peel adhesion failure temperature ("PAFT") (ASTM D4498), shear adhesion failure temperature ("SAFT") (ASTM D4498), % fiber tear (ASTM D4498), and open time/set time (ASTM D4497).

used to produce the adhesive samples are listed in TABLE 7 below. Furthermore, TABLE 7 indicates the electron donor that was used to produce the respective copolymer (cyclohexylmethyldimethoxysilane ("C") or dicyclopentyldimethoxysilane ("D")).

TABLE 7

| Copolymer Sample | 7A | 7B | 7C | 7D |
|---|---|---|---|---|
| Visc. @ 190° C., cP | 2520 | 2960 | 2590 | 7363 |
| Softening Point (° C.) | 137.5 | 139.4 | 134.1 | 116.1 |
| Needle Pen. (dmm) | 14 | 15 | 14 | 27 |
| Wt. % Ethylene | 11.7 | 11.9 | 11.3 | 19.3 |

TABLE 6

| | Copolymers in Adhesives | Sample 1F | Sample 2B | Sample 6A | Sample 6B | Sample 6C | Sample 6D |
|---|---|---|---|---|---|---|---|
| Properties of Copolymers | Needle Pen. (dmm) | 20 | 14 | 24 | 24 | 50 | 5 |
| | Softening Point (° C.) | 121.8 | 138.4 | 126.5 | 135.9 | 145.6 | 154.7 |
| | Electron Donor | D | C | D | C | TEOS | C |
| | Wt. % Ethylene | 22.6% | 11.9% | 21.7% | 17.2% | 13.3% | 10% |
| Properties of the Adhesives | % Fiber Tear (135° F.) | 75 | 75 | 25 | 100 | 25 | 0 |
| | % Fiber Tear (Room Temp) | 100 | 0 | 50 | 100 | 100 | 0 |
| | % Fiber Tear (40° F.) | 0 | 0 | 0 | 50 | 50 | 0 |
| | % Fiber Tear (20° F.) | 0 | 0 | 0 | 50 | 75 | 0 |
| | Open Time/Set Time (sec) | >30/20 | 30/10 | >30/20 | 30/10 | 20/10 | 32/20 |
| | SAFT/PAFT (° C.) | 98/56 | 115/68 | 99/51 | 99/75 | 99.6/74.6 | 100/62 |
| | Brookfield Visc. 177° C. (cps) | 6850 | 6600 | 6700 | 7263 | 8850 | 6313 |

It should be noted that the adhesive produced with Sample 6D did not have any noticeable fiber tear due to its low needle penetration as depicted in TABLE 6.

Figure 4:
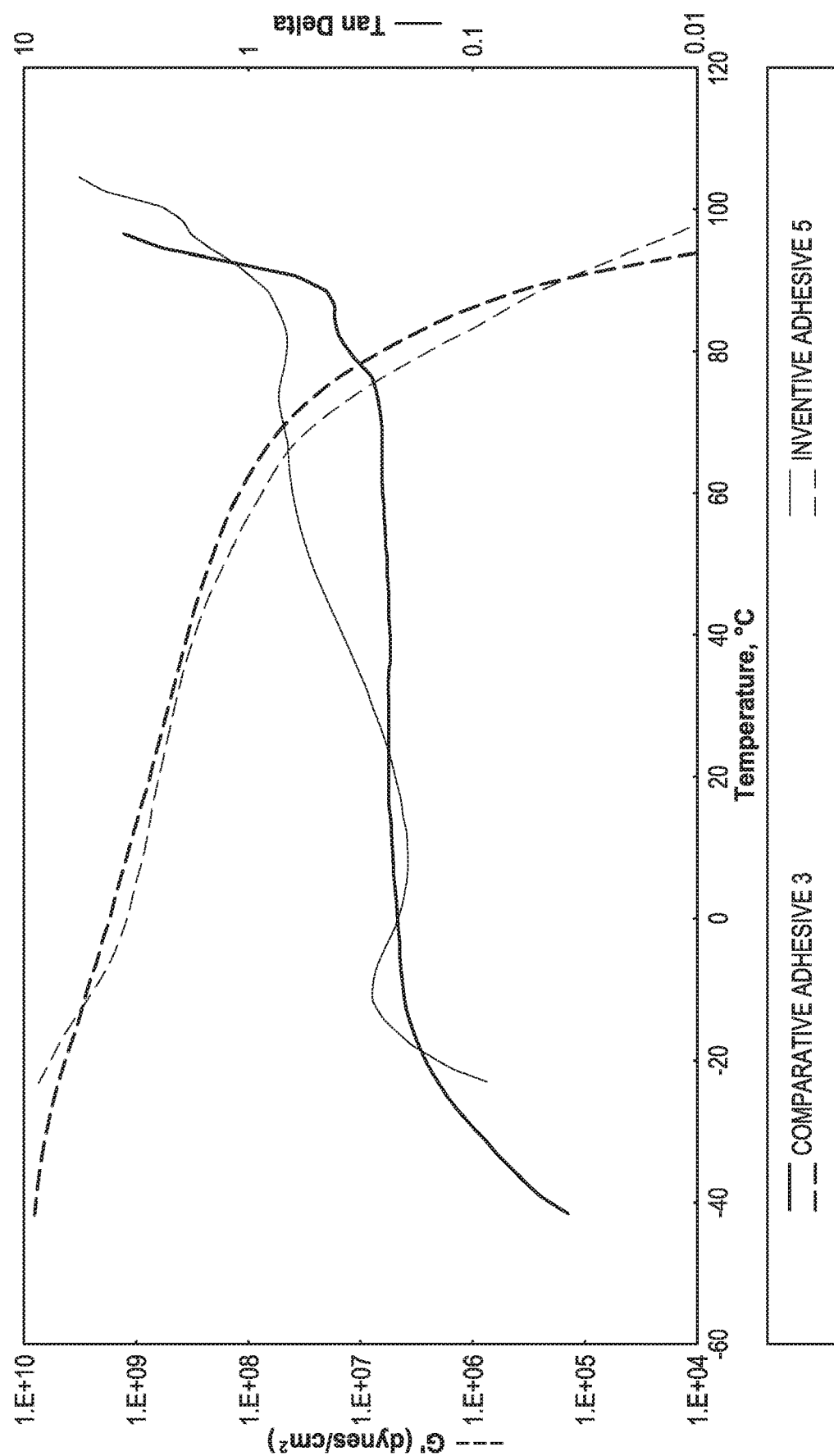
FIG. 4 depicts the viscoelastic characteristics of the adhesives produced in Example 6.

The viscoelastic characteristics of the adhesive produced from Sample 1F (labeled as "Inventive Adhesive 5") are compared in FIG. 4 with an adhesive produced from Affinity™ GA1950 (Dow). This comparative adhesive was produced based on the same formulation used to produce the adhesives in TABLE 6. This comparative adhesive is listed in FIG. 6 as "Comparative Adhesive 3." It should also be noted that this comparative adhesive had a SAFT of 93.6/3.6° C., a PAFT of 71.8/3.4° C., an open time/set time of 15/5 seconds, and a Brookfield viscosity at 177° C. of 177 cps. As shown in FIG. 4 and TABLE 6, the inventive adhesives exhibited desirable viscoelastic characteristics and adhesive properties that are comparable to standard adhesives in the industry.

Example 7

Hot melt adhesives for nonwovens were produced using the inventive propylene-ethylene copolymers and various polymers. The propylene-ethylene copolymers used to manufacture these adhesive samples were produced in accordance with the process described in Example 1. The various properties and characteristics of the copolymers TABLE 7-continued

| Copolymer Sample | 7A | 7B | 7C | 7D |
|---|---|---|---|---|
| Wt. % Propylene | 88.3 | 88.1 | 88.7 | 80.7 |
| Electron Donor | D | C | C | D |

The adhesives were produced in accordance with the process described in Example 4. The adhesives were produced with various polymers and additives including Vistamaxx™ 6202 (ExxonMobil), Infuse™ 9807 (Dow), L-MODU S400 (Idemitsu), Kraton® 1102 (Kraton), Kraton® 1161 (Kraton), Kraton® 1657 (Kraton), Regalite™ R1090 (Eastman Chemical), Kaydol mineral oil (Sonneborn), and Irganox® 1010 (BASF). The Brookfield viscosity and the peel strength of the produced adhesives were measured as described above. TABLE 8, below, describes the composition and properties of these inventive adhesives, which are labeled as "IA." It should be noted that the compositional components recited in TABLE 8 are based on weight percentage and that all components add up to 100 percent; however, this does not include the 1 percent of antioxidant (Irganox® 1010), which was added after all other components were combined. The weight percentage for the antioxidant was based off the combined weight percentage of the other components.

TABLE 8

| Adhesives | | IA1 | IA2 | IA3 | IA4 | IA5 | IA6 | IA7 | IA8 | IA9 |
|---|---|---|---|---|---|---|---|---|---|---|
| Composition of Adhesives | Sample 7A | 70 | | | | | | | | |
| | Sample 7B | | 70 | | | | | | | |
| | Sample 7C | | | 70 | | | | | | |
| | Sample 7D | | | | 20 | 20 | 20 | 20 | 20 | 20 |
| | Vistamaxx™ 6202 | | | | 20 | | | | | |
| | Infuse™ 9807 | | | | | 20 | | | | |
| | LMODU S400 | | | | | | 20 | | | |
| | Kraton® 1102 (SBS) | | | | | | | 20 | | |
| | Kraton® 1161 (SIS) | | | | | | | | 20 | |
| | Kraton 1657 (SEBS) | | | | | | | | | 20 |
| | Regalite™ R1090 | 30 | 30 | 30 | 48.5 | 48.5 | 48.5 | 48.5 | 48.5 | 48.5 |
| | Kaydol Mineral Oil | | | | 10.5 | 10.5 | 10.5 | 10.5 | 10.5 | 10.5 |
| | Irganox® 1010 | 1 | 1 | 1 | 1 | 1 | 1 | 1 | 1 | 1 |
| | Brookfield Visc. 177° C. (cps) | 1675 | 1775 | 1430 | 14900 | 7725 | 1250 | 3760 | 7200 | 10250 |
| | Peel strength (g/mm) | 9.8 | 6.6 | 4 | 21.5 | 18.6 | 9.8 | 6.6 | 4 | 21.5 |

As shown in TABLE 8, the inventive adhesives exhibited desirable adhesive properties that are comparable to standard adhesives in the industry.

Example 8

Hot melt adhesives for hygienic applications were produced using the inventive propylene-ethylene copolymers depicted in TABLE 9. The copolymers were produced in accordance with the process described in Example 1 using dicyclopentyldimethoxysilane as the electron donor.

TABLE 9

| Copolymer Sample | 8A | 8B | 8C |
|---|---|---|---|
| Visc. @ 190° C., cP | 20000 | 16000 | 2200 |
| Softening Point (° C.) | 135 | 125 | 133 |
| Needle Pen. (dmm) | 22 | 17 | 20 |
| Wt. % Ethylene | 22 | 22 | 22 |
| Wt. % Propylene | 78 | 78 | 78 |

The adhesives were produced in accordance with the process described in Example 4. The adhesives were produced with various additives including Eastotac™ H-100W (Eastman Chemical), Regalite™ R1090 (Eastman Chemical), Kaydol mineral oil (Sonneborn), and Irganox® 1010 (BASF). TABLE 10, below, describes the composition and properties of these inventive adhesives, which are labeled as "IA." It should be noted that the compositional components recited in TABLE 10 are based on weight percentage.

The coatability, sprayability, and adhesive performance of the inventive adhesives were compared against adhesives containing a commercially-available styrenic block copolymer ("SBC") and a commercially-available olefin-based copolymer as shown in TABLE 10. The coating/spraying analysis was performed using an Acumeter and Nordson CF nozzle with different add-ons (2, 3, and 4 gsm) at 800, 600, and 400 ft/min (6 gsm at 350 ft/min for 3 samples) at two different temperatures (137° C. and 163° C.). The tested substrates were 1 mil polyethylene and a 15 gsm spun bound nonwoven. The sprayability was observed and marked as "good," "poor," or "no" (i.e., not sprayable) after observing the spraying of adhesive at the designated temperature. The Brookfield viscosity, softening point, needle penetration, and the peel strength of the produced adhesives were also measured as described above. The width of the adhesive samples tested for peel strength was 15 to 20 mm.

TABLE 10

| Adhesives | IA1 | IA2 | IA3 | IA4 | IA5 | IA6 | IA7 | Com. SBC-Based | Com. Olefin-Based |
|---|---|---|---|---|---|---|---|---|---|
| Sample 8A | 40 | 40 | 40 | 60 | | | | | |
| Sample 8B | | | | | 40 | 60 | | | |
| Sample 8C | | | | | | | 70 | | |
| Eastotac™ H-100W | | | 48.5 | | | | | | |
| Regalite™ R1090 | 48.5 | 48.8 | | 34.5 | 48.5 | 34.5 | 29 | | |
| Mineral Oil | 10.5 | 10.5 | 10.5 | 4.5 | 10.5 | 4.5 | | | |
| Irganox® 1010 | 1 | 1 | 1 | 1 | 1 | 1 | 1 | | |

TABLE 10-continued

| Adhesives | IA1 | IA2 | IA3 | IA4 | IA5 | IA6 | IA7 | Com. SBC-Based | Com. Olefin-Based |
|---|---|---|---|---|---|---|---|---|---|
| Brookfield Visc. 190° C. (cps) | 1688 | 2133 | 2760 | 6425 | 1515 | 5300 | 913 | N/A | N/A |
| Peel strength for 137° C. Samples (g) | N/A | 172 | 143 | 136 | 111 | 84 | 49 | N/A | N/A |
| Peel strength for 163° C. Samples (g) | 130 | 136 | 122 | 116 | 117.7 | 60 | 50 | 101 | 137 |
| Sprayability at 137° C./163° C. | Good/Good | Good/Good | Good/Good | Good/Good | Good/Good | Good/Good | Good/Good | Poor/Good | No/Poor |
| Softening Point (° C.) | 120.4 | 113.3 | 115.9 | 125.2 | 106.7 | 114.8 | 123.7 | N/A | N/A |
| Needle Penetration (dmm) | 55 | 51 | 43 | 32 | 38 | 26 | 28 | N/A | N/A |

It should be noted that peel strength tests of 137° C. samples were inconclusive for the two comparative commercial adhesives due to the poor sprayability of these adhesives. As shown in TABLE 10, the inventive adhesives exhibited desirable coatability and sprayability at low and high temperatures, thereby indicating a broad operating window. Furthermore, the inventive adhesives exhibited adhesive properties that are either comparable or superior to standard adhesives in the industry.

Example 9

Hot melt adhesives for packaging applications were produced using the inventive propylene-ethylene copolymers depicted in TABLE 11. Furthermore, comparative adhesives were produced from a comparative propylene homopolymer ("CPH") as depicted in TABLE 11. The copolymers used to manufacture these adhesive samples were produced in accordance with the process described in Example 1. Furthermore, TABLE 11 also indicates the electron donor that was used to produce the copolymers (cyclohexylmethyldimethoxysilane ("C") or dicyclopentyldimethoxysilane ("D")).

TABLE 11

| Copolymer Sample | CPH | 9A | 9B |
|---|---|---|---|
| Visc. @ 190° C., cP | 1028 | 3165 | 2520 |
| Softening Point (° C.) | 135 | 132.1 | 137.5 |
| Needle Pen. (dmm) | 22 | 12 | 14 |
| Wt. % Ethylene | 0 | 9.9 | 16.7 |
| Wt. % Propylene | 100 | 90.1 | 83.3 |
| Electron Donor | C | C | D |

The adhesives were produced in accordance with the process described in Example 4. The adhesives were produced with various additives including Eastotac™ H-100W (Eastman Chemical), Eastotac™ H-130W (Eastman Chemical), Sasol wax H-1 (Sasol), and Irganox® 1010 (BASF). TABLE 12, below, describes the composition and properties of the inventive adhesives, which are labeled as "IA," and the comparative adhesives ("CA"). It should be noted that the compositional components recited in TABLE 12 are based on weight percentage. The initial viscosities of the adhesives were measured at 162° C. and 177° C., along with the SAFT, PAFT, and open/set times. The SAFT measurements were performed to understand the shear strength of the adhesives over a temperature period in a SAFT oven. Viscosity profiles of the adhesives were generated to determine the processability characteristics. Furthermore, the initial Gardner color before aging and adhesive clarity at 177° C. were also measured and observed.

TABLE 12

| Adhesives | CA1 | CA2 | IA1 | IA2 | IA3 |
|---|---|---|---|---|---|
| CPH | 39.8 | 59.8 | | | |
| Sample 9A | | | 39.8 | 59.8 | |
| Sample 9B | | | | | 39.8 |
| Eastotac™ H-100W | | | | | 39.8 |
| Eastotac™ H-130W | 39.8 | 19.8 | 39.8 | 19.8 | |
| Sasol wax H-1 | 19.8 | 19.8 | 19.8 | 19.8 | 19.8 |
| Irganox ® 1010 | 0.6 | 0.6 | 0.6 | 0.6 | 0.6 |
| Brookfield Visc. 162° C. (cps) | 465 | 750 | 3250 | 9062 | 575 |
| Brookfield Visc. 177° C. (cps) | 330 | 545 | 2192 | 6366 | 417 |
| Open/Set time (s) | 20/10 | N/A | 15/10 | 15/10 | N/A |
| PAFT (° C.) | 77.4 (4.7) | 43.3 (3.8) | 83.6 (2.6) | 54.9 (9) | 63 (2) |
| SAFT (° C.) | 108.6 (5) | 199.6 (2.5) | 120.3 (0.4) | 136.5 (0.4) | 101 (2) |
| Gardner Color (Initial) | 2 | 4 | 5 | 6 | 1 |
| Adhesive Clarity (177° C.) | clear | clear | hazy | hazy | clear |

As shown in TABLE 12, the inventive adhesives exhibited adhesive properties that are either comparable or superior to adhesives produced from propylene. The inventive adhesives can exhibit desirable clarity and color, along with desirable processability as indicated by their viscosities.

Example 10

Hot melt adhesives for packaging applications were produced using the inventive propylene-ethylene copolymers depicted in TABLE 13. Furthermore, comparative adhesives were produced from Affinity™ GA1950 (Dow) and comparative polymers ("CP") as depicted in TABLE 13. The copolymers used to manufacture these adhesive samples were produced in accordance with the process described in Example 1. Furthermore, TABLE 13 also indicates the electron donor that was used to produce the copolymers.

TABLE 13

| Copolymer Sample | CP1 | CP2 | CP3 | 10A | 10B |
|---|---|---|---|---|---|
| Visc. @ 190° C., cP | 8350 | 8812 | 29950 | 7825 | 19975 |
| Softening Point (° C.) | 157.5 | 155.8 | 157.3 | 111.9 | 107.7 |
| Needle Pen. (dmm) | 7 | 9 | 1 | 29 | 37 |
| Wt. % Ethylene | 0 | 0 | 6.2 | 22.8 | 27.9 |
| Wt. % Propylene | 100 | 100 | 93.8 | 97.2 | 92.1 |
| Electron Donor | None | None | Anisole | D | D |

The adhesives were produced in accordance with the process described in Example 4. The adhesives were produced with various additives including Regalite™ R1090 (Eastman Chemical), Escorez® 5300 (Exxonmobil), Piccotac™ 1095 (Eastman Chemical), Piccotac™ 7590 (Eastman Chemical), Sasol wax H-1 (Sasol), and Irganox® 1010 (BASF). TABLE 14, below, describes the composition and properties of the inventive adhesives, which are labeled as "IA," and the comparative adhesives labeled as "CA." It should be noted that the compositional components recited in TABLE 14 are based on weight percentage and that all components add up to 100 percent; however, this does not include the 1 percent of antioxidant (Irganox® 1010), which was added after all other components were combined. The weight percentage for the antioxidant was based off the combined weight percentage of the other components.

The initial viscosities of the adhesives were measured at 150° C., and 177° C., along with the SAFT, PAFT, and open/set times. Viscosity profiles of the adhesives were generated to determine the processability characteristics of the adhesives. The SAFT measurements are performed to understand the shear strength of the adhesives over a temperature period in a SAFT oven. Furthermore, the adhesive clarity at 177° C. was also observed.

TABLE 14

| | Adhesives | CA1 | CA2 | CA3 | CA4 | IA1 | IA2 | CA5 | CA6 | IA3 | CA7 | CA8 | IA4 | IA5 | CA9 | CA10 | IA6 | IA7 |
|---|---|---|---|---|---|---|---|---|---|---|---|---|---|---|---|---|---|---|
| Composition of Adhesives | Affinity GA1950 | 40 | | | | | | | | | | | | | | | | |
| | CP1 | | 40 | | | | | | | | | | | | | | | |
| | CP2 | | | 40 | | | | 40 | | | 40 | | | | 40 | | | |
| | CP3 | | | | 40 | | | | 40 | | | 40 | | | | 40 | | |
| | 10A | | | | | 40 | | | | 40 | | | 40 | | | | 40 | |
| | 10B | | | | | | 40 | | | | | | | 40 | | | | 40 |
| | Regalite™ R1090 | 40 | 40 | 40 | 40 | 40 | 40 | | | | | | | | | | | |
| | Escorez® 5300 | | | | | | | 40 | 40 | 40 | | | | | | | | |
| | Piccotac™ 1095 | | | | | | | | | | 40 | 40 | 40 | 40 | | | | |
| | Piccotac™ 7590 | | | | | | | | | | | | | | 40 | 40 | 40 | 40 |
| | Sasol wax | 20 | 20 | 20 | 20 | 20 | 20 | 20 | 20 | 20 | 20 | 20 | 20 | 20 | 20 | 20 | 20 | 20 |
| | Irganox® 1010 | 1 | 1 | 1 | 1 | 1 | 1 | 1 | 1 | 1 | 1 | 1 | 1 | 1 | 1 | 1 | 1 | 1 |
| | Visc. 150° C. (cps) | 1867 | 7308 | 3685 | 30150 | 675 | 3360 | N/A | N/A | 4000 | N/A | 248300 | 3029 | 607 | 26550 | 87000 | 3604 | 752 |
| | Visc. 162° C. (cps) | 1300 | 810 | 940 | 3275 | 417 | 2490 | 1150 | 3080 | 2935 | 910 | 2895 | 1980 | 432 | 890 | 2820 | 2390 | 570 |
| | Visc. 177° C. (cps) | 932 | 607 | 670 | 1887 | 310 | 1320 | 860 | 2370 | 1872 | 685 | 2050 | 1692 | 317 | 815 | 1900 | 1507 | 427 |
| | Open/Set time (s) | 30/40 | 40/10 | — | — | — | — | — | — | — | — | — | — | — | — | — | — | — |
| | PAFT (° C.) | 60.6 | 72.9 | 75 | 75.1 | 67.3 | 50 | 71.5 | 73.4 | 62.5 | 76 | 76.2 | 71.2 | 49.4 | 79.3 | 79.3 | 70.6 | 47.7 |
| | SAFT (° C.) | 97.8 | 109.1 | 110 | 125.2 | 91.9 | 88.8 | 107.4 | 125.5 | 96 | 109.6 | 121.8 | 95.7 | 88.1 | 108.2 | 120.1 | 92 | 99.4 |
| | Clarity (177° C.) | Clear | Clear | Clear | Clear | Clear | Clear | Clear | Clear | Clear | Clear | Clear | Clear | Clear | Clear | Clear | Clear | Clear |

As shown in TABLE 14, the inventive adhesives exhibited adhesive properties that are either comparable or superior to common adhesives in the industry. The inventive adhesives can exhibit desirable clarity and desirable processability as indicated by their viscosities. Furthermore, as shown in TABLE 14, the inventive adhesives can exhibit superior adhesive properties.

Example 11

Hot melt pressure-sensitive adhesives for tapes and labels were produced using an inventive propylene-ethylene copolymer (Sample 7D from Example 7). The adhesives were produced in accordance with the process described in Example 4. The adhesives were produced with Vistamaxx™ 6202 (Exxonmobil), Kraton® 1162 (Kraton), Kraton® 1657 (Kraton), Regalite™ R1090 (Eastman Chemical), Kaydol mineral oil (Sonneborn), and Irganox® 1010 (BASF). TABLE 15, below, describes the composition and properties of the inventive adhesives. It should be noted that the compositional components recited in TABLE 15 are based on weight percentage. The probe tack (kg) of the adhesive was measured according to ASTM D9279 and the hold power (hours) was measured according to ASTM D3654.

TABLE 15

| | Adhesives | IA1 | IA2 | IA3 |
|---|---|---|---|---|
| Composition of Adhesives | Sample 7D | 20 | 20 | 20 |
| | Vistamax® 6202 | 20 | | |
| | Kraton® 1161 | | 20 | |
| | Kraton® 1657 | | | 20 |
| | Regalite™ R1090 | 48.5 | 48.5 | 48.5 |
| | Mineral Oil | 10.5 | 10.5 | 10.5 |
| | Irganox® 1010 | 1 | 1 | 1 |
| | Brookfield Visc. 177° C. (cps) | 14900 | 7200 | 10250 |
| | Probe Tack (kg) | 0.5 | 0.4 | 0.4 |
| | Hold Power (on SS) (hours) | 3.5 | .01 | 1.6 |

As shown in TABLE 15, the inventive adhesives exhibited adhesive properties that are either comparable or superior to common adhesives in the industry.

Example 12

Polymer blends were produced to observe the effects that certain polymers had on particular blends. In this example, a commercial propylene homopolymer (Exxon™ PP3155) was compared to a propylene homopolymer prepared in accordance with Example 1. This propylene homopolymer ("Sample 12A") was produced without an electron donor and had a softening point of 157.5° C. and a needle penetration of 7 dmm. These two homopolymers were separately combined with Kraton® G1650 (Kraton), Kraton® G1651 (Kraton), $CaCO_3$, Drakeol® 34 oil (Calumet Specialty Products), and Kristalex™ 5140 (Eastman Chemical) to produce polymer blends. The composition and properties of these polymer blends are depicted in TABLE 16 below. It should be noted that all composition values in TABLE 16 are based on weight percentages.

Furthermore, various properties of the polymer blends were measured as shown TABLE 16. The tested properties included Shore A hardness (ASTM D2240), melt flow rate (ASTM D1238), tear strength (ASTM D624), 100% modulus (ASTM D412), 200% modulus (ASTM D412), 300% modulus (ASTM D412), elongation at break (ASTM D412), tensile strength (ASTM D412), and Young's Modulus (ASTM E111-04).

TABLE 16

| | Blends | Non-Commercial | Commercial |
|---|---|---|---|
| Composition of Blends | Exxon® 3155 (PP) | | 15 |
| | Sample 12A | 15 | |
| | Kraton® G1650 | 17.5 | 17.5 |
| | Kraton® G1651 | 17.5 | 17.5 |
| | $CaCO_3$ | 15 | 15 |
| | Drakeol® 34 oil | 25 | 25 |
| | Kristalex™ 5140 | 10 | 10 |
| | Hardness (Shore A) | 45 | 70 |
| | Melt Flow Rate (22° C./5.16 kg) | 31.74 | 18.1 |
| | Tear Strength (lbf/in) | 170 | 281 |
| | 100% Modulus | 209 | 466 |
| | 200% Modulus | 298 | 670 |
| | 300% Modulus | 415 | 932 |
| | Elongation at Break | 425 | 677 |
| | Tensile Strength | 576 | 2785 |
| | Young's Modulus | 0.324 | 0.67 |

As shown above, the non-commercial homopolymer produced using the process described above can improve polymer blends in a similar manner as commercial homopolymers.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

Example 13

Hot melt adhesives for hygiene and packaging applications were produced using the inventive propylene-ethylene copolymers depicted in TABLE 17. The copolymers used to manufacture these adhesive samples were produced in accordance with the process described in Example 1. Furthermore, TABLE 17 also indicates the electron donor that was used to produce the copolymers.

TABLE 17

| Copolymer Sample | 13A | 13B | 13C | 13D | 13E | 13F |
|---|---|---|---|---|---|---|
| Visc. @ 190° C., cP | 1813 | 2063 | 16525 | 18400 | 19000 | 1840 |
| Softening Point (° C.) | 133.5 | 130.6 | 110.4 | 115.9 | 117.4 | 132.7 |
| Needle Pen. (dmm) | 22.8 | 22.7 | 32.8 | 28.1 | 23.6 | 22.8 |
| Wt. % Ethylene | 16 | 16 | 22 | 21 | 20 | 16 |
| Wt. % Propylene | 84 | 84 | 78 | 79 | 80 | 84 |
| Electron Donor | D | D | D | D | D | D |

The adhesives were produced in accordance with the process described in Example 4. The adhesives were produced with various additives including Regalite™ R1090 (Eastman Chemical), Eastotac™ H100W (Eastman Chemical), Kaydol® mineral oil (Sonneborn), Licocene® wax (Clarient), Sasol wax H-1 (Sasol), and Irganox® 1010 (BASF). TABLE 18 and TABLE 19, below, describes the composition and properties of the inventive adhesives. TABLE 18 contains inventive adhesives that can be utilized for the hygiene construction market, while TABLE 19 contains inventive adhesives that can be used for packaging. It should be noted that the compositional components recited in TABLE 18 and TABLE 19 are based on weight percentage and that all components add up to 100 percent.

TABLE 18, above, describes the composition and properties of the inventive adhesives, which are labeled as IA1-IA9. Comparative commercial adhesives were also analyzed and are labeled as CA1-CA4. CA1-CA3 utilize olefin based polymers for adhesives in hygiene construction. CA4 is also a commercial adhesive using styrenic block copolymers for use in hygiene construction. The hygiene adhesives in TABLE 18 made using the inventive polymers show broad operating windows using wide range of spraying/coating techniques (signature, summit, CF, omega, intermittent, -slot, etc.) with excellent sprayability/coatability

TABLE 18

| Adhesives | IA1 | IA2 | IA3 | IA4 | IA5 | IA6 | IA7 | IA8 | IA9 | CA1 | CA2 | CA3 | CA4 |
|---|---|---|---|---|---|---|---|---|---|---|---|---|---|
| 13C | 40 | — | — | 35 | — | — | 35 | — | — | | | | |
| 13D | — | 40 | — | — | 35 | — | — | 35 | — | | | | |
| 13E | — | — | 40 | — | — | 35 | — | — | 35 | | | | |
| Regalite® R1090 | 48.5 | 48.5 | 48.5 | 46.5 | 46.5 | 46.5 | 46.5 | 46.5 | 46.5 | | | | |
| Kaydol® Oil | 10.5 | 10.5 | 10.5 | 10.5 | 10.5 | 10.5 | 10.5 | 10.5 | 10.5 | | | | |
| Sasol® H-1 wax | — | — | — | 7 | 7 | 7 | — | — | — | | | | |
| Licocene® 6102 | — | — | — | — | — | — | 7 | 7 | 7 | | | | |
| Irganox® 1010 | 1 | 1 | 1 | 1 | 1 | 1 | 1 | 1 | 1 | | | | |
| 300 mm Peel Strength-24 Hrs at Room Temperature (Signature Nozzle Sprayed Samples) | | | | | | | | | | | | | |
| g/mm | 2.64 | 3.17 | 2.63 | 4.62 | 4.51 | 5.1 | 4.64 | 4.03 | 4.86 | 1.73 | 4.64 | 4.62 | 3.44 |
| Std. Dev. | 0.2 | 0.43 | 0.19 | 0.2 | 0.42 | 0.28 | 0.33 | 0.29 | 0.36 | 0.17 | 0.19 | 0.37 | 0.23 |
| 300 mm Peel Strength-Body Temperature (Signature Nozzle Sprayed Samples) | | | | | | | | | | | | | |
| g/mm | 2.83 | 3.34 | 3.27 | 5.08 | 4.81 | 5.58 | 4.45 | 4.52 | 4.55 | 1.91 | 4.99 | 4.39 | 3.43 |
| Std. Dev. | 0.29 | 0.22 | 0.09 | 0.19 | 0.49 | 0.52 | 0.13 | 0.39 | 0.52 | 0.12 | 0.2 | 0.17 | 0.05 |
| 300 mm Peel Strength-2 Weeks Aged (Signature Nozzle Sprayed Samples) | | | | | | | | | | | | | |
| g/mm | 2.75 | 3.21 | 2.91 | 4.74 | 5.23 | 6.82 | 4.91 | 5.05 | 6.13 | 2.71 | 5.11 | 4.16 | 3.39 |
| Std. Dev. | 0.15 | 0.38 | 0.22 | 0.26 | 0.55 | 0.59 | 0.27 | 0.69 | 0.51 | 0.34 | 0.16 | 0.21 | 0.34 |
| Spray Temperature (° F.) | | | | | 305 to 350 | | | | | 305 | 350 | 325 | 335 |
| Brookfield Viscosity and Gardner Color | | | | | | | | | | | | | |
| Initial Viscosity at 177° C. (cPS) | 1600 | 1470 | 1657 | 925 | 660 | 992 | 1017 | 1145 | 1102 | 1780 | 3287 | 2250 | 1617 |
| 96 hrs at 177° C. Aged Viscosity (cPS) | 1390 | 1308 | 1507 | 857 | 2260 | 910 | 990 | 1050 | 975 | | 2245 | 987 | 240 |
| Initial Gardner Color | 1 | 1 | 1 | 1 | 1 | 1 | 1 | 1 | 1 | 1 | 1 | 2 | 8 |
| 96 hrs at 177° C. Aged Gardner Color | 8 | 8 | 6 | 7 | 8 | 7 | 6 | 7 | 7 | 9 | 12 | 18 | 18 |
| 300 mm Peel Strength-24 Hrs at Room Temperature (CF Nozzle Sprayed Samples) | | | | | | | | | | | | | |
| g/mm | 5.58 | 5.99 | 6.24 | 8.36 | 8.33 | 10.28 | 9.49 | 9.06 | 9.94 | | | | |
| Std. Dev. | 0.36 | 0.39 | 0.68 | 0.24 | 0.71 | 0.51 | 0.43 | 0.93 | 0.61 | | | | |
| 300 mm Peel Strength-Body Temperature (CF Nozzle Sprayed Samples) | | | | | | | | | | | | | |
| g/mm | 5.75 | 6.2 | 6.58 | 8.94 | 9.24 | 10.11 | 8.92 | 9.79 | 9.44 | | | | |
| Std. Dev. | 0.32 | 0.15 | 0.49 | 0.44 | 0.51 | 0.38 | 0.36 | 0.77 | 0.49 | | | | |
| 300 mm Peel Strength-2 Wks Aged (CF Nozzle Sprayed Samples) | | | | | | | | | | | | | |
| g/mm | 5.88 | 6.76 | 6.26 | 10.31 | 10.39 | 14.32 | 12.06 | 11.69 | 11.49 | | | | |
| Std. Dev. | 0.25 | 0.36 | 0.35 | 0.85 | 1.44 | 0.75 | 0.88 | 0.61 | 0.42 | | | | |
| Spray Temperature (° F.) | | | | | 270 to 350 | | | | | | | | | characteristics over a wide range of temperatures (270° F. to 350° F.) with good adhesive peel at room temperature, body temperature and under aged conditions (elevated temperature and room temperature) with an add-on level varying from 0.5-8.0 gsm. Thermal stability, Garner color and Brookfield viscosity stability of the adhesives made using inventive polymers are also excellent, and the adhesives made using the inventive polymers are clear at room temperature with no color and no odor.

The initial viscosity of the adhesives in TABLE 19 was measured at 177° C., along with the SAFT, PAFT, % fiber tear and open/set times. Aged viscosities of the adhesives were generated to determine the processability characteristics and long term aging stability of the adhesives. The PAFT and SAFT measurements are performed to understand the peel adhesion and shear strength of the adhesives over a temperature period in a SAFT oven. Furthermore, the initial and aged color in Gardner color scale was also measured.

(c) Irganox® 1010 antioxidant 0.22 kg (0.4925 lbs.) (~0.985 weight percent); and
(d) Eastobrite® Optical Brightener OB-1 0.0011 kg (0.0025 lbs.) (0.005 weight percent).

Before starting the batch, the vacuum header in the column was adjusted, and the temperature of the system was subsequently set to 150° C. by circulating hot oil in the jacket of the distillation column. Isopar™ L and dry ice were charged to the cold trap and the actions were recorded on the production batch sheet. The oil recirculation in the distillation column was then shut off to maintain the temperature at 150° C. At that point, the following ingredients were charged to the reactor under a purge of 10 ft³/hr nitrogen: (a) Regalite® 1090 resin; (b) Irganox® 1010 antioxidant; and (c) Eastobrite® optical brightener OB-1 in the amounts noted above.

The temperature of the heating oil was then raised to 190° C. ensuring that the adhesive composition temperature

TABLE 19

|  | IA10 | IA11 | IA12 | IA13 | IA14 | IA15 | IA17 | IA18 | IA19 | IA20 |
|---|---|---|---|---|---|---|---|---|---|---|
| 13A | 60 | 75 |  |  |  |  | 60 | 75 |  |  |
| 13F |  |  | 60 | 75 | 60 | 75 |  |  | 60 | 75 |
| Regalite ® R1090 | 14.5 | 4.5 | 14.5 | 4.5 |  |  | 14.5 | 4.5 | 14.5 | 4.5 |
| Eastotac ® H100W |  |  |  |  | 14.5 | 4.5 |  |  |  |  |
| Licocene ® 6102 | 24.5 | 19.5 | 24.5 | 19.5 | 24.5 | 19.5 |  |  |  |  |
| Sasol H1 Wax |  |  |  |  |  |  | 24.5 | 19.5 | 24.5 | 19.5 |
| Irganox ® 1010 | 1 | 1 | 1 | 1 | 1 | 1 | 1 | 1 | 1 | 1 |
| Adhesive Properties | | | | | | | | | | |
| Initial Brookfield viscosity @ 177° C. | 742.5 | 1170 | 800 | 1165 | 790 | 2640 | 552 | 935 | 565 | 930 |
| Aged (96 hrs at 177° C.) Brookfield viscosity @ 177° C. | 715 | 1070 | 677 | 1035 | 715 | 2377 | 445 | 790 | 452 | 795 |
| Initial Gardner color | 1 | 1 | 1 | 1 | 1 | 1 | 1 | 1 | 1 | 1 |
| Aged Gardner color (96 hrs at 177° C.) | 8 | 8 | 8 | 8 | 10 | 7 | 8 | 7 | 8 | 6 |
| PAFT, Kraft paper (° C.) | 27.2 | 26.5 | 26.7 | 26.5 | 32.1 | 31 |  |  |  |  |
| PAFT Std. Deviation | 1.3 | 0.1 | 0.4 | 0.4 | 4.3 | 3.6 |  |  |  |  |
| SAFT, Kraft paper (° C.) | 123.3 | 70 | 108.7 | 127.3 | 118.5 | 110.8 |  |  |  |  |
| SAFT – Std. Deviation | 3.5 | 8.5 | 12.9 | 3.3 | 2.3 | 1.9 |  |  |  |  |
| Open/Set time (sec) | 40/18 | 32/12 | 35/13 | 32/15 | 32/9 | 45/17 | 20/25 | 20/27 | 15/20 |  |
| % Fiber Tear | | | | | | | | | | |
| 0° C. (3x = 3 samples) | 100 (3x) | 100 (3x) | 100 (3x) | 100 (3x) | 100 (3x) | 100 (3x) | 0 (3x) | 0 (3x) | 0 (3x) | 0 (3x) |
| Room Temperature (3x = 3 samples) |  |  |  |  | 100 (3x) | 100 (3x) | 0 (3x) | 0 (3x) | 0 (3x) | 0 (3x) |
| 135° C. (3x = 3 samples) | 0 (3x) | 0 (3x) | 0 (3x) | 0 (3x) | 25 (3x) | 0 (3x) | 0.5 (3x) | 0 (3x) | 0 (3x) | 0 (3x) |

Example 14

For this Example, an adhesive containing the low molecular weight propylene-ethylene copolymer was prepared. The adhesive comprised 60 weight percent of the low molecular weight ethylene/propylene copolymer and 40 weight percent of Regalite® 1090 hydrocarbon resin (Inventive Copolymer 60/40).

21.91 kg (48.2 bs.) of adhesive composition was prepared in a conical reactor equipped with intermeshing spiral agitators and a distillation column. The composition of the adhesive composition was as follows:
(a) low molecular weight propylene-ethylene copolymer 12.71 kg (27.99 lbs.) (~59.5 weight percent);
(b) Regalite® 1090 resin 8.98 kg (19.75 lbs.) (~39.5 weight percent);

reached a maximum temperature of 180° C. When the adhesive composition temperature reached 130° C., the agitator was started and operated at 6 minutes forward and 6 minutes reverse at 25 rpm. When the oil temperature reached 180° C., the low molecular weight copolymer (13.52 kg (29.75 lbs.) or 59.50% of total formula) was added in two aliquots of 6.82 kg (15 lbs.) and 6.59 kg (14.75 lbs.), respectively, through the main port. After addition of each aliquot at 180° C., the mixture was stirred at 25 rpm, for 30 minutes. When the last aliquot of the copolymer was added, the mixture was stirred for 60 minutes at 180° C. and 25 rpm, and then the hot melt adhesive composition was extruded into wax-coated boxes through the ram valve. The system was purged with 30 ft³/hr nitrogen and the reactor was drained for 30 minutes at 180° C. After the 30 minutes hold time for draining, the adhesive composition temperature was decreased to 75° C. and the draining of the reactor was continued.

Example 15

For this example, an adhesive comprising around 52 weight percent of the inventive low molecular weight propylene-ethylene copolymer was produced.

113.56 kg (250.14 lbs.) of adhesive composition were prepared in a conical reactor equipped an intermeshing spiral agitators and a distillation column. The adhesive composition was as follows:
(a) Inventive Low Molecular Weight Copolymer—59.07 kg (130.12 lbs.) 52.0 weight percent;
(b) Regalite® 1090 resin—51.08 kg (112.5 lbs.) 45.0 weight percent;
(c) Sasol® H1 Wax—2.27 kg (5.0 lbs.) 2.0 weight percent;
(d) Irganox® 1010 antioxidant—1.13 kg (2.49 lbs.) 0.995 weight percent; and
(e) Eastobrite® optical brightener OB-1 0.0057 kg (0.0125 lbs.) 0.005 weight percent.

Before starting the batch, the vacuum header in the column was adjusted and the temperature of the system was subsequently set to 150° C. by circulating hot oil in the jacket of the distillation column. Isopar™ L and dry ice were charged to the cold trap; the actions were recorded on the production batch sheet. The oil recirculation in the distillation column was then shut off to maintain the temperature at 150° C. At that point, the ingredients listed below were charged to the reactor under a purge of 10 ft³/hr nitrogen.

| Regalite ® 1090 resin | 51.14 kg (112.5 lbs.) |
| Sasol ® H1 Wax | 2.27 kg (5.0 lbs.) |
| Irganox ® 1010 antioxidant | 1.14 kg (2.49 lbs.) |
| Eastobrite ® OB 1 | 0.0057 kg (0.0125 lbs.) |

The temperature of the heating oil was then raised to 190° C., thereby ensuring that the adhesive composition temperature reached a maximum temperature of 180° C. When the blend temperature reached 130° C., the agitator was started and operated at 6 minutes forward and 6 minutes reverse at 25 rpm. When the oil temperature reached 180° C., the low molecular weight copolymer was then added (59.1 kg—130 lbs.—or 52.0% of total formula) in five aliquots (four of 13.64 kg (30 lbs.) each and the last of 4.55 kg (10 lbs.)) through the main port. After each addition at 180° C., the mixture was stirred at 25 rpm for 30 minutes. When the last aliquot of low molecular weight copolymer was added, the mixture was stirred for 60 minutes at 180° C. and 25 rpm, and then the hot melt adhesive was extruded into wax-coated boxes through the ram valve. The system was purged with 30 SCFH nitrogen, and the reactor was drained for 30 minutes at 180° C. After the 30 minutes hold time for draining, the composition temperature was decreased to 75° C. and the draining of the reactor was continued.

Example 16: Preparation of Hot Melt Adhesive Containing Aerafin® 180

27.27 kg (59.993 lbs.) of adhesive were prepared in a conical reactor equipped with a distillation column. Before starting the batch, the vacuum header in the column was adjusted and the temperature of the system was subsequently set to 150° C. by circulating hot oil in the jacket of the distillation column. Isopar™ L and dry ice were charged to the cold trap; the actions were recorded on the production batch sheet. The oil recirculation in the distillation column was then shut off to maintain the temperature at 150° C.

At that point, the ingredients listed below were charged to the reactor under a purge of 10SCFH nitrogen.
(a) Regalite® 1090 resin—12.68 kg (27.9 lbs.) 46.50 weight percent;
(b) Kaydol® Mineral Oil—2.86 kg (6.3 lbs.) 10.00 weight percent;
(c) Sasol® H1 Wax 1.91 kg (4.2 lbs.) 7.00 weight percent;
(d) Irganox 1010 antioxidant 0.27 kg (0.59 lbs.) 0.983 weight percent; and
(e) Eastobrite® OB-1 0.0014 kg (0.003 lbs.) 0.005 weight percent.

The temperature of the heating oil was then raised to 190° C., thereby ensuring that the adhesive composition temperature reached a maximum temperature of 180° C. When the adhesive composition temperature reached 130° C., the agitator was started and operated at 6 minutes forward and 6 minutes reverse at 25 rpm. When the oil temperature reached 180° C., the Comparative Aerafin® 180 copolymer (9.55 kg—21 lbs., or 35% of total formula) was then added in three aliquots of 7 lbs. through the main port. After each addition at 180° C., the mixture was stirred at 25 rpm for 30 minutes. When the last aliquot of copolymer was added, the mixture was stirred at 180° C. and 25 rpm, and then the hot melt adhesive was extruded into wax-coated boxes through the ram valve. The system was purged with 30 SCFH nitrogen and the reactor was drained for 30 minutes at 180° C. After 30 minutes of hold time for draining, the polymer temperature was decreased to 75° C. and the draining of the reactor was continued. The final composition of the adhesive was as follows:

| Comparative Aerafin ® 180 | 9.55 kg (21 lbs.) | 35.017% |
| Regalite ® 1090 resin | 12.68 kg (27.9 lbs.) | 46.50% |
| Kaydol ® Mineral Oil | 2.86 kg (6.3 lbs.) | 10.00% |
| Sasol ® H1 Wax | 1.91 kg (4.2 lbs.) | 7.00% |
| Irganox ® 1010 antioxidant | 0.27 kg (0.59 lbs.) | 0.983% |
| Eastobrite ® optical brightner OB 1 | 0.0014 kg (0.003 lbs.) | 0.005% |

The following test methods and sample preparation techniques were utilized to test the produced adhesives and the copolymers utilized in Examples 14-16.

Thermal Properties Measurement

Thermal properties, such as melt temperature and energy were evaluated using a Mettler Toledo differential Scanning Calorimeter, DSC2 STAR$^e$ System (1900 Polaris Parkway, Columbus, Ohio, USA 43240), equipped with a 400 w furnace supply and a Ceramic FRS2 High DSC sensor. The instrument was controlled by a DSC STAR$^e$ Software, Version 13.00a (build 6917), installed on a HP Z230 workstation. The software was also used for data processing.

10-15 mg of sample was placed in a 40 μl aluminum crucible (model 1/3 ME 51119870, without pin) and then sealed with an aluminum lid (model 1/2ME 51119871).

The sealed crucible was placed in a DSC furnace and heated from room temperature to 200° C., held at 200° C. for 10 minutes, and then cooled to −100° C., held at that temperature for 10 minutes, and heated again to 200° C. Finally, the sample was cooled from 200° C. to room temperature. The heating rate was 10 c/min and the cooling rate was −10° C./min. The thermograms for both heating and cooling phases were recorded. The melt and crystallization, as well as the melting and crystallization energies were evaluated from the data in the thermograms (second heat and first cool) using the DSC STAR$^e$ Software.

Crystallinity by X-Ray Diffraction

The crystallinity of the polymers was evaluated using a PANalytical Empyrean XRD Spectrometer (2555 55th Street, Boulder, Colo., USA 80301) equipped with an anode energized to 45 kV and 40 mA to produce a collimated, monochromatic Copper-Kα radiation striking the sample and producing diffraction patterns. The patterns were collected, in the Bragg Brentano reflection geometry, with a detector angle fixed to 2 times the incident angle (θ–2θ), from 5 degree 2θ angle to 90 degree 2θ angle, for a sampling width of 0.02 degrees, and a step time of 160 seconds.

The samples were cut into ~1 inch squares that were 3 to 6 mm thick and then mounted flat on a stationary xyz stage using double sided tape. The samples were exposed to the X-ray beam and the diffraction patterns were collected.

Peak deconvolution of X-ray diffraction patterns were performed using JADE XRD Pattern Processing, Identification and Quantification Software (Version 9.5.0) from Materials Data Incorporated (MDI, Livermore, Calif.). An estimation of percent crystallinity was calculated based on the integrated intensities of de-convoluted and fitted diffraction peaks from 10 degrees 2θ to 32 degrees 2θ. From the integrated diffraction peaks and the use of the Scherrer equation, estimations of crystallite sizes were then calculated. Fitted diffraction peaks with crystallite sizes greater than 30 Å was defined as belonging to crystalline regions of the polymer and peaks with crystallite size less than or equal to 30 Å were defined as belonging to amorphous regions of the polymer.

The inventive low molecular weight copolymer had a crystallinity of 25+/–2%, while the crystallinity of the comparative Aerafin® 180 copolymer had crystallinity of 20+/–2 when measured by X-ray diffraction.

Rheology Temperature Sweep

The viscoelastic properties of the polymer were evaluated using TA Instruments 400801 series/ARES G1 controlled with a TA Orchestrator 4800-0026 (Firmware ARES V7.2.0.4) installed on HP Compaq computer. Parallel plate geometry of either 8 or 25 mm was used. The gap between plates was 1 mm. When the 8 mm plates were used the following experimental setup was adopted: 5% maximum applied strain, 1,000 g-cm maximum torque, 30 g-cm minimum torque, 300% strain adjustment of current strain, and 0.5% strain. In the case the 25 mm plates were used the conditions adopted were 50% maximum applied strain, 100 g-cm maximum torque, 30 g-cm minimum torque, 30% strain adjustment of current strain, and 5% strain.

A temperature ramp of 6° C./min, a frequency of 10 rad/s, and a temperature range of –80° C. to 170° C. were adopted for all the runs.

The viscoelastic properties determined by using this method encompass storage and loss moduli (G' and G") and tangent delta (tan δ). Also, the technique allows determination of the glass transition temperature (Tg) of the polymer.

Figure 5:
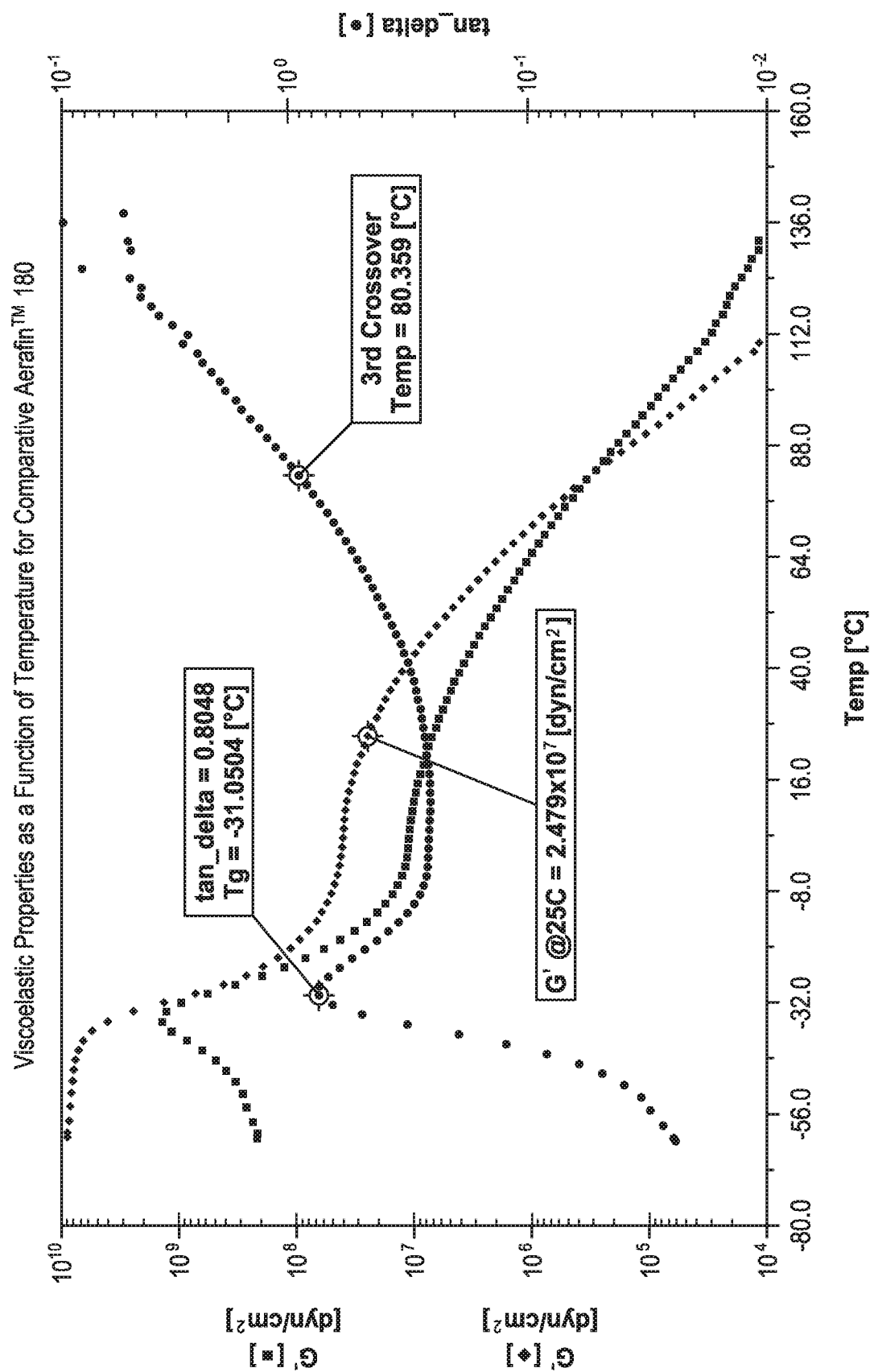
FIG. 5 depicts the viscoelastic properties as a function of temperature for comparative Aerafin® 180 copolymer.
Figure 6:
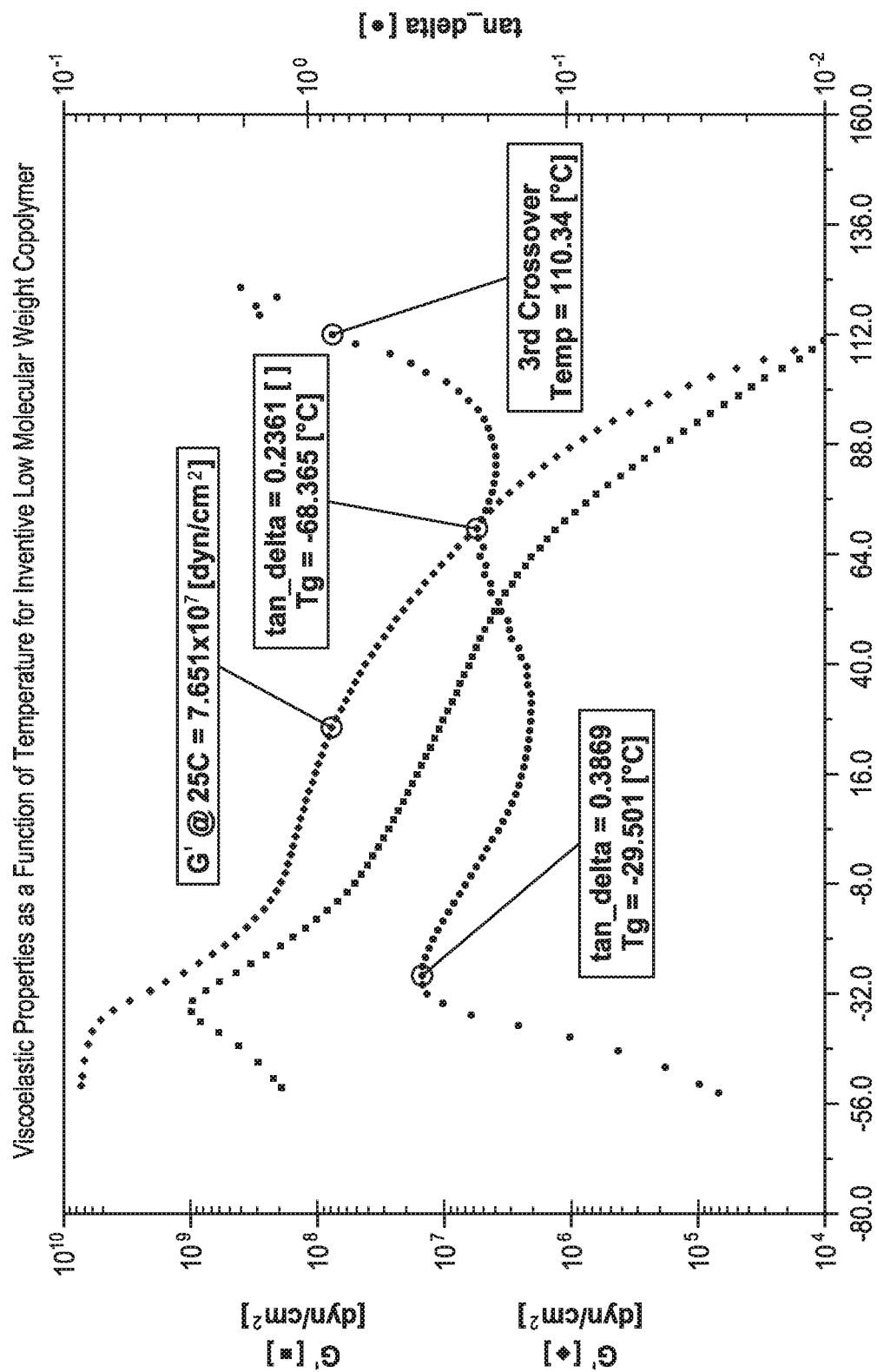
FIG. 6 depicts the viscoelastic properties as a function of temperature of the inventive low molecular weight copolymer.

FIGS. 5 and 6 show the difference between the profiles of the Comparative Aerafin® 180 copolymer and the Inventive Low Molecular Weight Copolymer. More notably, the Inventive Low Molecular Weight Copolymer showed two transition temperatures, the first around –29.5° C. and the second transition at about 68.3° C., while the Comparative Aerafin® 180 copolymer showed only one transition at –31.5° C.

Also, the Inventive Low Molecular Weight Copolymer displayed a higher strength, characterized by a lower tan delta value, than the Comparative Aerafin® 180 copolymer. This is also highlighted at 25° C. by the display of a high value of the storage modulus G'.

Rheology—Capillary Rheometry—Viscoelastic Properties as a Function of Shear Rate Ceast SR20 Instron Capillary Rheometer was used to measure the melt viscosity at the shear rate range of 10-30,000 1/sec. 0.5 mm. Die was used to measure the melt viscosity, pressure, fluid volume and fluid velocity, at 140° C., as a function of shear rate. 20-30 grams of sample amount were needed for the measurement.

Figure 7:
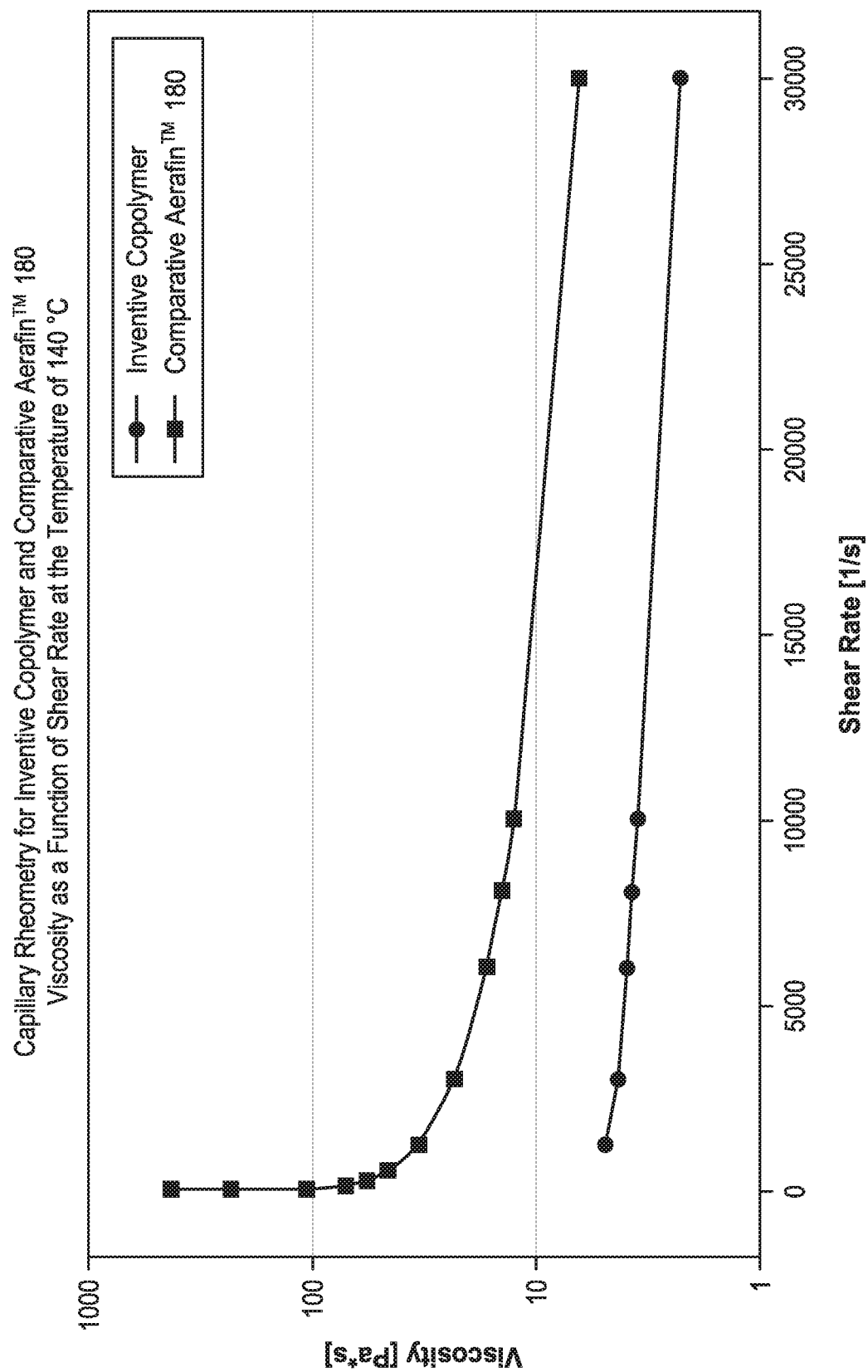
FIG. 7 depicts the capillary rheometry for the inventive low molecular weight copolymer and comparative Aerafin® 180 copolymer.

The inventive low molecular weight copolymer was relatively Newtonian over a wide range of shear rates as shown in FIG. 7. The low resistance to flow for the molten inventive low molecular weight copolymer makes it also easier to process and use in applications where high shear is typically encountered.

Molecular Weight Determination

The samples were analyzed using a Malvern Viscotek HT-350A High Temperature Gel Permeation Chromatograph equipped with 2 Viscotek VE1122 pumps (main and an auxiliary); a Viscotek Model 430 vortex heater stirrer autosampler; a VE7510 GPC degasser; a HTGPC Module 350A oven; a Microlab 500 series auto syringe for sample preparation, and a triple detection system consisting of a combination of laser light scattering, refractometer, and differential viscosity detectors. The GPC contained PLGel 5 micron Guard 50×7.5 mm column and 2× PLGel 5 micron Mixed-C 300×7.5 mm columns running 1,2,4-trichlorobenzene as the solvent at a flow rate of 0.7 ml/min at 135° C. The instrument was controlled by Malvern OmniSEC software.

50 to 70 mg of each sample were weighed into sample vials and mixed with 10 mL of 1,2,4-trichlorobenzene to make about 5.0 to 7.0 mg/mL blend. The vials were placed in a Viscotek Model 430 vortex heater stirrer autosampler to equilibrate at room temperature, for about 1 hour, under agitation using a magnetic stirrer bar, then the samples were heated for no more than 4 hours at 135° C.

Analysis of Results

For each specimen, two injections were used and the chromatograms for each injection were collected. The samples were analyzed by conventional GPC using a single narrow polystyrene standard calibration, light scattering, triple detection and universal calibration. The analysis of the light scattering data, the conventional GPC analysis, triple detection analysis, and universal calibration analysis were done using same Malvern OmniSEC software. The weight average molecular weight (Mw), number average molecular weight (Mn), and the Z-average molecular weight (Mz) were determined for each sample using the Malvern OmniSEC software.

The weight average molecular weight (Mw), number average molecular weight (Mn), Z-average molecular weight (Mz), polydispersibility index (Mw/Mn) were determined for each sample.

Effects of Molecular Weight Polydispersibility on Performance of Hot Melt Adhesives Mn, Mw, Mz and Mw/Mn for each sample is shown in Table 20 provided below. For statistical design of experiments purposes the molecular weights, expressed as Mw/Mn, were codified into design unit values (F: molecular weight) of –1, –0.5, 0, 0.5, and 1.

TABLE 20

| Sample | Mn | Mw | Mz | Mw/Mn | F: molecular weight |
|---|---|---|---|---|---|
| A | 2,968 | 29,017 | 96,653 | 9.78 | −1.00 |
| B | 1,453 | 32,145 | 107,283 | 22.12 | −0.50 |
| C | 4,035 | 32,794 | 105,378 | 8.13 | 0.00 |
| D | 10,471 | 41,001 | 112,471 | 3.92 | 0.50 |
| E | 2,306 | 40,523 | 130,662 | 17.57 | 1.00 |

Figure 8:
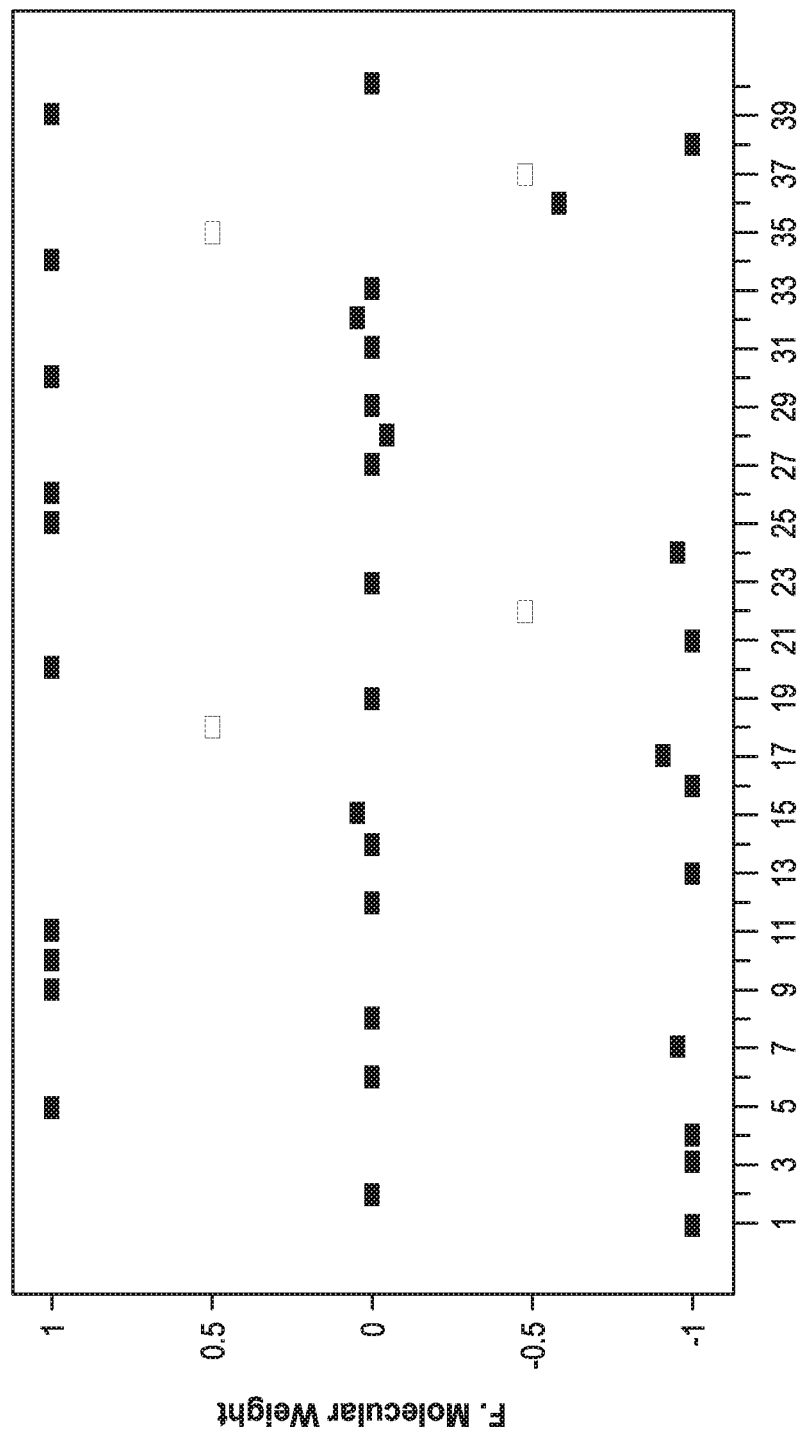
FIG. 8. depicts the experimental layout for molecular weight.

FIG. 8 shows the layout of the five general levels of molecular weight in with designed unit values (F: molecular weight) of −1, −0.5, 0, 0.5, and 1, and the forty (40) groups of runs in this design.

A fully deployed DOE comprised 153 runs yielding laminated samples on which the peel strength was measured and then correlated to the molecular weight. Moreover, the runs were used in statistical analysis to define the optimized formulation.

Figure 9:
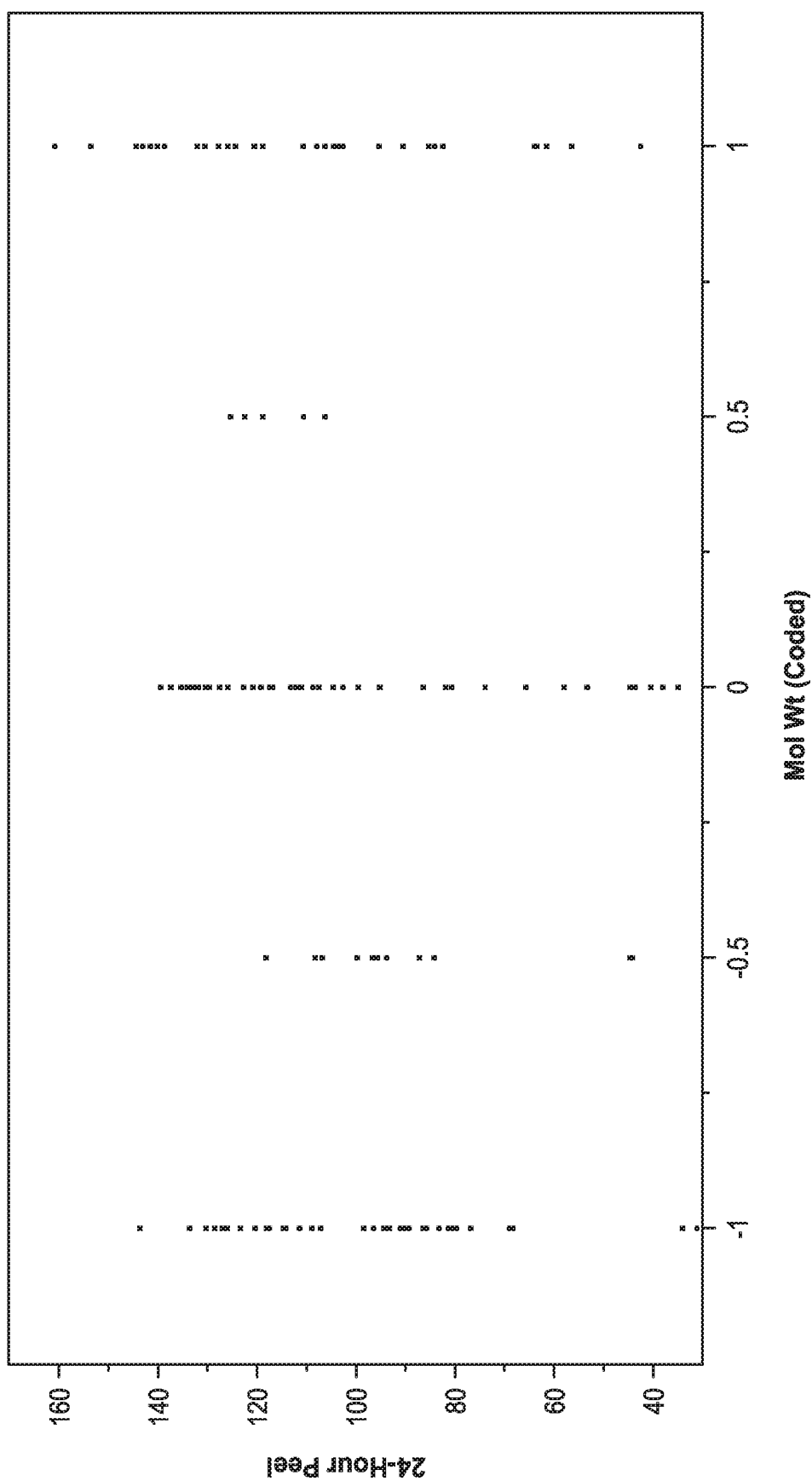
FIG. 9. depicts the peel strength performance for adhesive compositions for various molecular weight distributions.

The results of the evaluation of the peel strength performance for adhesive compositions prepared using ethylene-propylene copolymers of various molecular weight distributions are shown in FIG. 9.

Polymer samples with molecular weight codes of −1, 0 and 1 corresponding to polydispersibility index of 8 to 18 provided a peel strength above 160 g/25 mm. The highest peel was obtained for a polymer sample with a polydispersibility index of 18.

When Regalite® R1090 hydrocarbon resin was used with the inventive low molecular weight copolymer, the optimum formula was defined for a composition that does not contain mineral oil. In this case, the performance of the hot melt adhesives based on the inventive copolymer was independent of molecular weight.

Figure 10:
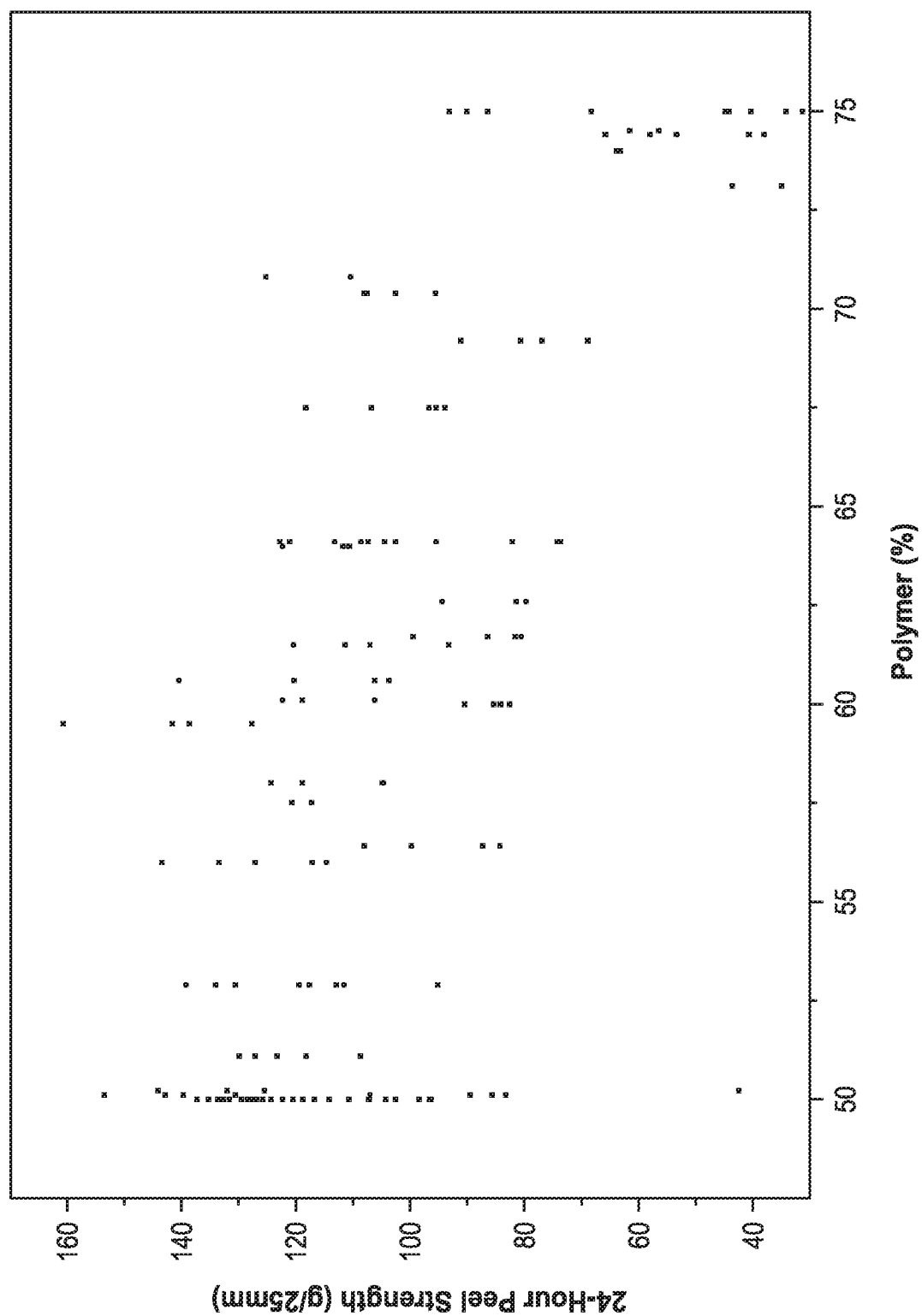
FIG. 10 depicts the peel strength as a function of the inventive low molecular weight copolymer content in various adhesive formulations.
Figure 11:
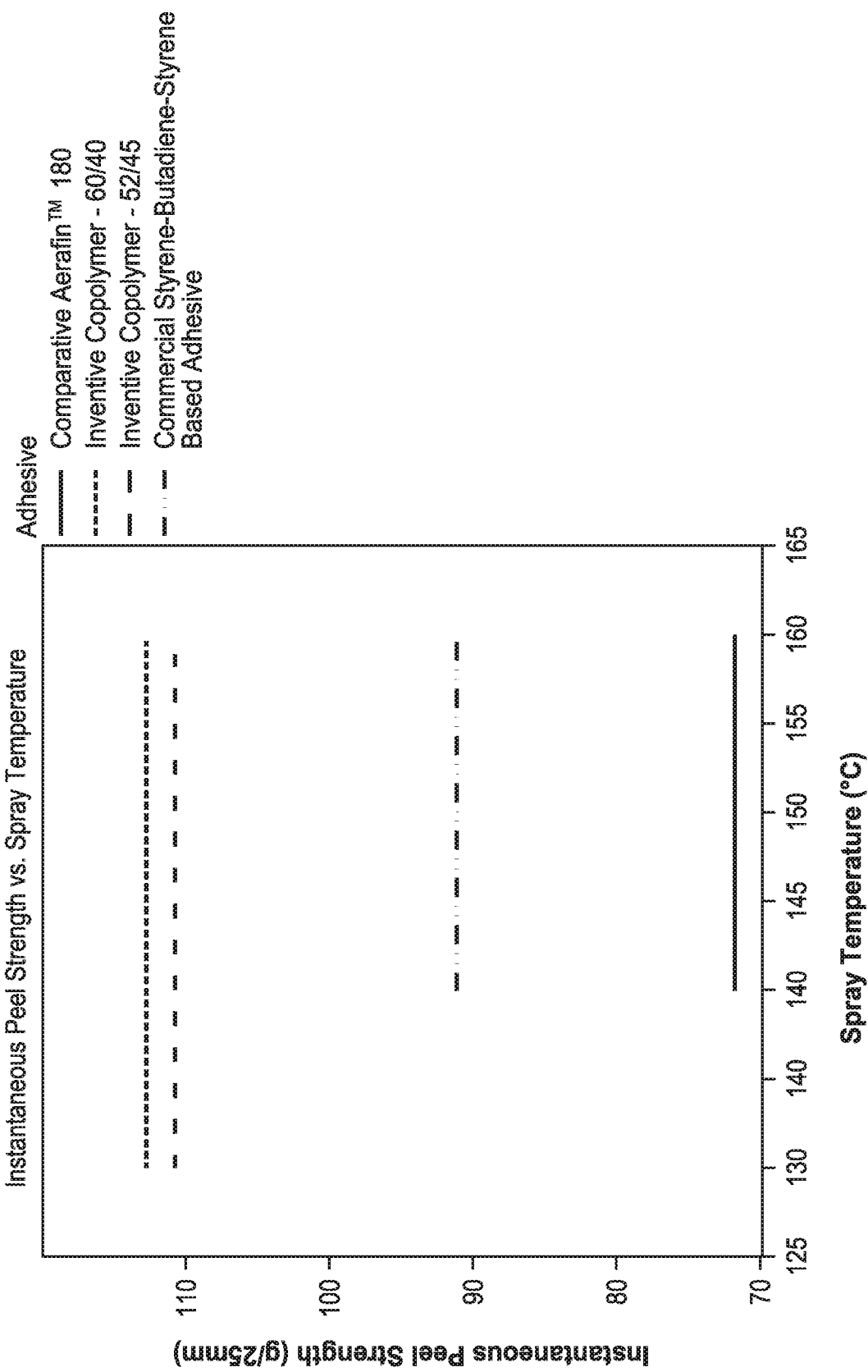
FIGS. 11-20 depict the peel strengths versus spray temperatures of adhesive compositions containing the inventive low molecular weight copolymer as well as comparative data.
Figure 12:
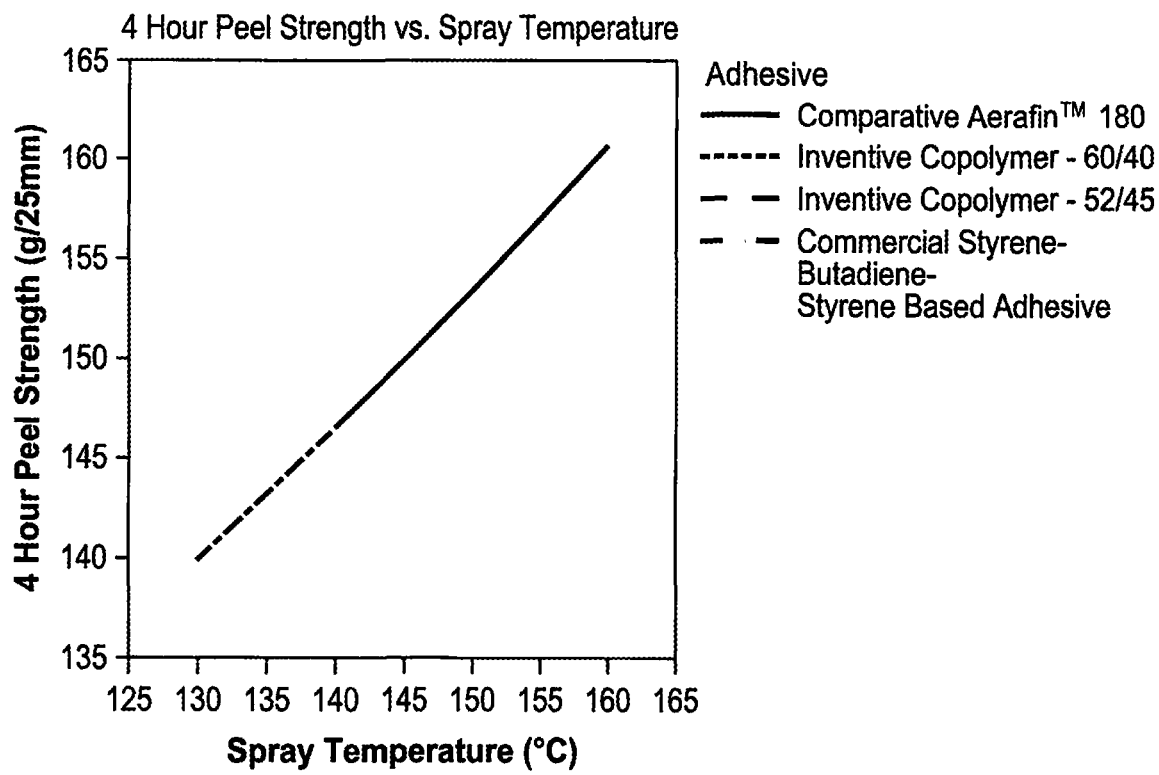
Figure 13:
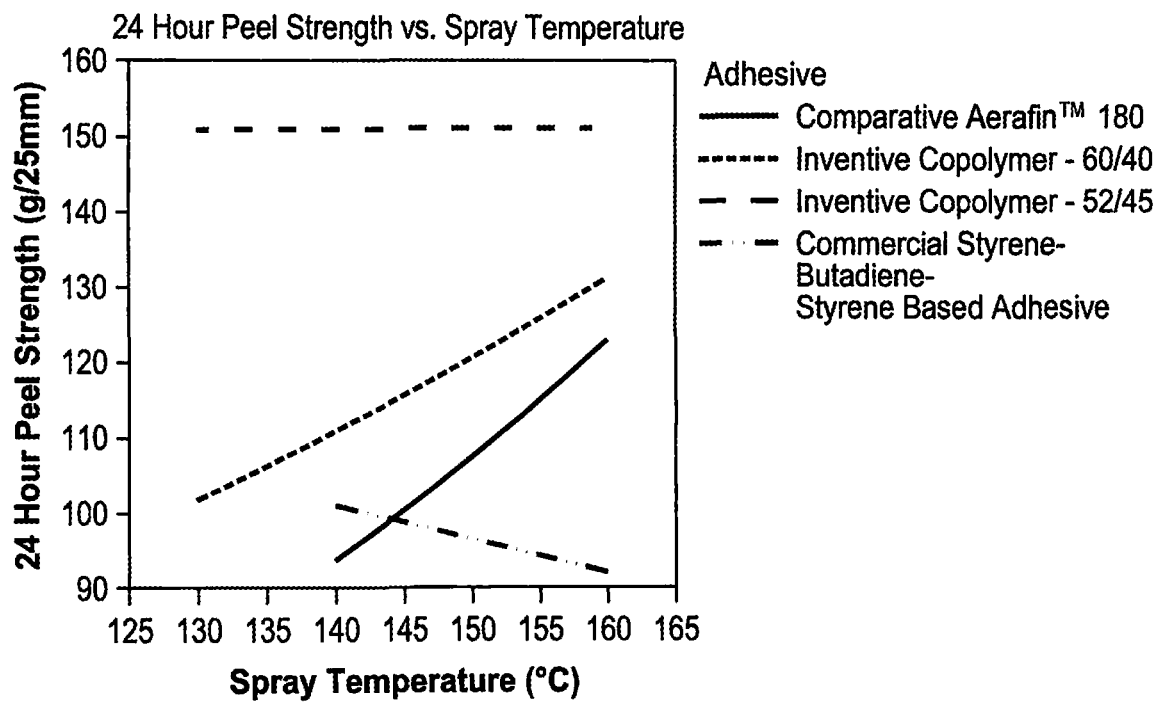
Figure 14:
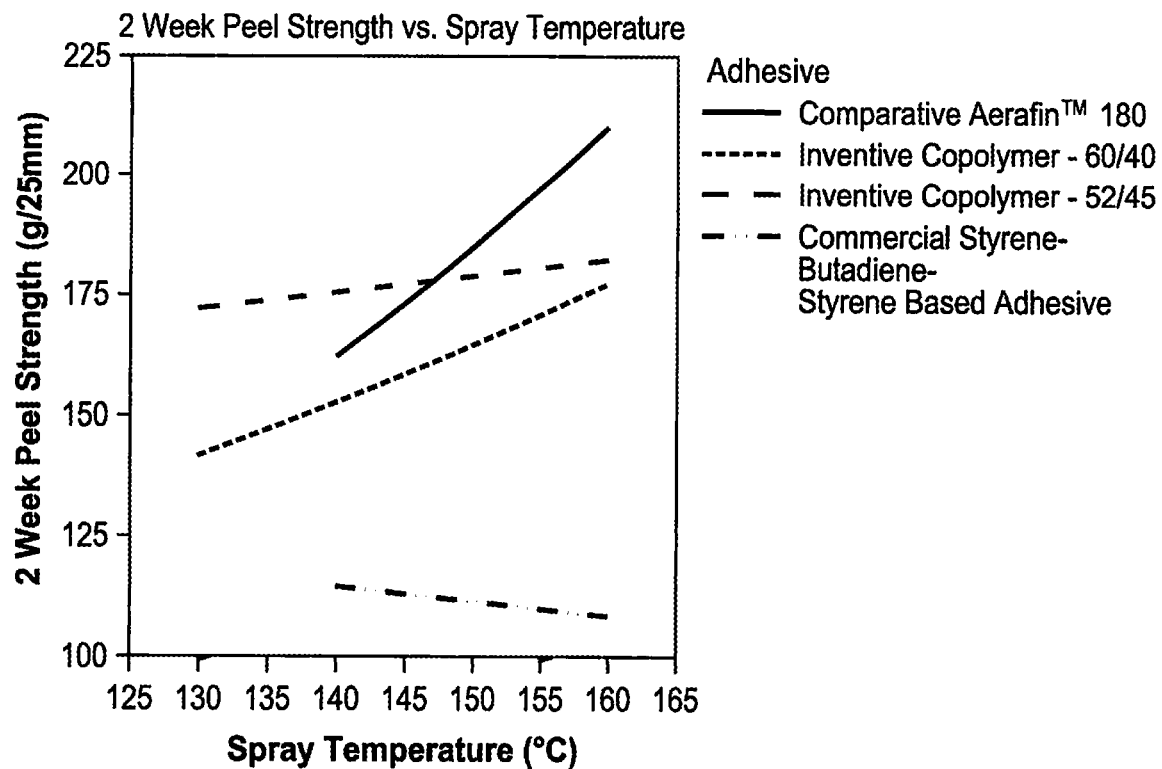
Figure 15:
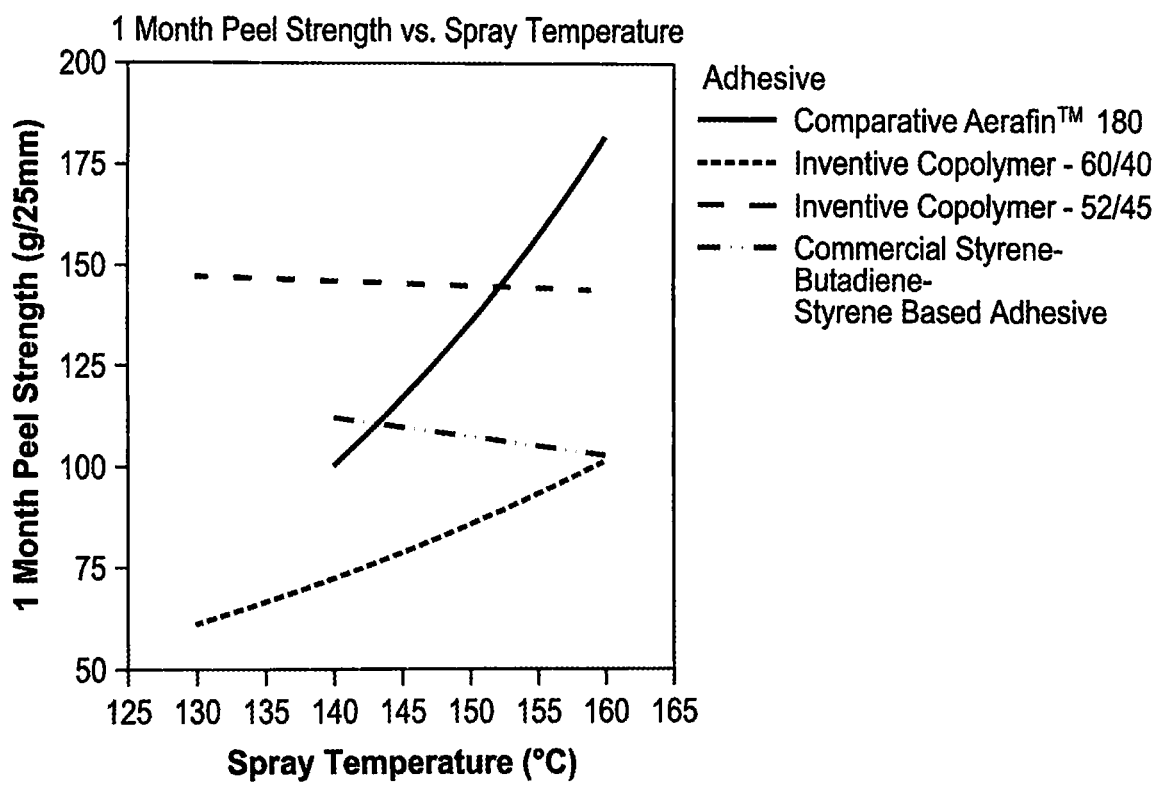
Figure 16:
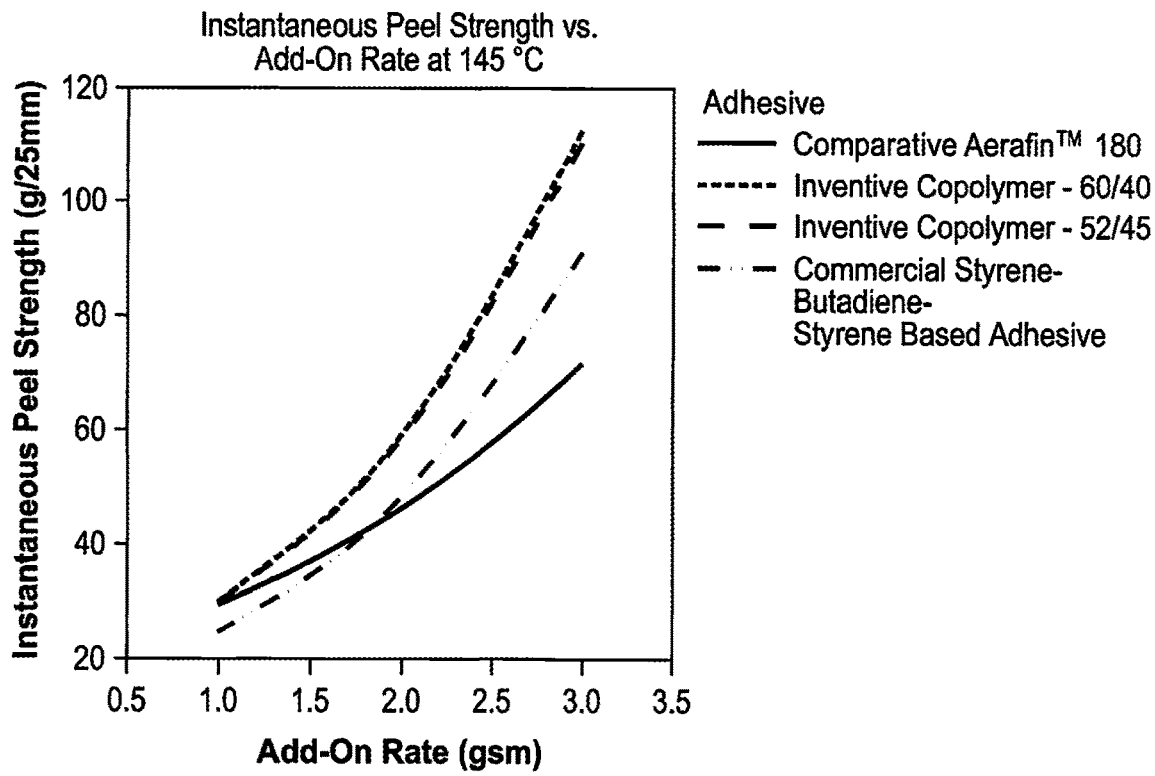
Figure 17:
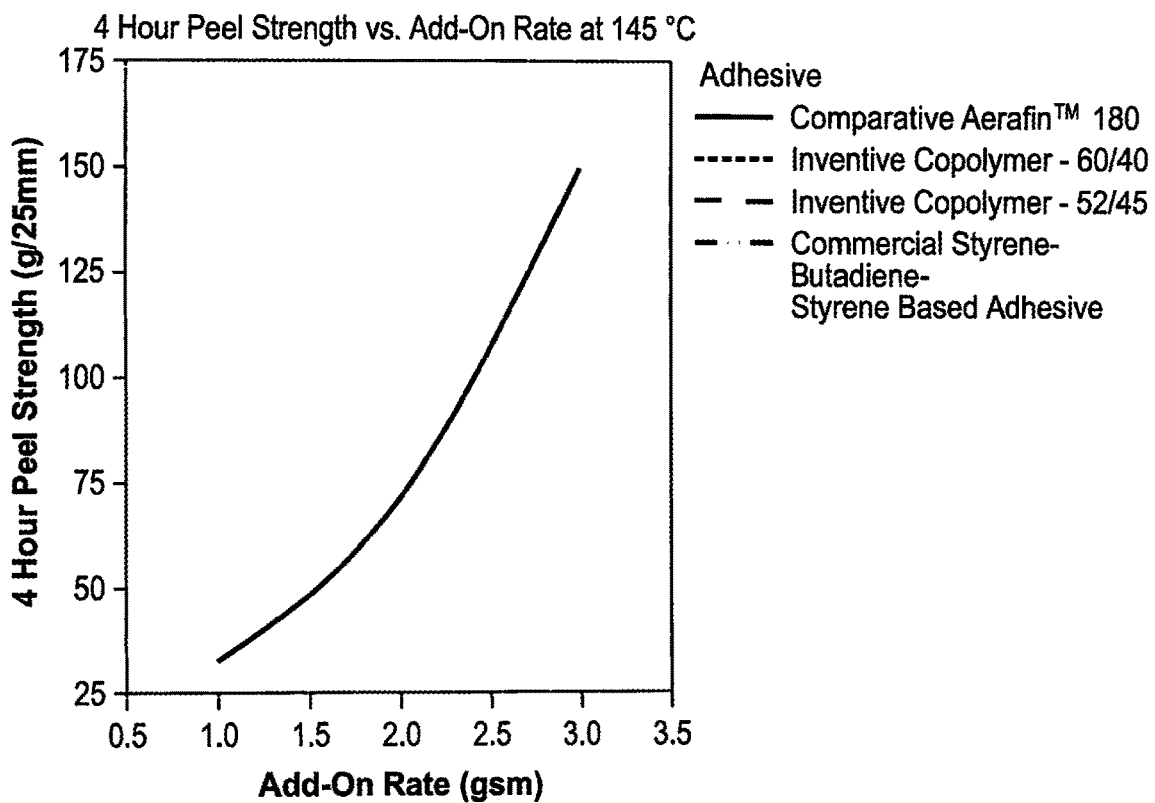
Figure 18:
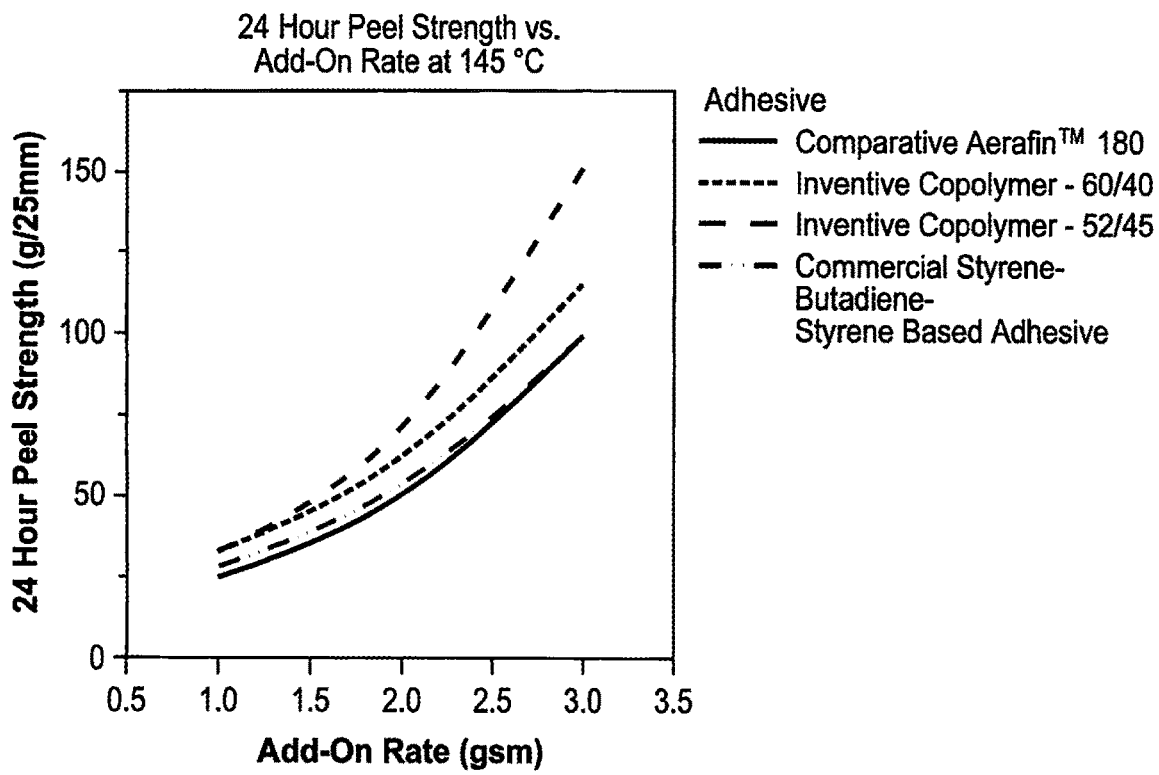
Figure 19:
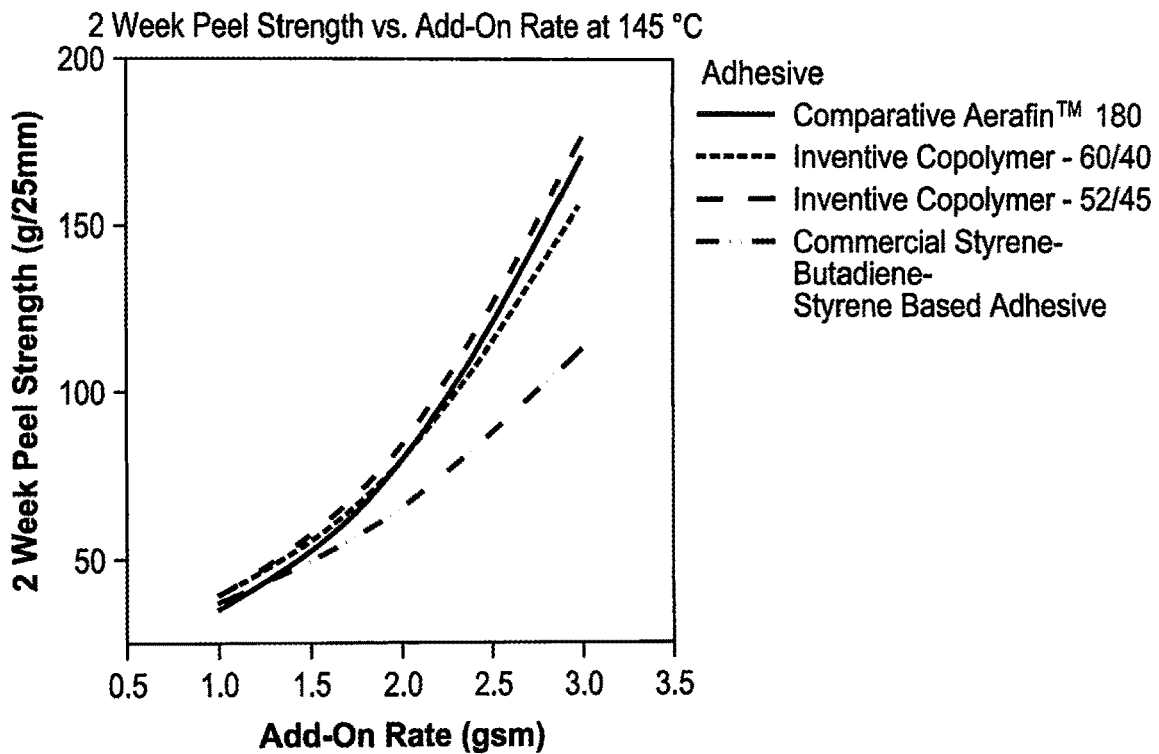
Figure 20:
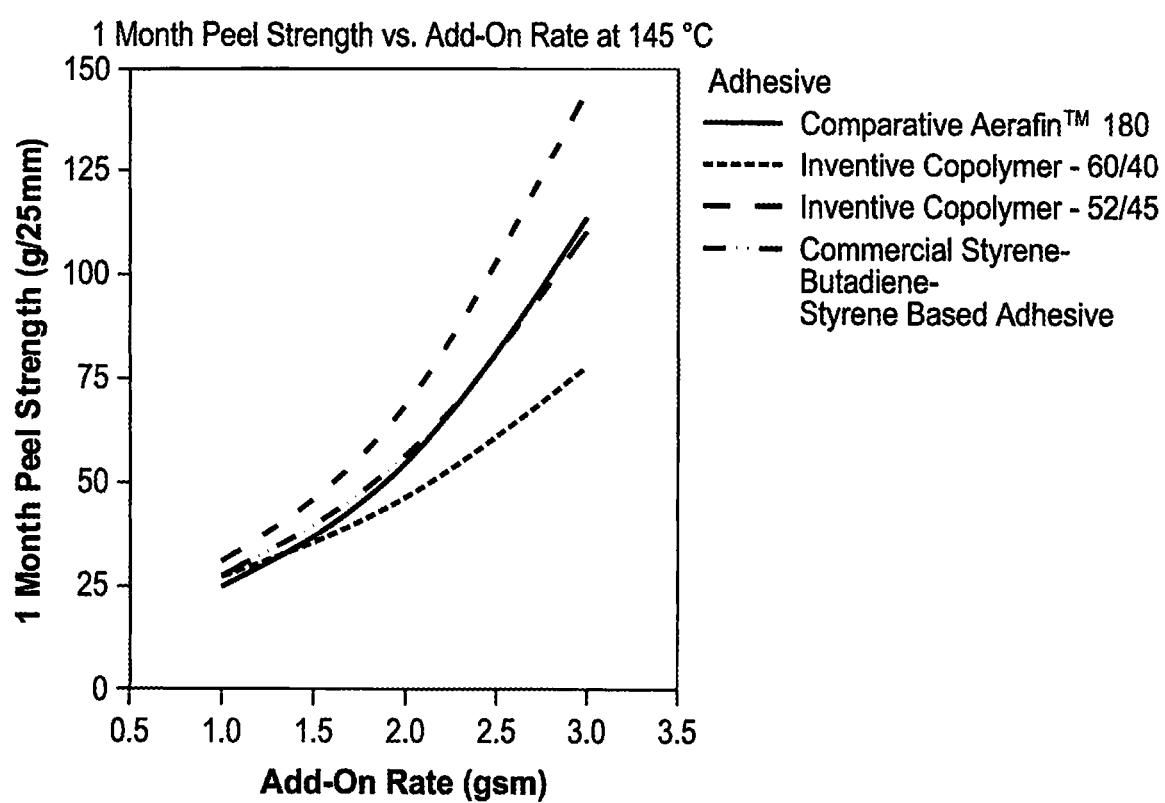

The values of the peel strength as a function of the polymer content in the various formulations are shown FIG. 10.

Details on the optimum composition of the hot melt adhesive is provided in Table 21 below.

TABLE 21

| MATERIAL | Wt. % | BATCH WEIGHT (lbs.) |
|---|---|---|
| Inventive Low Molecular Weight Copolymer | 52.700 | 527 |
| Regalite ® R1090 hydrocarbon resin | 45.000 | 450 |
| Sasol ® H-1 wax | 2.000 | 20 |
| Irganox ® 1010 antioxidant | 0.295 | 2.95 |
| Eastobrite ® OB-1 optical brightener | 0.005 | 0.05 |
| TOTAL | 100.00 | 1000.00 |

Evaluations of Adhesive Peel Bond Strength

Each adhesive was applied between a polyethylene film and a nonwoven fabric to make laminates. The laminates were then debonded using a tensile tester and the force applied to separate the plies was measured as peel bond strength. The details for applying the adhesive onto the substrates, making laminates, and measuring the peel strength are provided below.

The adhesives were evaluated using a Nordson CTL 4600 Series Hot Melt Coater (Nordson Corporation, 11475 Lakefield Drive, Duluth, Ga. 30097, USA) equipped with a Nordson adhesive applicator. The applicator was connected, through an insulated hose, to an adhesive melting tank of the Nordson ProBlue 50 Melter. The overall operation of the machine and adhesive delivery were processed through an Allen Bradley PanelView 5 and a Siemens Simatic controllers, all using Nordson-customized proprietary software.

Two categories of applicators were used. They encompass Nordson Universal Modules on which four spray nozzles were mounted and Nordson Slot Die systems.

Two groups of spray nozzles, operating in continuous and intermittent modes, respectively, were selected for the evaluations of the hot melt adhesives. The continuous spray nozzles encompassed Universal Signature Standard (model 1072290) and Universal Signature Low Flow (model 1095242). The nozzles for intermittent spray process comprised Universal Signature Standard Intermittent (model 1088478A) and Universal Signature Low Flow Intermittent (model 1088478). The dual operation spray nozzle—continuous and intermittent—Universal Summit 3 holes (model 1033006) was also used.

The slot die systems included continuous (model 784088) and intermittent (model C2501789897) applicators.

The samples for peel strength evaluation were made by laminating a five-inch wide polyethylene film to a five-inch wide nonwoven fabric using liquid hot melt adhesives of interest.

The polyethylene film was Clopay Microflex® Film, DH284 PE White 360, 0.001"×5" (a 1-mil thick white film), supplied by Clopay Plastic Products Company, 531 East Fourth street, Augusta, Ky. The nonwoven was Unipro® 45, a 15 g/m² (or 0.45 oz./yd²) spunbond polypropylene fabric distributed by Midwest Filtration, 9775 International Boulevard, Cincinnati, Ohio.

The solid adhesive was placed in a ProBlue melting tank and heated to the target temperature to obtain a homogeneous liquid. The chosen target temperatures were 120, 130, 140, 145, 150, and 160° C. The molten adhesive was then pumped from the melting tank, through a heated insulated hose, to the spray module and nozzles, to deposit onto the polyethylene film, moving at a speed of 400 or 600 m/min, an amount of adhesive corresponding to a preselected add-on (1, 2, or 3 g/m²). The nonwoven fabric, moving at the same speed as the polyethylene film, was then brought in contact with the polyethylene film, on the side that had the adhesive layer. The assembly was run through an S-wrap and a compression nip (or gap) between two (steel and rubber) rolls to contact the substrates and bond them to each other. The laminate thus created was wound into a roll. At the end of the process, the machine was stopped and specimens (in the form of bundles of short laminates or tabs) were collected from the roll by slicing, and saved for subsequent peel strength evaluations.

The process was repeated for each adhesive and set of operating conditions to generate various samples for peel strength evaluation.

The coater rewinder pack roll and the compression nip were operated at a gauge pressure of 21 to 25 and 30 psi, respectively.

The bond strength between layers in the laminates for the various samples was measured as 180 degrees peel strength using universal tensile testers at a cross-head speed of 30 mm/min. The instruments encompassed a Chem Instruments Adhesion Release Tester AR-1000 equipped with a 22.24 N (5 lbf) load cell, and a MTS Criterion Universal Tensile Tester model C43-104E on which a 500 N (112 lbf) load cell (model LPB 502) was mounted. The MTS instrument was controlled by Test Works 4 (version 4.12D) software installed on a HP computer system.

The test was conducted in the following manner. Samples made of several laminates of each sample were conditioned in accordance with the type of information to collect. The instant peel strength was measured within 5 minutes of the laminates preparation, with no special sample conditioning, the 24-hour and 1-month peel strengths were evaluated on samples conditioned at 50% RH and 25° C. for 24 hours and 1 month, respectively. Two sets of samples were conditioned at 38° C. (for 4 hours) and 49° C. (for 2 weeks) to generate the 4-hour and 2-week peel strength data, respectively.

After conditioning, one extremity of the laminate was disassembled by peeling to separate the two plies on a length of about 50 mm. Then, each ply's end was clamped in the two tester grips initially positioned at 75 mm of each other. The laminate was then peeled on a length of 100 mm at a speed of 300 mm/min and the instant force applied to separate the plies was continuously measured, stored in the computer and then processed to determine the average value of the readings. Six individual specimens taken from each sample were thus tested and the average value of all the peel bond strengths for the six specimens was calculated and reported as the peel strength for the sample.

Comparative Data on Peel Strength Compared for Examples 14-16

The graphs in FIGS. 11-20 show comparative peel strength data for laminates bonded with Comparative Aerafin™ 180 copolymer, Inventive Copolymer 60/40, and Inventive Copolymer 52/45, and a commercial rubber-based hot melt adhesive. The peel strengths are related to laminates exposed to various conditioning environments as described above in the procedures for peel strength measurement.

Hot melt adhesives prepared using the inventive low molecular weight propylene-ethylene copolymer yielded high peel strength laminates across the whole range of application temperature. Also, the peel value was relatively constant over the wide range of spray temperature. The consistency of the peel strength provides a great commercial advantage for the user of the hot melt based on the inventive low molecular weight propylene-ethylene copolymer since the adhesive provided a constant high quality finished goods when laminated with the adhesive of this invention regardless of the temperature used during the manufacturing process of the goods.

At the same add-on, the inventive low molecular weight propylene-ethylene copolymer offers a peel strength that is significantly higher than the peel strength obtained with Comparative Aerafin® 180 copolymer. Moreover, at a given application temperature below 152° C., hot melt adhesives based on the inventive low molecular weight propylene-ethylene copolymer provide the possibility for savings for the user since only a small amount of adhesive can be applied to yield a peel strength similar to that obtained when using a hot melt adhesive based on the Comparative Aerafin® 180 copolymer and a higher add-on.

Example 17

Adhesives were produced in aluminum cans using mechanical agitation with a paddle-type agitator controlled by a variable speed motor with a heat mantle set at 177° C. The propylene-ethylene copolymer(s), polypropylene (co) polymer(s), tackifier resins, waxes, and antioxidant were introduced into the can and heated to 177° C. under a nitrogen blanket. In some cases, oil was also added along with the resin and/or wax or in place of resin and/or wax. This mixture was agitated for 30 minutes until it was completely homogenous. After thorough mixing, the adhesive was poured onto a silicone or silicone-coated surface and allowed to cool. The adhesives were produced with various additives, including: Eastotac H130W, hydrogenated hydrocarbon resin (Eastman); Sasolwax™ H1, Fischer-Tropsch wax (Sasol Chemical Industries Limited, South Africa); Be Square 195 Microcrystalline Wax (Baker Hughes, Inc., Sugar Land, Tex.); EPOLENE™ N-15, polypropylene homopolymer wax (Westlake Polymers, LLC, Houston, Tex.); Achieve™ 6936, polypropylene homopolymer, metallocene based (Exxon-Mobil, Houston, Tex.); Vistamax™ 8880 isotactic propylene-ethylene copolymer, metallocene catalyzed, semi-crystalline (Exxon-Mobil); A-C® 596, propylene maleic anhydride copolymer wax (Honeywell International, Inc., Morristown, N.J.).

Viscosity of the adhesives was measured using a standard Brookfield viscometer equipped with a Thermosel. Measurements were taken 30 minutes after the composition was molten.

100 g peel was performed using standard US PAFT (peel adhesion failure temperature) method using 60# Kraft paper. Laminated section was 1" by 1" by 10 mil of adhesive thickness.

500 g shear was performed in accordance with ASTM D4498—SAFT (shear adhesion failure temperature) method using 60# Kraft paper. The laminated section was 1" by 1" by 10 mil adhesive thickness.

Open time was evaluated in accordance with ASTM D4497.

Bonding tests to corrugated cardboard were done by making the bonds by hand then allowing the bonds to stand at room temperature for at least 12 hours. The bonds were then placed into the specified temperature conditioning chamber and allowed to stand for at least 24 hours. The bonds were evaluated by ripping them apart at the conditioning temperature and reading the percentage of adhesive area covered by paper fiber. Refrigerator temperature was 4° C.

TABLES 22 and 23 provide the formulations for each adhesive and the various measured properties. It should be noted that all adhesives comprised 0.5 weight percent of Irganox 1010.

TABLE 22

| Materials | F1 | F2 | F4 | F5 | F6 | F7 | F8 |
|---|---|---|---|---|---|---|---|
| Aerafin ® 17 | 30% | 60% | 70% | 55% | 55% | 55% | 50% |
| Aerafin ® 180 | 20 | 0 | 0 | 0 | 0 | 0 | 0 |
| Eastotac ® H130W | 30 | 25 | 0 | 30 | 30 | 30 | 30 |
| Sasolwax ™ H1 | 20 | 0 | 0 | 0 | 0 | 0 | 0 |
| Be Square 195 | 0 | 15 | 0 | 0 | 0 | 0 | 0 |
| Epolene ™ N-15 | — | 0 | 30 | 15 | 0 | 0 | 15 |

TABLE 22-continued

| Materials | F1 | F2 | F4 | F5 | F6 | F7 | F8 |
|---|---|---|---|---|---|---|---|
| Achieve ™ 6936 | — | 0 | 0 | 0 | 15 | 0 | 0 |
| Vistamax ™ 8880 | 0 | 0 | 0 | 0 | 0 | 15 | 0 |
| A-C ® 596 | 0 | 0 | 0 | 0 | 0 | 0 | 5 |
| Adhesive film Description | Opaque Brittle Friable Stiff | Opaque Brittle Friable Stiff | Very brittle Very stiff | Clear Flexible Tough | Clear Flexible Tough | Very clear Shiny Very flexible Soft | Clear Flexible Tough |

TABLE 23

| | F5 | F6 | F7 | F8 | Target value |
|---|---|---|---|---|---|
| Materials | | | | | |
| Aerafin ® 17 | 55% | 55% | 55% | 50% | — |
| Eastotac ® H130W | 30 | 30 | 30 | 30 | — |
| Epolene ™ N-15 | 15 | 0 | 0 | 15 | — |
| Achieve ™ 6936 | 0 | 15 | 0 | 0 | — |
| Vistamax ™ 8880 | 0 | 0 | 15 | 0 | — |
| A-C ® 596 wax | 0 | 0 | 0 | 5 | — |
| Adhesive Properties | | | | | |
| Adhesive Film Description | Clear Flexible tough | Clear Flexible tough | Very clear Shiny Very flexible Soft | Clear Flexible Tough | Flexible Tough |
| Viscosity at 177° C. | 1273 cps | 2384 cps | 1336 cps | 1142 cps | 1000 cps |
| RT Bonding* to Corrugated Cardboard | Excellent | Excellent | Excellent | Excellent | Excellent |
| Refrigerator (4° C.) bonding* to Corrugated Cardboard | Marginal | Marginal | Good | Good | Good |
| 100 g Peel (PAFT, ASTM) | 45° C. (113° F.) | 42° C. (108° F.) | 42° C. (108° F.) | 53° C. (128° F.) | 66° C. (151° F.) |
| 500 g Shear (SAFT, ASTM) | 120° C. (248° F.) | 126° C. (259° F.) | 93° C. (199° F.) | 125° C. (257° F.) | 94° C. (201° F.) |
| Speed of Set** | 1.5 | 3 | 5 (very slow) | 2 | 1 (Fast) |

*Excellent = 80-100% fiber tear; Good = 50-79% fiber tear; Marginal = 20-49% fiber tear; Fail = 0-19% fiber tear.
**Speed 1-5, with 1 = fast.

As shown in TABLES 22 and 23, various adhesive compositions containing the inventive low molecular weight polymer Aerafin® 17 and the inventive high molecular weight polymer Aerafin® 180 with various waxes and polymers were produced. The "Target" adhesive values were from a commercially available adhesive based on ethylene-octene copolymer produced using a metallocene catalyst ("mPE") (HB Fuller Advantra PHC9256).

Samples 1 and 2 illustrate that the use of waxes typically used in EVA and ethylene-octene (metallocene catalyzed, mPE) packaging adhesives, in the amounts typically used, resulted in stiff, brittle, and friable compositions with little mechanical integrity. Samples 5-8 produced clear, flexible compositions with excellent room temperature adhesion to corrugated cardboard. Unexpectedly, samples 5, 6 and 8 had 27.6%, 34% and 33% higher Shear adhesion failure temperature (SAFT) performance, respectively, than the target value. Surprisingly, the high SAFT values were combined with set times acceptable on commercial packaging lines.

Additionally, the flexibility and elasticity of the formulation, particularly F7 comprising Aerafin® polymer and Vistamaxx™ 8880 polymer, an isotactic metallocene-catalyzed propylene/ethylene copolymer, indicates possible advantages in elastic attachment adhesives for disposable sanitary hygiene articles such as diapers, feminine pads and adult incontinence articles.

Example 18

Inventive hot melt adhesives for packaging applications were produced using the process described in Example 17; the composition, in weight percent, and properties of the adhesives are listed in TABLE 24. The adhesives were produced with various polypropylene additives, including Licocene™ PP 6102, a metallocene-catalyzed polypropylene polymer wax with high crystallinity; Licocene™ PP 1302, a metallocene-catalyzed propylene-ethylene polymer wax with low crystallinity, both available from Clariant International Ltd. (Muttenz, Switzerland); Epolene® N-15 (Westlake) and A-C® 596, a propylene maleic anhydride copolymer wax (Honeywell). A second Commercial Adhesive, FT6, based on ethylene-octene polymer that is metallocene-catalyzed (mPE), was tested for comparison.

Compared to commercial comparative adhesive FT6, samples FT2 and FT3 comprising the inventive propylene-ethylene copolymer and a polypropylene polymer/wax unexpectedly exhibited the combination of viscosity at 177° C. about 800-1800 cp with over 34% and 19% higher SAFT values and improved adhesion (percent fiber tear) at −7° C. and −15° C.

TABLE 24

| Materials | IA FT2 | IA FT3 | IA FT4 | CA FT6 |
|---|---|---|---|---|
| Aerafin ™ 17 | 40 | 40 | 37 | — |
| Aerafin ™ 180 | 10 | 10 | 8 | — |
| Eastotac ™ H130W | 30 | 30 | 35 | — |
| Licocene ™ PP 6102 | 0 | 15 | 0 | — |
| Licocene ™ PP 1302 | 0 | 0 | 5 | — |
| Epolene ™ N-15 | 15 | 0 | 10 | — |
| A-C ™ 596 | 5 | 5 | 5 | — |
| Adhesive properties | | | | |
| RBSP (° C.) | 150 | 132 | 148 | 111 |
| Viscosity at 177 ° C. (cP) | 1660 | 1098 | 1295 | 1000 |
| 100 g Peel (PAFT, ASTM) | 68 | 47 | 61 | 67 |
| 500 g Shear (SAFT, ASTM) | 129 | 115 | 122 | 96 |
| OPEN TIME (sec) | 30 | >60 | >60 | 10 |
| SET TIME (sec) | 15 | 25 | 25 | 10 |
| Fiber tear at room temperature (%) | >80 | >80 | >80 | >80 |
| Fiber tear at −7° C. (%) | >80 | >80 | >50 | >50 |
| Fiber tear at −15° C. (%) | >80 | >80 | <50 | <50 |

Example 19

Assembly adhesives AF3, AF4 and AF5 were prepared according to the weight percent given in TABLE 27 by adding the tackifier, oil and an antioxidant to a metallic container and heating the mixture to 180° C. The mixture was melted, agitated, and then the inventive propylene-ethylene copolymer Aerafin® 180, Vestoplast™ 703, a propylene-ethylene-butene terpolymer with short open time, Vestoplast™ 792, a propylene-ethylene-butene terpolymer with long open time, and/or Eastoflex™ polymers were added. The mixture was continuously mixed until it was completely melted. Degassing was performed when necessary to remove air bubbles trapped in the adhesive. Brookfield viscosity and ring and ball softening point (RBSP) were measured as previously described. It should be noted that the compositional components recited in TABLE 27 are based on weight percentage and that all components add up to 100 percent; however, this does not include the 0.3 percent of antioxidant (Irganox® 1010), which was added after all other components were combined. The weight percentage for the antioxidant was based off the combined weight percentage of the other components.

The adhesives were manually coated as pressure sensitive adhesives at 180° C. using a doctor blade with a 50 micron gap onto one mil PET film. The adhesive-coated PET was applied to stainless steel (SS) coupons and 180° peel strength was tested following standard method PSTC-101 using an Instron 5543 at 300 mm/min.

The open time of the adhesive was determined manually by pouring adhesive at 180° C. onto nonwoven substrate WYPAL™ X60 from Kimberly-Clark in a bead line approximately 3 g/inch, applying a second piece of nonwoven to the bead of adhesive with finger pressure, and slowly peeling the second nonwoven until the adhesive did not adhere to the second nonwoven substrate, then recording this time as the open time.

TABLE 27

| Component | AF3 | AF4 | AF5 | — |
|---|---|---|---|---|
| Vestoplast ™ 703 | 40 | 20 | 0 | — |
| Vestoplast ™ 792 | 15 | 15 | 0 | — |

TABLE 27-continued

| | | | | |
|---|---|---|---|---|
| propylene-ethylene copolymer Aerafin ™ 180 | 0 | 15 | 38 | — |
| Eastoflex ™ 1023 | 0 | 0 | 9.5 | — |
| Regalite ™ R1100 | 40 | 40 | 43 | — |
| KN4010 oil | 10 | 10 | 9.5 | — |

| Adhesive Test | AF3 | AF4 | AF5 | Target |
|---|---|---|---|---|
| Viscosity at 180° C. (cP) | 2112 | 3150 | 2250 | 1500-3000 |
| RBSP (° C.) | 102 | 98 | 123 | 100-130 |
| 180° peel strength, SS (N/25 mm) | 60 | 61 | 41 | unknown |
| Open time, nonwoven to nonwoven (min) | >10 | >10 | No test | >10 |

Example 20

Adhesives were produced and tested as previously described in EXAMPLE 17, and the compositions and adhesive properties are presented in Tables 28 and 29. Commercial packaging adhesive ("Com. D") based on an ethylene-octene copolymer (mPE) was tested for comparison. Inventive adhesives AT2, AT3 and AT7 demonstrate the surprising increase in low temperature adhesion, compared to AT1 and Com. D, when Aerafin™ 180 and the Inventive Low Molecular Weight Copolymer are used together with various resins and waxes, as evidenced by percent fiber tear on corrugated cardboard at −18° C. Inventive adhesives AT5 and AT6 have polymer loading of 70 weight percent or higher with less than 15 weight percent tackifying resin, but surprisingly also have 80-100% fiber tear (low temperature adhesion). Additionally, it is surprising that Inventive adhesives AT2 through AT7 have RBSP and SAFT values higher than Com. D in combination with the superior low temperature adhesion. The combinations of propylene waxes and ethylene waxes illustrate the ability to obtain set times close to Com. D while improving low temperature adhesion, increasing SAFT, and maintaining 177° C. Brookfield viscosity of the adhesive.

TABLE 28

| Materials | AT1 | AT2 | AT3 | AT4 | AT5 | AT6 | AT7 |
|---|---|---|---|---|---|---|---|
| Inventive Low Molecular Weight Copolymer | 0 | 40 | 40 | 37 | 76 | 70 | 40 |
| propylene-ethylene copolymer Aerafin ™ 180 | 40 | 10 | 10 | 8 | 0 | 0 | 15 |
| Eastotac ™ H130W | 0 | 30 | 30 | 35 | 0 | 10 | 10 |
| Regalite ™ R1100 | 0 | 0 | 0 | 0 | 14 | 0 | 0 |
| Regalite ™ R1090 | 30 | 0 | 0 | 0 | 0 | 0 | 0 |
| Polywax ™ 3000 | 30 | 0 | 0 | 0 | 6 | 0 | 0 |
| Licocene ™ PP6102 | 0 | 0 | 15 | 0 | 0 | 20 | 0 |
| Licocene ™ PP1302 | 0 | 0 | 0 | 5 | 0 | 0 | 0 |
| Epolene ™ N-15 | 0 | 15 | 0 | 10 | 0 | 0 | 0 |
| Polywax ™ 850 | 0 | 0 | 0 | 0 | 0 | 0 | 20 |
| Polywax ™ 500 | 0 | 0 | 0 | 0 | 0 | 0 | 10 |
| Bareco ™ 4040 | 0 | 0 | 0 | 0 | 0 | 0 | 5 |
| Sasolwax ™ H-1 | 0 | 0 | 0 | 0 | 2 | 0 | 0 |
| A-C ™ 596 | 0 | 5 | 5 | 5 | 2 | 0 | 0 |

TABLE 29

| Adhesive Properties | AT1 | AT2 | AT3 | AT4 | AT5 | AT6 | AT7 | Com. D |
|---|---|---|---|---|---|---|---|---|
| RBSP (° C.) | 125 | 150 | 132 | 148 | 125 | 138 | 115 | 111 |
| Viscosity at 177° C. (cP) | 1715 | 1660 | 1098 | 1295 | 1200 | 1075 | 800 | 1000 |

TABLE 29-continued

| Adhesive Properties | AT1 | AT2 | AT3 | AT4 | AT5 | AT6 | AT7 | Com. D |
|---|---|---|---|---|---|---|---|---|
| PAFT JAI, 300 g, 0.5° C./min (° C.) | 41 | 65 | 59 | 60 | 34 | No test | No test | 68 |
| SAFT JAI, 500 g 0.5° C./min (° C.) | 80 | 113 | 108 | 105 | 99 | No test | No test | 87 |
| Open time (sec) | 10 | 30 | >60 | >60 | 30 | 35 | 15 | 10 |
| Set time (sec) | 10 | 15 | 25 | 25 | 15 | 15 | 30 | 10 = fast |
| 50° C. holding power, JAI peel, 300 g (min) | 12 | 106 | 35 | 45 | 11 | No test | No test | 1200 |
| Fiber tear at −18° C. (%) | >50 | >80 | >80 | >50 | >80 | 100 | 100 | <50 |

Example 21

For this example, general packaging adhesives were produced that comprised 0 to 15 weight percent of Aerafin® 180 from Eastman Chemical, 25 to 40 weight percent of a metallocene-catalyzed polyethylene ("mPE"), 40 weight percent of a tackifier resin (Eastotax H130W), 20 weight percent of a wax (Sasolwax H1), and 0.3 weight percent of an antioxidant. The adhesives were prepared by first adding the tackifier, wax, and antioxidant to a metallic container and heating the mixture to 180° C. with the aid of an agitator. The mixture was melted, agitated, and then the Aerafin® 180 and polyethylene were added. The mixture was continuously mixed until it was completely melted. Degassing was performed when necessary to remove air bubbles trapped in the adhesive.

After forming the adhesives, the open time/set time (OT/ST), low temperature fiber tear (LTFT) at −15° C. and −25° C., holding power at 50° C. and 60° C., and peel adhesive failure temperature (PAFT) were measured and evaluated for each formed adhesive. The holding power and LTFT were measured in accordance with the previously-described tests.

The PAFT was tested according to JAI-7—Method B, which is described as follows. The PAFT test occurred under the ramp rate of 0.5° C./minute. For the PAFT test, the glued carton sample was cured overnight at the room temperature, which normally was about +/−20° C. to 23° C., before being hanged in the shear bank oven in the peel mode. A weight of 300 gram was hung under the glued sample. For each sample, the failure time was recorded in minutes and the failure temperature was calculated using the equation (Fail Temp=40° C.+0.5° C./min*(minutes)). A minimum of 8 specimens were needed for this test. The following lays out the parameters for the PAFT testing.

| Criteria | Unit | Condition |
|---|---|---|
| Specimen size | mm | 25 × 60 |
| Application temperature | Celsius | 180 ± 2 |
| Open time | s | 2 |
| Set time | s | 2 |
| Line speed | m/min | 15 |
| Bonding Pressure | kgf | 1.2 (0.08 kgf per cm$^2$) |
| Coat weight | g/m | 3 ± 0.09 |
| Hang weight | g | 300 |

The compositions of each tested adhesive, along with their measured PAFT, LTFT, open time, set time, cloud points, and holding powers at 50° C. and 60° C. are provided, below, in TABLE 30.

TABLE 30

| Adhesive Formulation | PAFT (° C.) | LTFT % (−15° C.) | LTFT % (−25° C.) | Holding Power 50° C. (min) | Holding Power 60° C. (min) | Open Time (s) | Set Time (s) | Cloud Point (° C.) |
|---|---|---|---|---|---|---|---|---|
| Commercial grade from key HMA formulator | 71 | 98 | — | 420 | 12 | 15 | 2 | — |
| F0 (control formulation): Affinity GA1950/Eastotac H130W/H1wax = 40/40/20 | 78 | 98 | 95 | 1144 | 25 | 13 | 1 | 120 |
| F1: Aerafin 180/Affinity GA1950/Eastotac H130W/H1wax = 5/35/40/20 | 82 | 92 | 84 | 1498 | 58 | 15 | 1 | — |
| F2: Aerafin 180/Affinity GA1950/Eastotac H130W/H1wax = 10/30/40/20 | 82 | 93 | 95 | 997 | 52 | 15 | 1 | — |
| F3: Aerafin 180/Affinity GA1950/Eastotac H130W/H1wax = 15/25/40/20 | 79 | 81 | 59 | 413 | 33 | 13 | 1 | — |
| F4: Aerafin 180/Eastotac H130W/H1 wax = 40/40/20 | — | — | — | — | — | — | — | 152 |

It can be seen above from TABLE 30 that when 5 weight percent of Aerafin® 180 was added to the formulation to replace Affinity GA1950, the resultant hot melt adhesive illustrated excellent holding power at 50° C. and 60° C. compared to commercial grade and control formulation. In addition, the measured LTFT, PAFT and OT/ST of the adhesive were comparable. When 10 weight percent Aerafin® 180 was added to the formulation, the obtained holding power at 50° C. was slightly decreased compared with F0 and F1, but the resulting holding power at 60° C. was still twice as high as that of control formulation and four times higher than that of the commercial grade hot melt adhesive; however, as the dosage of Aerafin® 180 further increased, a decrease in holding power at 50° C. and 60° C. was observed. The resulting holding power at 60° C. was still much higher than the commercial grade, suggesting an improvement in holding power at high temperature due to the presence of Aerafin® 180 in the formulation.

The observed decrease in holding power as the dosage of Aerafin® 180 increased might have resulted from relatively poor compatibility between Aerafin® 180 and Sasolwax H1. The compatibility between Aerafin® 180 and Sasolwax H1 may be relatively poor compared with that of mPE and Sasolwax H1, as shown in cloud point value (TABLE 30). It can be seen from TABLE 30 that the formulation containing Aerafin® 180 (F4) had a cloud point of 152° C., while the one containing mPE (F0) had a cloud point of 120° C. It is well known that the lower the cloud point, the better compatibility between polymer and wax. Therefore, the relatively poor compatibility between Aerafin® 180 and Sasolwax H1 led to a reduction in holding power as the dosage of Aerafin® 180 in the formulation increased.

Furthermore, the resulting improvement in high temperature holding power of the formulations containing Aerafin® 180 might be attributed to the relatively high ring and ball softening points ("RBSP") of Aerafin® 180 (118° C. vs. 93° C. of mPE). It is generally accepted that high RBSP can be responsible for high heat resistance, leading to attractive high temperature holding power. It can be seen that at 5 weight percent of Aerafin® 180, both holding power at 500° C. and 60° C. are higher than those of commercial HMA and the control formulation. However, as the dosage of Aerafin® 180 further increased, a decrease in holding power at 500° C. and 60° C. was observed, and the reduction in holding power at 50° C. was more significant compared with the reduction in holding power at 60° C., as discussed previously. The decrease in holding power as dosage of Aerafin® 180 increased might be due to relatively poor compatibility between Aerafin® 180 and Sasolwax H1. It is well known that higher temperature favors a more compatible system; therefore, Aerafin® 180 and Sasolwax H1 are more compatible at 60° C. than at 50° C. At 50° C., the compatibility issue is more dominant than the contribution of the higher RBSP of Aerafin® 180, leading to a lowering in holding power; while at 60° C., the resulting compatibility issue is less significant, resulting in less reduction in holding power.

Example 22

Adhesive samples were prepared using techniques known in the art. The components of each adhesive sample and their various properties are listed, below, in TABLES 31-34. An exemplary procedure involved placing the components in a glass mixing kettle equipped with a stirrer at 170 rpm and raising the temperature to from about 150° C. to 180° C., depending on the softening points of the components. Stirring was initiated when the mixture became molten, and heating and mixing were continued at 180° C. for one hour until a smooth homogeneous mass was obtained. The formulations were prepared in a 500 mL reactor under nitrogen atmosphere. About 150 grams of an adhesive were prepared under nitrogen. The adhesives samples were subjected to various tests to measure their adhesive-based properties.

The viscosity of the samples was measured with a Brookfield viscometer (Model DV-I). Spindle 21 and 8 grams of adhesive were used for the measurements. The sample was heated until the desired temperature and allowed to equilibrate under sheer for 20 minutes.

The PAFT and holding power tests were performed according to the methods utilized in Example 21.

The ring and ball softening point was determined with Herzog HRB754 equipment. The adhesive rings were placed in glycerin with balls laying on top of the adhesive ring. The glycerin was heated up continuously and the temperature, at which the ring fell through the adhesive, was recorded.

A bond tester was used to determine the set time. A 7.5×7.5 cm carton was placed on a 15×15 cm coated carton and by varying pressing times, the fiber tear and traction force were determined. The flutes were placed in cross direction, the adhesive was coated at 180° C. and a pressing force of 85 N was applied. The set time was determined by taking the first point when 100% fiber tear was reached.

Five flasks each containing 90 g of adhesive were prepared and placed in an oven at 175° C. and after each day (24 h, 48 h, 72 h and 96 h) the color and viscosity were determined with the Gardner Color method and Brookfield viscometer. The Gardner color was measured in a Dr. Lange Lico 400+ apparatus. The instrument was calibrated using toluene.

TABLE 31

| Sample | 1 | 2 | 3 | 4 | 5 | 6 | 7 | 8 |
|---|---|---|---|---|---|---|---|---|
| Eastoflex ® E1060 | 100 | 35 | 52 | 52 | 45.5 | 45.5 | 35.75 | 35.75 |
| Aerafin ® 17 | | 65 | 28 | 28 | 24.5 | 24.5 | 19.25 | 19.25 |
| Regalite R1125 | | | 20 | | 30 | 25 | 40 | 40 |
| Eastotac H130W | | | | 20 | | | | |
| Licocene PP6102 | | | | | | | 5 | 5 |
| Sasolwax H1 | | | | | | | | 5 |
| RBSP (° C.) | 143 | 141 | 138 | 138 | 135 | 137 | 133 | 127 |
| Viscosity at 180 (° C.) | 2300 | 4500 | 3125 | 3491 | 2558 | 2366 | 1585 | 1402 |
| PAFT (° C.) | 26 | 40 | 64 | 58 | 65 | 63 | 71 | 81 |
| Holding power at 50° C. (minutes) | 0 | 5 | 17 | 9 | 13 | 16 | 60 | 319 |
| % Fiber tear at −15° C. | 5 | 70 | 70 | 80 | 70 | 50 | 0 | 0 |

As shown above in TABLE 31, Samples 1 and 2 comprised 100 weight percent of polymer (Eastoflex® E1060 and Aerafin® 17). Sample 2 showed improved low temperature adhesion and PAFT obtained from the additional polymer. Samples 3 and 4 comprised 80 weight percent of polymer; Samples 5 and 6 comprised 70 weight percent of polymer; and Samples 7 and 8 comprised 55 weight percent of polymer. Sample 6 exhibited low viscosity at 180° C. with a surprisingly long hold power at 50° C.

TABLE 32

| Sample | 9 | 10 | 11 | 12 | 13 | 14 | 15 | 16 | 17 |
|---|---|---|---|---|---|---|---|---|---|
| Eastoflex ® E1060 | 45.5 | 45.5 | 45.5 | 45.5 | 45.5 | 45.5 | 45.5 | 45.5 | 45.5 |
| Aerafin ® 17 | 24.5 | 24.5 | 24.5 | 24.5 | 24.5 | 24.5 | 24.5 | 24.5 | 24.5 |

TABLE 32-continued

| Sample | 9 | 10 | 11 | 12 | 13 | 14 | 15 | 16 | 17 |
|---|---|---|---|---|---|---|---|---|---|
| Regalite R1125 | 25 | 25 | 25 | 25 | 25 | 25 | 25 | 25 | 25 |
| Epolene N15 | 5 | | | | | | | | |
| Epolene E43 | | 5 | | | | | | | |
| Epolene C13 | | | 5 | | | | | | |
| Epolene N14P | | | | 5 | | | | | |
| Epolene N21 | | | | | 5 | | | | |
| Licocene PP6102 | | | | | | 5 | | | |
| Paraffin 66-69 | | | | | | | 5 | | |
| Sasolwax C80 | | | | | | | | 5 | |
| Sasolwax H1 | | | | | | | | | 5 |
| RBSP (° C.) | 145 | 143 | 137 | 134 | 134 | 137 | 135 | 135 | 132 |
| Viscosity at 180 (° C.) | 2575 | 2454 | 1920 | 2320 | 2420 | 2366 | 2033 | 2000 | 2133 |
| PAFT (° C.) | 61 | 94 | 62 | 69 | 70 | 63 | 61 | 69 | 74 |
| Holding power at 50° C. (minutes) | 16 | 220 | 31 | 29 | 50 | 16 | 24 | 52 | 81 |
| % Fiber tear at −15° C. | 70 | 100 | 35 | 30 | 40 | 50 | 20 | 10 | 10 |

As shown above in TABLE 32, Samples 9 through 17 comprised 70 weight percent of polymer. Sample 10 exhibited an unexpected and desirable balance of high temperature resistance indicated by PAFT and holding power at 50° C. with low temperature fiber tear performance.

the use of an additional polymer obtained a more desirable viscosity and RBSP for adhesives, such as those used in product assembly. Another commercial adhesive ("Com. C") was provided for comparison purposes.

TABLE 33

| | 18 | 19 | 20 | 21 | 22 | 23 | Com. A | Com. B |
|---|---|---|---|---|---|---|---|---|
| Aerafin ® 17 | 45.5 | 43.55 | 43.55 | 43.55 | 43.55 | | | |
| Eastoflex ® E1060 | 24.5 | 23.45 | 23.45 | 23.45 | 23.45 | | | |
| Aerafin ® 180 | | | | | | 10 | | |
| AFFINITY GA ™ 1950 | | | | | | 30 | | |
| Eastotac H130W | | | | | | 40 | | |
| Foralyn 90 rosin ester | 25 | 25 | 25 | 25 | 25 | | | |
| Epolene N15 | | | | 5 | 5 | | | |
| Epolene N21 | 5 | 5 | 5 | | | | | |
| Sasolwax H1 | | | 3 | | 3 | 20 | | |
| Licocene PE4201 | | 3 | | 3 | | | | |
| RBSP (° C.) | 134 | 132 | 133 | 146 | 146 | 111 | 106 | 96 |
| Viscosity at 180 (° C.) | 1720 | 1854 | 1800 | 2000 | 1900 | 1290 | 813 | 676 |
| PAFT (° C.) | 65 | 65 | 66 | 88 | 63 | 72 | 68 | 56 |
| Holding power at 50° C. (minutes) | 54 | 48 | 32 | 38 | 39 | 1440 | 154 | 12 |
| % Fiber tear at −15° C. | 50 | 25 | 45 | 25 | 15 | 100 | 15 | 35 |
| Set time (sec) | 18 | 13 | 17 | 11 | | 10 | 11 | 16 |

As shown above in TABLE 33, Samples 18 through 22 comprised 67 weight percent of polymer. Sample 18 had a higher PAFT, longer hold power at 50° C., and faster set time than Commercial Adhesive B ("Com. B"). Sample 23 comprised 40 weight percent of polymer and exhibited a surprisingly long hold power at 50° C. Commercial Adhesive A ("Com. A") was also presented as a comparison for the produced adhesives.

TABLE 34

| | 24 | 25 | 26 | 27 | 28 | 29 | Com. C |
|---|---|---|---|---|---|---|---|
| Aerafin ® 180 | 60 | 59 | 55 | 40 | 55 | 40 | |
| Eastoflex ® P1023 | | 1 | 5 | 20 | | | |
| Eastoflex ® E1003 | | | | | 5 | 20 | |
| Regalite R1090 | 30 | 30 | 30 | 30 | 30 | 30 | |
| Primol 352 mineral oil | 10 | 10 | 10 | 10 | 10 | 10 | |
| Viscosity @ 180° C. (mPa · s) | 3387 | 3937 | 3470 | 2330 | 3070 | 1490 | 2500 |
| RBSP (° C.) | 103 | 103 | 112 | 132 | 104 | 107 | 100 |

As shown above in TABLE 34, Samples 24 through 29 comprised 60 weight percent of polymer and illustrate that

What is claimed is:

1. An adhesive comprising at least one propylene-ethylene copolymer and at least one polyolefin, wherein said at least one propylene-ethylene copolymer comprises:
   a) at least 10 weight percent of ethylene, and
   b) a softening point in the range of 90° C. to 121° C., and
   c) a glass transition temperature (Tg) in the range of about −60 to about 20° C., and
   d) needle penetration in the range of 10 to 30 dmm, wherein said adhesive comprises:
   (a) 5 to 95 weight percent of said at least one propylene-ethylene copolymer;
   (b) 5 to 90 weight percent of said at least one polyolefin;
   (c) not more than 70 weight percent of at least one tackifier;
   (d) not more than 20 weight percent of at least one processing oil; and
   (e) not more than 20 weight percent of at least one wax.

2. The adhesive of claim 1, wherein said at least one polyolefin is selected from the group consisting of metallocene-catalyzed polyolefin polymers and elastomers, and chain shuttling catalyzed olefin block copolymers.

3. The adhesive of claim 1, wherein said at least one polyolefin is selected from the group consisting of amorphous poly alpha olefins (APAO), wherein said amorphous poly alpha polyolefin comprises at least one monomer selected from the group consisting of ethylene, propylene, linear $C_4$-$C_{10}$ alpha-olefin monomers, and branched $C_4$-$C_{10}$ alpha-olefin monomers.

4. The adhesive of claim 2, wherein said adhesive comprises:
(a) 5 to 95 weight percent of said at least one propylene-ethylene copolymer;
(b) 5 to 90 weight percent of said at least one polyolefin;
(c) not more than 70 weight percent of at least one tackifier;
(d) not more than 20 weight percent of at least one processing oil; and
(e) not more than 30 weight percent of at least one wax.

5. The adhesive of claim 2, wherein said adhesive comprises:
(a) 10 to 70 weight percent of said at least one propylene-ethylene copolymer;
(b) 5 to 55 weight percent of said at least one polyolefin;
(c) not more than 70 weight percent of at least one tackifier;
(d) not more than 20 weight percent of at least one processing oil; and
(e) not more than 20 weight percent of at least one wax.

6. The adhesive of claim 2, wherein said adhesive comprises:
(a) 20 to 80 weight percent of said at least one propylene-ethylene copolymer;
(b) 1 to 45 weight percent of said at least one polyolefin;
(c) not more than 70 weight percent of at least one tackifier;
(d) not more than 20 weight percent of at least one processing oil; and
(e) not more than 20 weight percent of at least one wax.

7. The adhesive of claim 3, wherein said adhesive comprises:
(a) 5 to 95 weight percent of said at least one propylene-ethylene copolymer;
(b) 5 to 90 weight percent of said at least one polyolefin;
(c) not more than 70 weight percent of at least one tackifier;
(d) not more than 20 weight percent of at least one processing oil; and
(e) not more than 30 weight percent of at least one wax.

8. The adhesive of claim 3, wherein said adhesive comprises:
(a) 10 to 70 weight percent of said at least one propylene-ethylene copolymer;
(b) 5 to 55 weight percent of said at least one polyolefin;
(c) not more than 70 weight percent of at least one tackifier;
(d) not more than 20 weight percent of at least one processing oil; and
(e) not more than 20 weight percent of at least one wax.

9. The adhesive of claim 3, wherein said adhesive comprises:
(a) 20 to 80 weight percent of said at least one propylene-ethylene copolymer;
(b) 1 to 45 weight percent of said at least one polyolefin;
(c) not more than 70 weight percent of at least one tackifier;
(d) not more than 20 weight percent of at least one processing oil; and
(e) not more than 20 weight percent of at least one wax.

10. An article comprising the adhesive of claim 1 wherein said article is selected from the group consisting of adhesives, sealants, caulks, roofing membranes, waterproof membranes and underlayments, carpet, laminates, laminated articles, tapes labels, mastics, polymer blends, wire coatings, molded articles, heat seal coatings, disposable hygiene articles, insulating glass (IG) units, bridge decking, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, candles, windows, films, gaskets, seals, o-rings, motor vehicle molded parts, motor vehicle extruded parts, clothing articles, rubber additive/processing aids, and fibers.

11. An article comprising the adhesive of claim 2 wherein said article is selected from the group consisting of adhesives, sealants, caulks, roofing membranes, waterproof membranes and underlayments, carpet, laminates, laminated articles, tapes labels, mastics, polymer blends, wire coatings, molded articles, heat seal coatings, disposable hygiene articles, insulating glass (IG) units, bridge decking, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, candles, windows, films, gaskets, seals, o-rings, motor vehicle molded parts, motor vehicle extruded parts, clothing articles, rubber additive/processing aids, and fibers.

12. An article comprising the adhesive of claim 3 wherein said article is selected from the group consisting of adhesives, sealants, caulks, roofing membranes, waterproof membranes and underlayments, carpet, laminates, laminated articles, tapes labels, mastics, polymer blends, wire coatings, molded articles, heat seal coatings, disposable hygiene articles, insulating glass (IG) units, bridge decking, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, candles, windows, films, gaskets, seals, o-rings, motor vehicle molded parts, motor vehicle extruded parts, clothing articles, rubber additive/processing aids, and fibers.

13. An article comprising the adhesive of claim 4 wherein said article is selected from the group consisting of adhesives, sealants, caulks, roofing membranes, waterproof membranes and underlayments, carpet, laminates, laminated articles, tapes labels, mastics, polymer blends, wire coatings, molded articles, heat seal coatings, disposable hygiene articles, insulating glass (IG) units, bridge decking, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, candles, windows, films, gaskets, seals, o-rings, motor vehicle molded parts, motor vehicle extruded parts, clothing articles, rubber additive/processing aids, and fibers.

14. An article comprising the adhesive of claim 7 wherein said article is selected from the group consisting of adhesives, sealants, caulks, roofing membranes, waterproof membranes and underlayments, carpet, laminates, laminated articles, tapes labels, mastics, polymer blends, wire coatings, molded articles, heat seal coatings, disposable hygiene articles, insulating glass (IG) units, bridge decking, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, candles, windows, films, gaskets, seals, o-rings, motor vehicle molded parts, motor vehicle extruded parts, clothing articles, rubber additive/processing aids, and fibers.

\* \* \* \* \*